US010067006B2

(12) United States Patent
Caldeira et al.

(10) Patent No.: US 10,067,006 B2
(45) Date of Patent: Sep. 4, 2018

(54) NANOSTRUCTURE SENSORS AND SENSING SYSTEMS

(71) Applicant: Elwha LLC, Bellevue, WA (US)

(72) Inventors: Kenneth G. Caldeira, Redwood City, CA (US); Peter L. Hagelstein, Carlisle, MA (US); Roderick A. Hyde, Redmond, WA (US); Edward K. Y. Jung, Las Vegas, CA (US); Jordin T. Kare, Seattle, WA (US); Nathan P. Myhrvold, Bellevue, WA (US); John Brian Pendry, Surrey (GB); David Schurig, Salt Lake City, UT (US); Clarence T. Tegreene, Mercer Island, WA (US); Thomas Allan Weaver, San Mateo, CA (US); Charles Whitmer, North Bend, WA (US); Lowell L. Wood, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 211 days.

(21) Appl. No.: 14/309,605

(22) Filed: Jun. 19, 2014

(65) Prior Publication Data

US 2015/0369675 A1    Dec. 24, 2015

(51) Int. Cl.
*G01K 17/00*    (2006.01)
(52) U.S. Cl.
CPC .................. *G01K 17/006* (2013.01)
(58) Field of Classification Search
CPC ...... G01K 17/00; G01K 17/006; G01K 17/02; G01K 17/04; G01N 25/482
See application file for complete search history.

(56) References Cited

U.S. PATENT DOCUMENTS

| 4,485,294 | A | 11/1984 | Rosenberg | |
|---|---|---|---|---|
| 6,597,450 | B1 | 7/2003 | Andrews et al. | |
| 7,073,937 | B2 | 7/2006 | Nakayama et al. | |
| 7,268,350 | B1 | 9/2007 | Ouvrier-Buffet et al. | |
| 8,084,716 | B2 | 12/2011 | Day | |
| 8,596,108 | B2 | 12/2013 | Bristol | |
| 9,028,142 | B2 | 5/2015 | Raravikar et al. | |
| 2002/0084410 | A1 | 7/2002 | Colbert et al. | |
| 2002/0172820 | A1* | 11/2002 | Majumdar | B82Y 10/00 428/357 |
| 2004/0240252 | A1* | 12/2004 | Pinkerton | B82Y 10/00 365/151 |
| 2006/0231237 | A1* | 10/2006 | Dangelo | B82Y 10/00 165/104.28 |
| 2007/0138010 | A1 | 6/2007 | Ajayan et al. | |
| 2007/0277866 | A1 | 12/2007 | Sander et al. | |
| 2008/0251723 | A1 | 10/2008 | Ward et al. | |
| 2009/0084969 | A1* | 4/2009 | Ohta | G01T 7/00 250/370.15 |
| 2009/0220561 | A1* | 9/2009 | Jin | A61K 9/0009 424/423 |

(Continued)

OTHER PUBLICATIONS

S. Selvarasah et al., A Three Dimensioinal Thermal Sensor Based on Single-Walled Carbon Nanotubes, http://www.ece.neu.edu/faculty/mehmetd/publication/thermal%20sensor10.pdf, visited Dec. 3, 2014, 4 pgs.

(Continued)

*Primary Examiner* — Brian R Gordon

(57) ABSTRACT

Various sensors and arrays of sensors that utilize nanostructures or carbon structures, such as nanotubes, nanotube meshes, or graphene sheets, are disclosed. In some arrangements, at least a pair of contacts are electrically coupled with a given nanostructure or carbon structure to sense a change.

24 Claims, 44 Drawing Sheets

(56) References Cited

U.S. PATENT DOCUMENTS

| | | | |
|---|---|---|---|
| 2009/0277897 A1 | 11/2009 | Lashmore et al. | |
| 2011/0051775 A1* | 3/2011 | Ivanov | B82Y 30/00 |
| | | | 374/143 |
| 2012/0125771 A1* | 5/2012 | Salzer | G01N 27/308 |
| | | | 204/412 |
| 2013/0078622 A1* | 3/2013 | Collins | G01N 27/26 |
| | | | 435/6.1 |
| 2013/0255906 A1* | 10/2013 | Chang | F28F 13/06 |
| | | | 165/11.1 |
| 2014/0105242 A1 | 4/2014 | Fernandes et al. | |
| 2015/0312967 A1 | 10/2015 | Qian et al. | |
| 2015/0369675 A1 | 12/2015 | Caldeira et al. | |
| 2016/0238547 A1 | 8/2016 | Park et al. | |

OTHER PUBLICATIONS

Fung et al., Dielectrophoretic Batch Fabrication of Encapsulated Carbon Nanotube Thermal Sensors, http://70.40.222.74/ftp/papers/apcot-mnt-2004-kmfung.doc, visited Dec. 3, 2014, 4 pgs.

B. Crawford et al., Flexible Carbon Nanotube Based Temperature Sensor for Ultra-Small-Site Applications, Mechanical Engineering Undergraduate Capstone Projects. Paper 55, http://hdl.handle.net/2047/d10012904, visited Dec. 3, 2014, 84 pgs.

C.Gau et al., Nano Temperature Sensor Using Selective Lateral Growth of Carbon Nanotube Between Electrodes, Proceedings of the 5th IEEE Conference on Nanotechnology (2005), pp. 63-69.

P. Dorozhkin et al., A Liquid-Ga-Filled Carbon Nanotube: A Miniaturized Temperature Sensor and Electrical Switch, Small, vol. 1, No. 11 (2005), pp. 1088-1093.

L. Dai et al., Sensors and Sensor Arrays Based on Conjugated Polymers and Carbon Nanotubes, Pure and Applied Chemistry, vol. 74, No. 9 (2002), pp. 1753-1772.

G.U. Sumanasekera et al., Thermoelectric Chemical Sensor Based on Single Wall Carbon Nanotubes, Molecular Crystals and Liquid Crystals, vol. 387, (2002) pp. [253]/31-[261]/37.

G.E. Begtrup et al., Probing Nanoscale Solids at Thermal Extremes: Supplementary Materials, http://research.physics.berkeley.edu/zettl/projects/tehrmal_test_plat/Extreme.html, visited Dec. 3, 2014, 5 pgs.

* cited by examiner

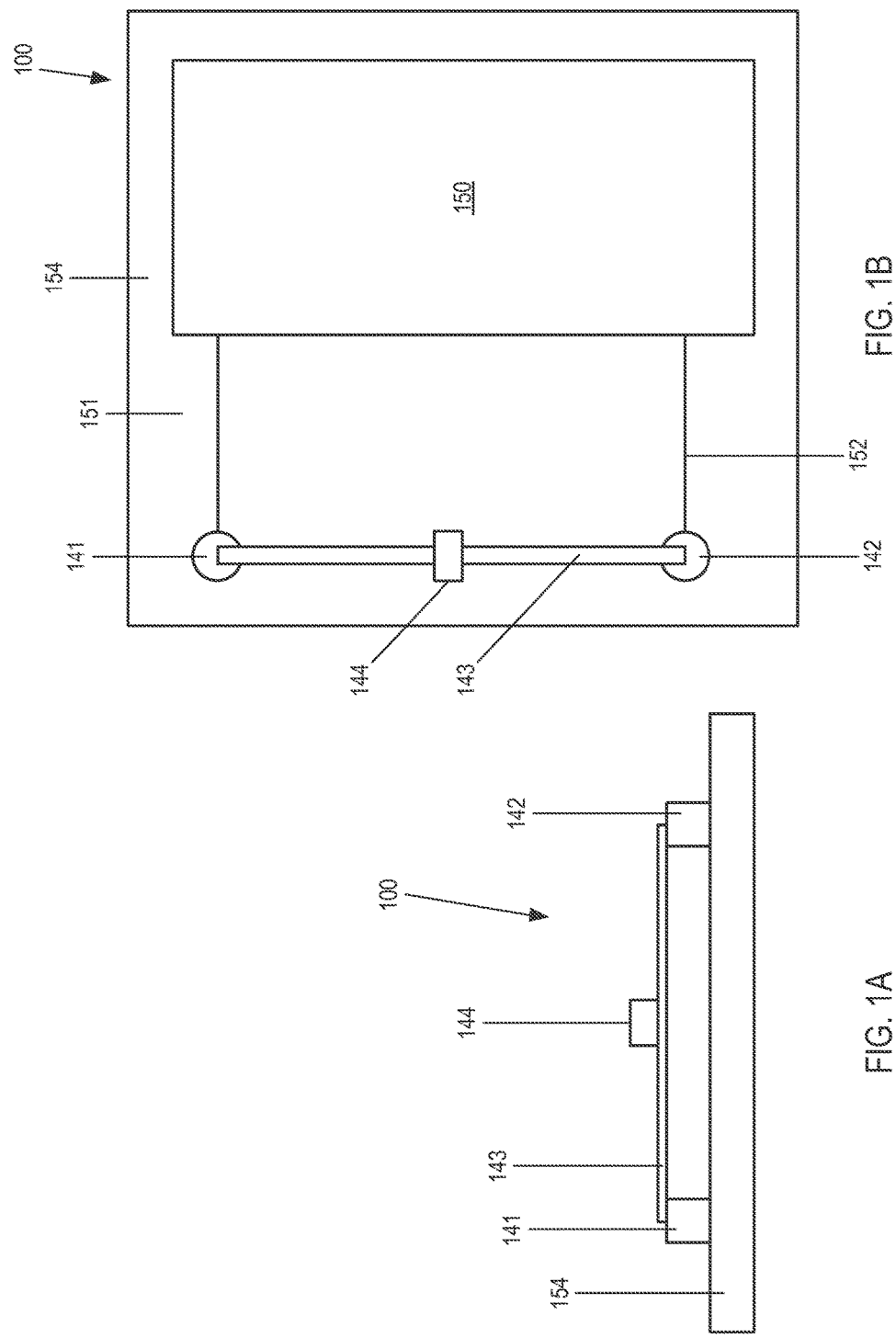

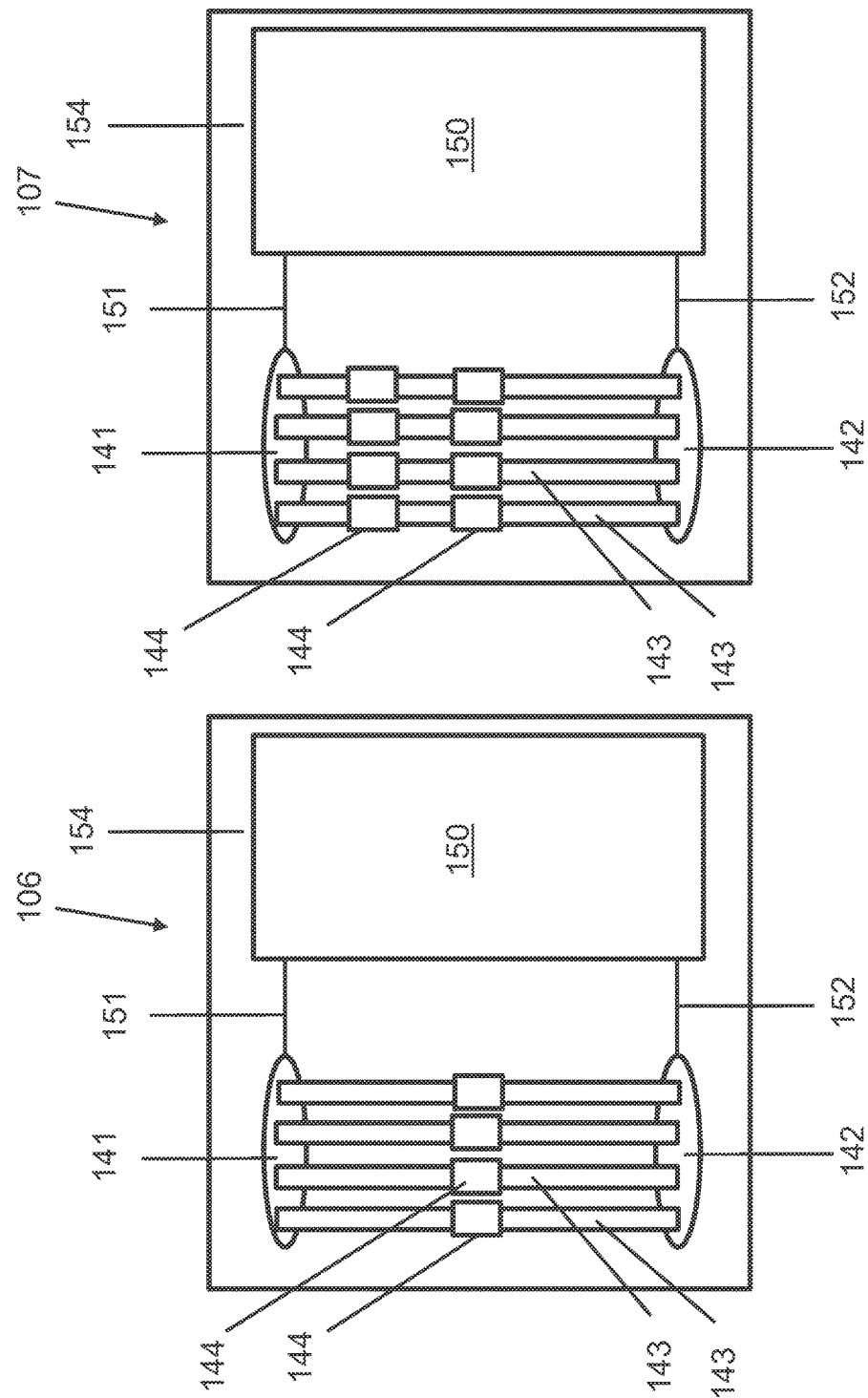

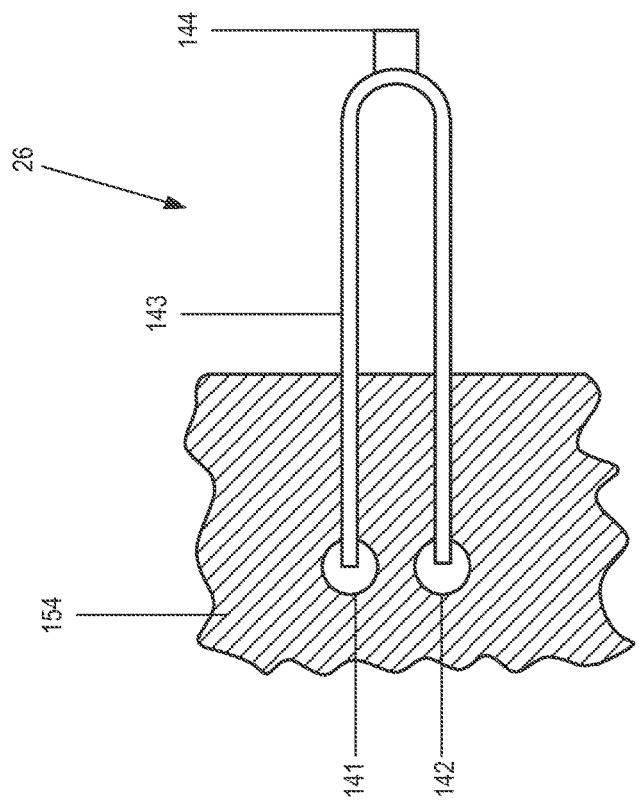
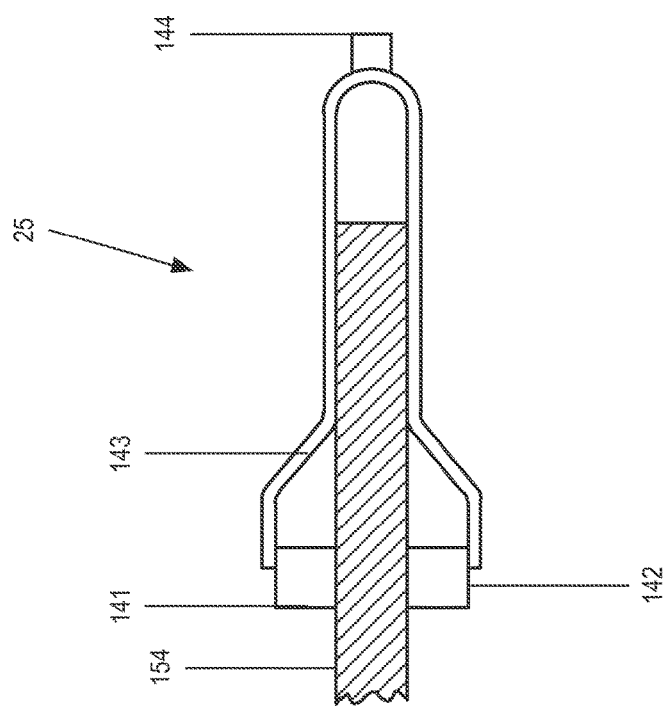
FIG. 12D
FIG. 12C

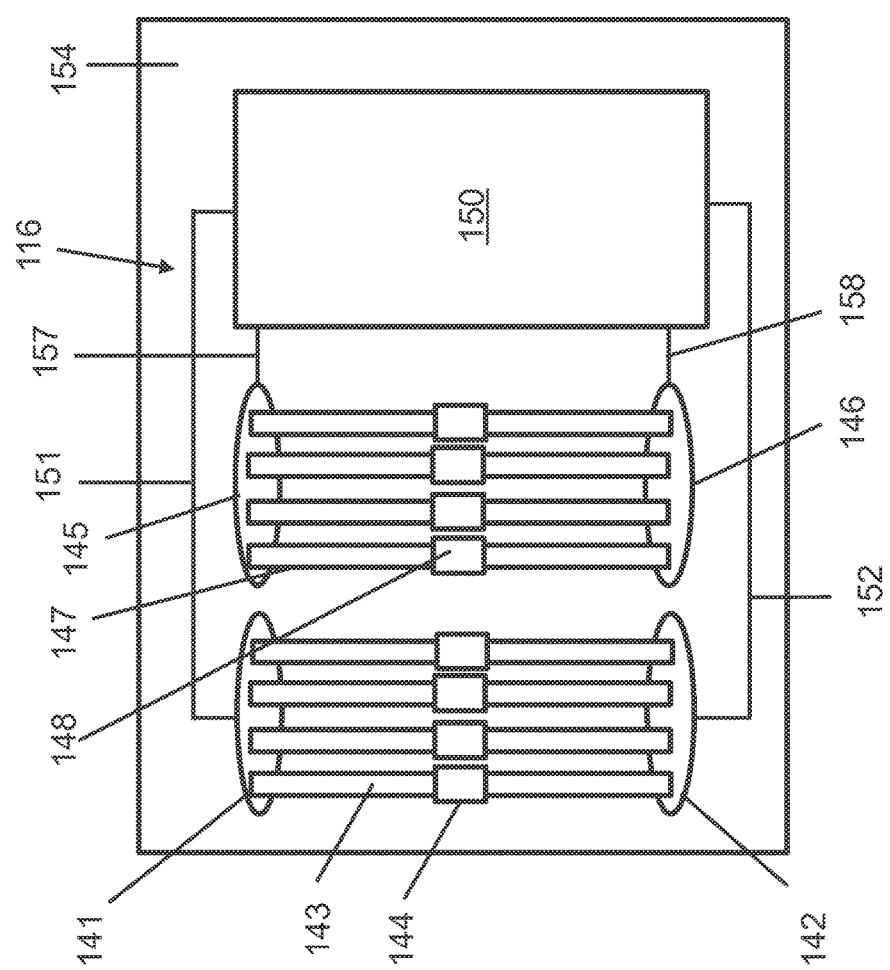

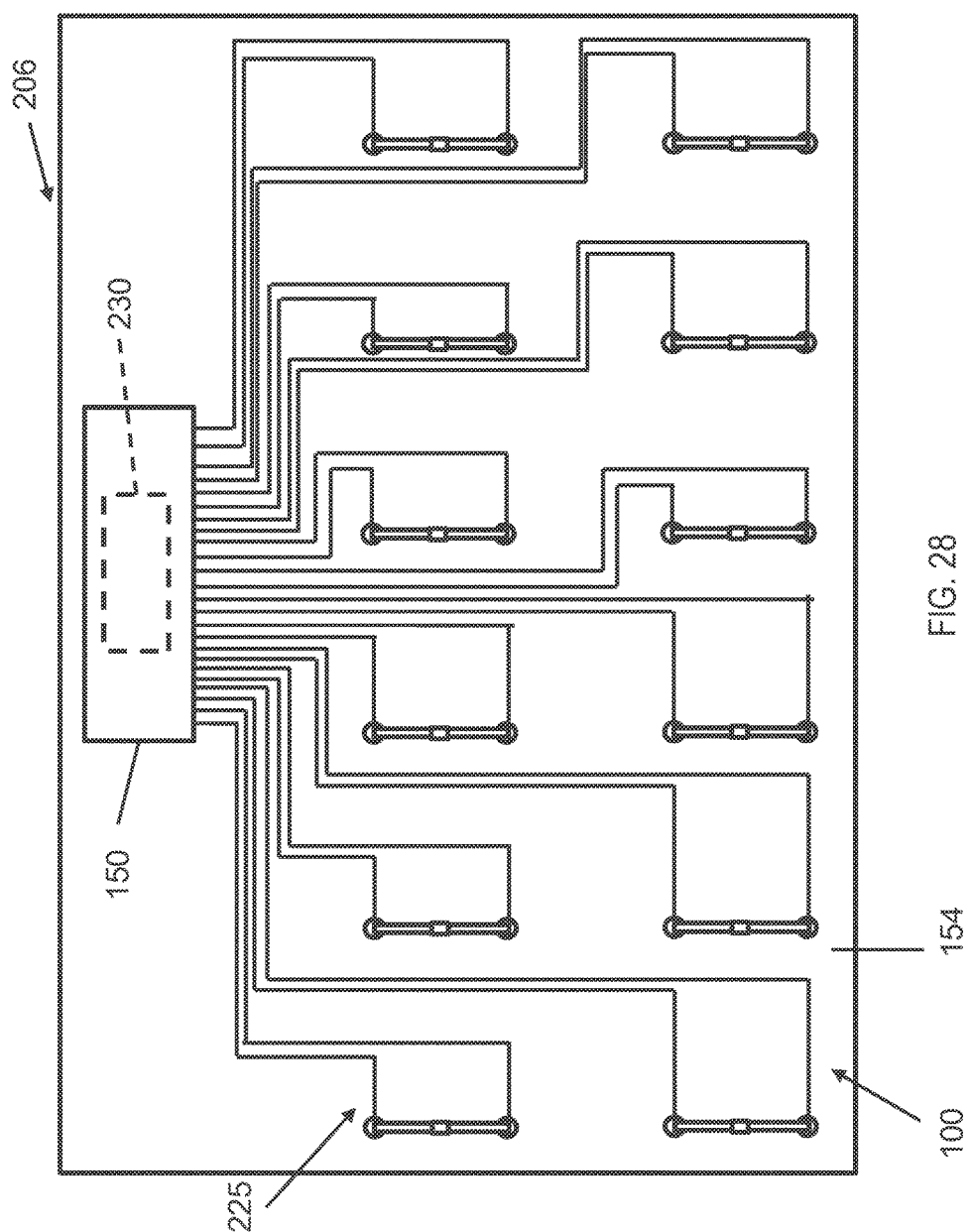

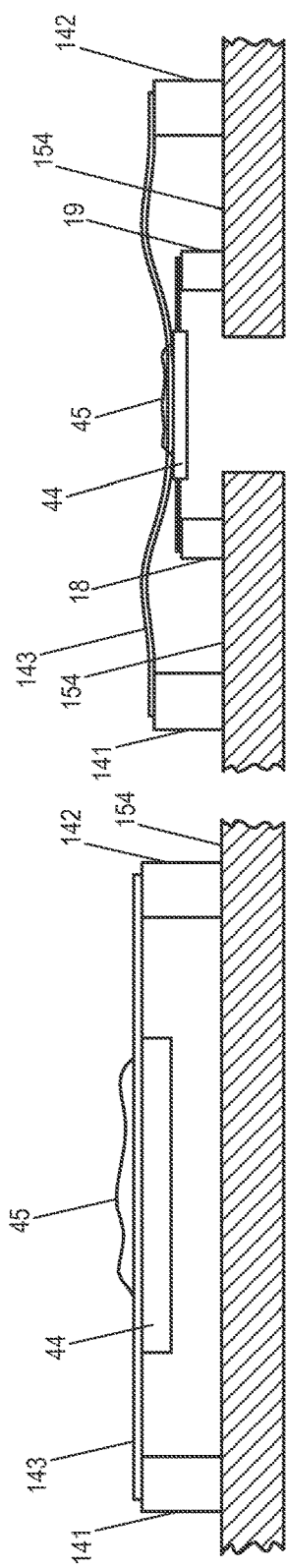

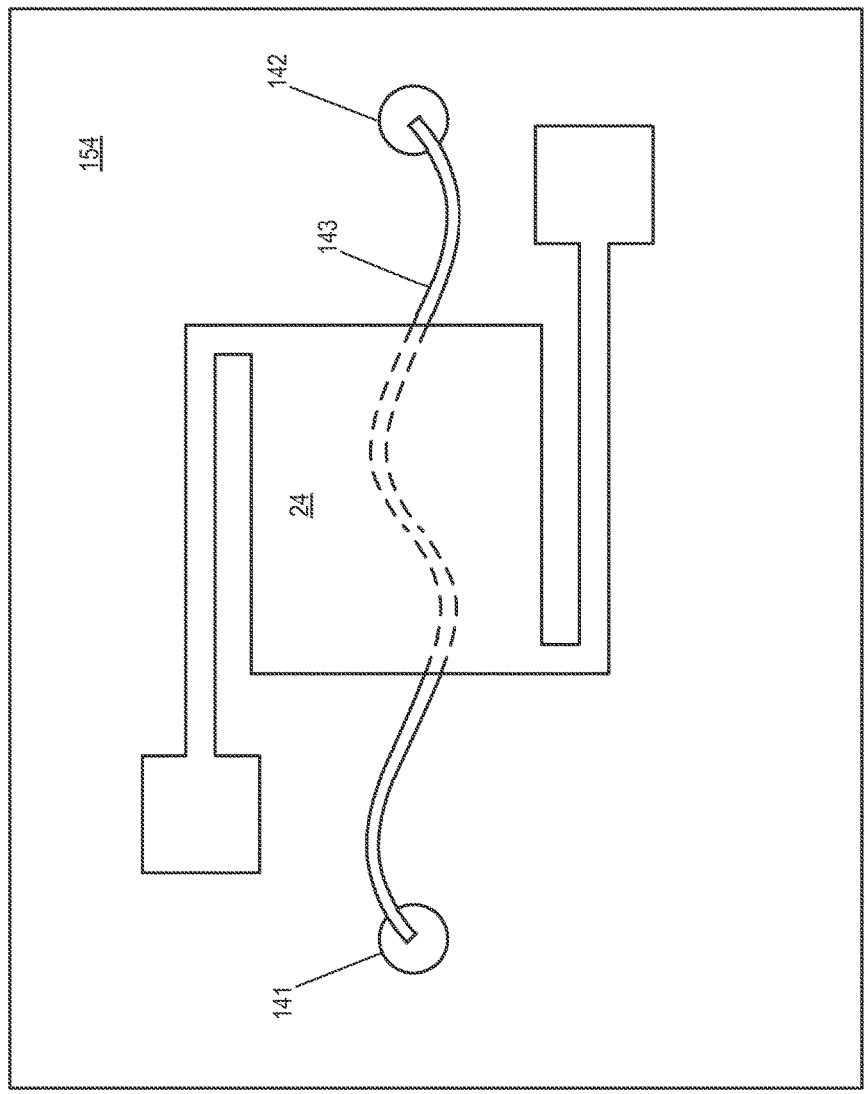

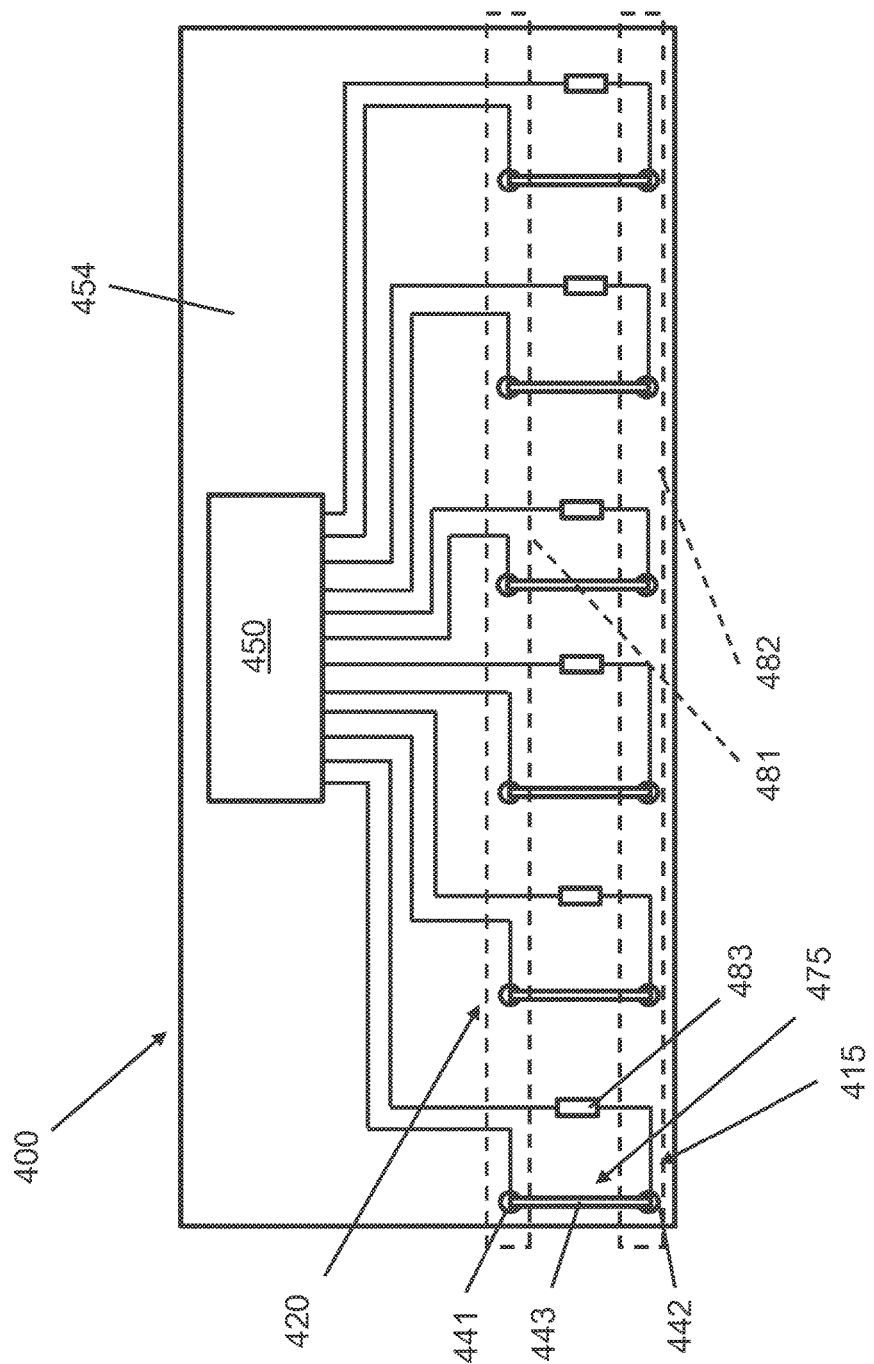

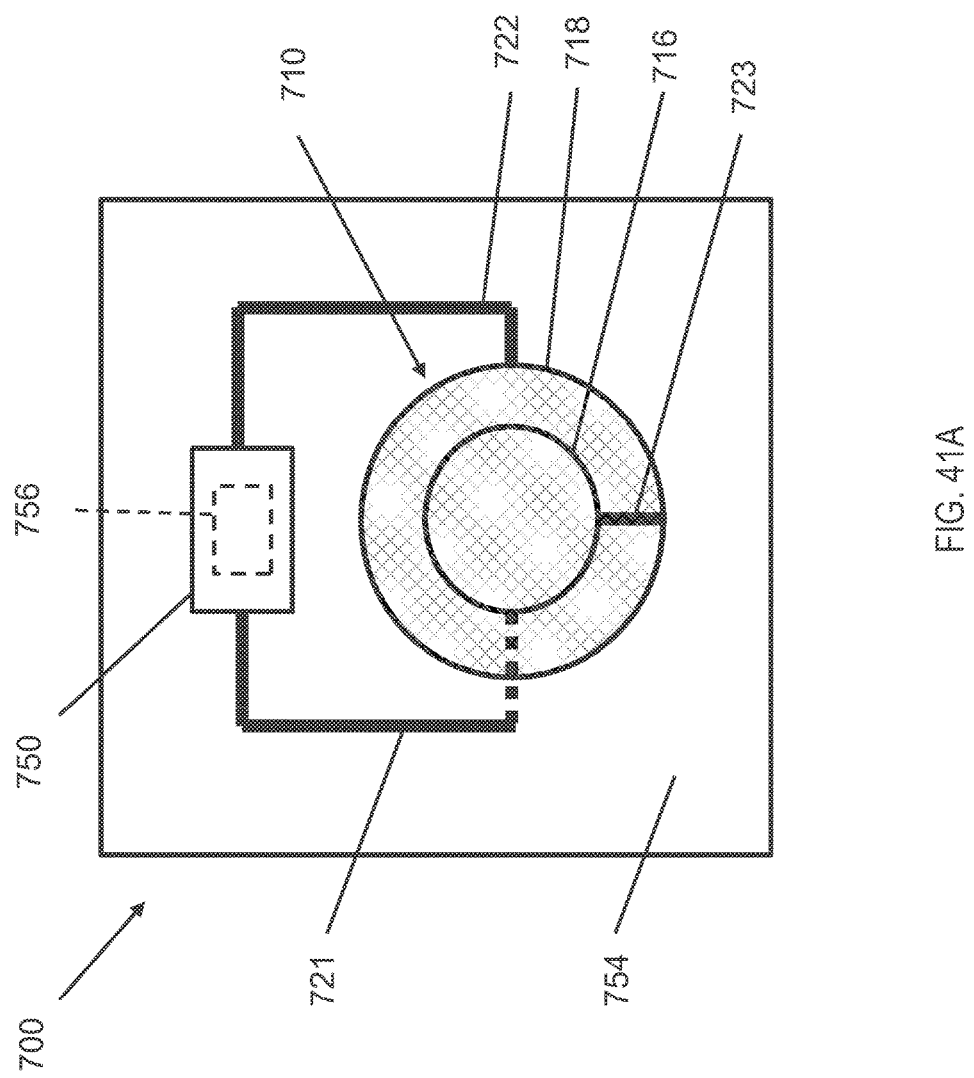

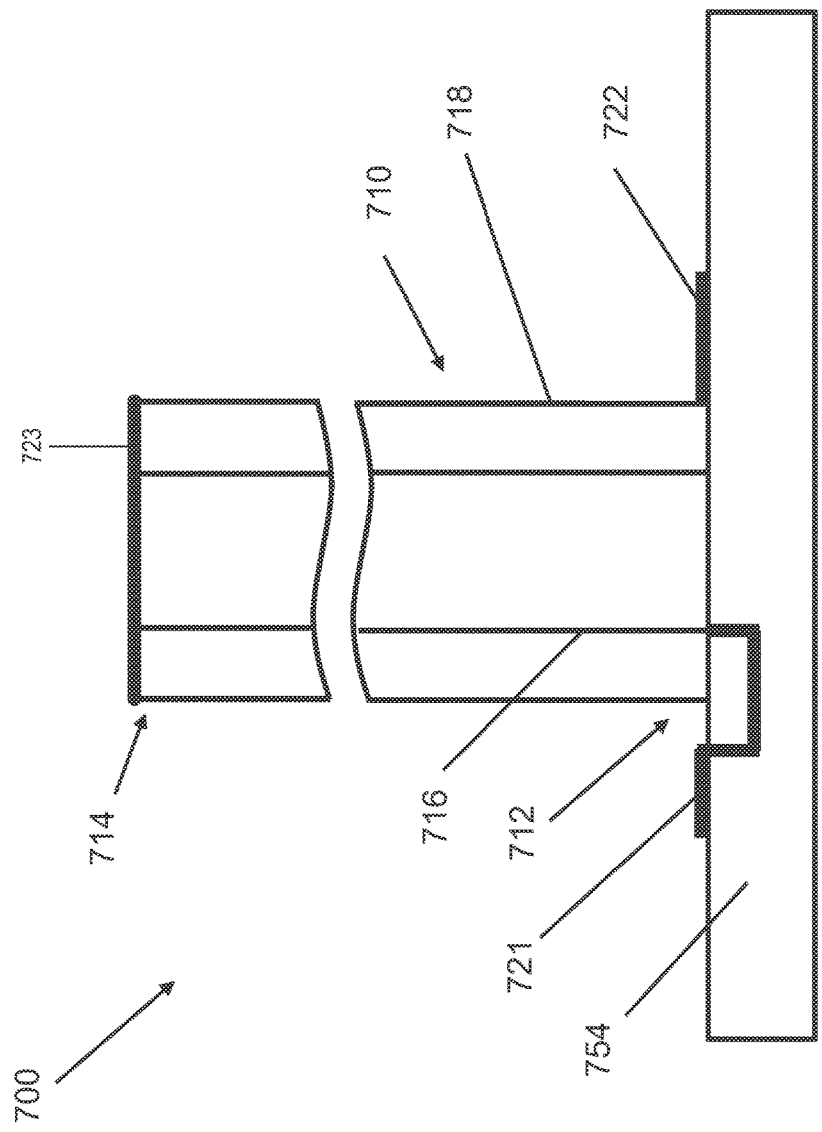

NANOSTRUCTURE SENSORS AND SENSING SYSTEMS

BACKGROUND

The present disclosure relates generally to sensors, including, for example, sensors commonly known as calorimetric sensors or sensors commonly known as bolometric sensors, and methods for fabricating the sensors.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which:

FIG. 1A is a side elevation view of an embodiment of a calorimetric sensor that includes a nanotube oriented between a pair of electrical contacts;

FIG. 1B is a plan view of the calorimetric sensor of FIG. 1A;

FIG. 10 is a plan view of another embodiment of a calorimetric sensor that includes a plurality of nanotubes oriented between a pair of electrical contacts;

FIG. 11 is a plan view of another embodiment of a calorimetric sensor that includes a plurality of nanotubes oriented between a pair of electrical contacts, wherein each nanotube supports a plurality of reaction sites;

FIG. 12C is an elevation view of another embodiment of a calorimetric sensor with a nanotube extending around an edge of a substrate and a reaction site positioned off of the substrate;

FIG. 12D is an elevation view of another embodiment of a calorimetric sensor with a nanotube and a reaction site extending off of an edge of a substrate;

FIG. 20A is a plan view of another embodiment of a calorimetric sensor that includes multiple pairs of electrical contacts coupled with a circuit, with each pair of electrical contacts including multiple nanotubes oriented between them;

FIG. 28 is a plan view of another embodiment of a system that includes an array of calorimetric sensors;

FIG. 29A is an elevation view of an embodiment of a sensor that includes a nanotube coupled with a thermal member;

FIG. 29B is an elevation view of an embodiment of a calorimetric sensor that includes a nanotube coupled with an isolated thermal member;

FIG. 29C is a plan view of a nanotube coupled with an isolated thermal member;

FIG. 30 is a plan view of an embodiment of a sensor that includes an embodiment of a one-dimensional array of heating and/or sensing elements;

FIG. 41A is a plan view of the thermal device of FIG. 41B;

FIG. 41B is a cross-sectional view of an embodiment of a thermal device that includes a multi-wall nanotube coupled with a substrate;

DETAILED DESCRIPTION

Figure 1D:
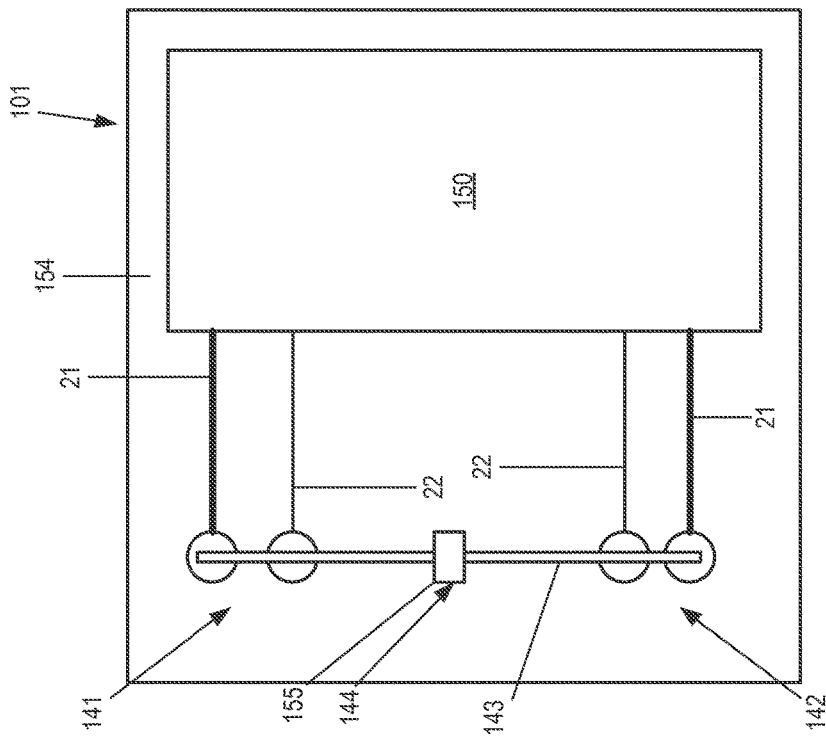
FIG. 1D is a plan view of a calorimetric sensor that includes separate current and voltage contacts.

The drawings herein are not necessarily to scale, unless specifically indicated, and are generally shown as schematic depictions. Accordingly, in many instances, relative dimensions may be inaccurately depicted for the sake of convenience.

With reference to FIGS. 1A and 1B, in certain embodiments, a calorimetric sensor 100 can include a first electrical contact 141, a second electrical contact 142 spaced from the first electrical contact 141, and a first nanotube 143 oriented between the first and second electrical contacts. The term "calorimetric sensor" is used in its ordinary sense, and includes sensors that are configured to detect the presence of heating or cooling and/or to determine an amount of heating or cooling; such presence of heating or cooling and/or determination of an amount of heating or cooling may be relative to, for example, a chemical reaction, a physical change, etc.

The nanotube 143 can be oriented between the first and second electrical contacts in any suitable manner, such as those discussed below. For example, in some embodiments, opposite ends of the nanotube 143 can be attached to the first and second electrical contacts 141, 142, respectively, and the nanotube 143 can extend between the contacts. In some embodiments, the nanotube 143 is taut. In other embodiments, the nanotube 143 may be slack. In some embodiments, the nanotube 143 can be electrically coupled with each of the first and second electrical contacts 141, 142. Suitable methods for orienting the nanotube 143 between the first and second electrical contacts 141, 142 are also described below.

The calorimetric sensor 100 can further include a first reaction site 144 for a first chemical or biological reaction. The reaction site 144 can be supported by the nanotube in any suitable manner, such as those discussed below.

The calorimetric sensor 100 can further include a circuit 150 coupled with the first and second electrical contacts 141, 142 in any suitable manner, such as via a pair of electrical leads 151, 152. The circuit 150 can be configured to detect a first thermal change of the reaction site 144 due to the chemical or biological reaction based on an effect of the thermal change on the nanotube 143.

In certain embodiments, the nanotube 143 can comprise a carbon nanotube. In other embodiments, the nanotube 143 can comprise an inorganic nanotube. In various embodiments, the nanotube 143 can comprise a single-walled nanotube or a multi-walled nanotube. For example, in some embodiments, the nanotube 143 can comprise two or more walls. As used herein, the term "nanotube" is to be understood and as being one or more of a singled-walled carbon nanotube, a multi-walled carbon nanotube, nanotubes made of other materials (e.g., BN), a nanotube mesh, a nanotube yard, one or more layers of graphene in any configuration (e.g., flat, cured, conformal, rolled, etc.), a conductive nanotube, a non-conductive nanotube, a semi-conductive nanotube. Nanotubes as described herein may generally carry a current and have a non-zero and non-infinite resistance.

Figure 2:
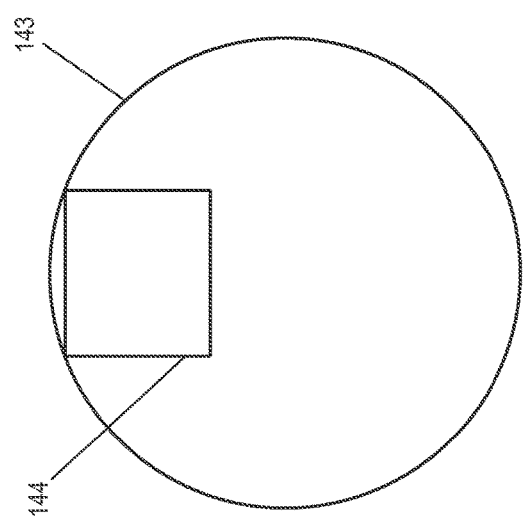
FIG. 2 is lateral cross-section of an embodiment of a nanotube that includes a reaction site.

In certain embodiments, the nanotube 143 is functionalized to support the reaction site 144. For example, in some embodiments, the nanotube 143 is exohedrally functionalized. The reaction site 144 can be at an exterior of the nanotube, as illustrated in FIGS. 1A and 1B. In some embodiments, the nanotube is endohedrally functionalized. The reaction site 144 can be at an interior of the nanotube 143, as schematically illustrated via the lateral cross-section depicted in FIG. 2.

Figure 1C:
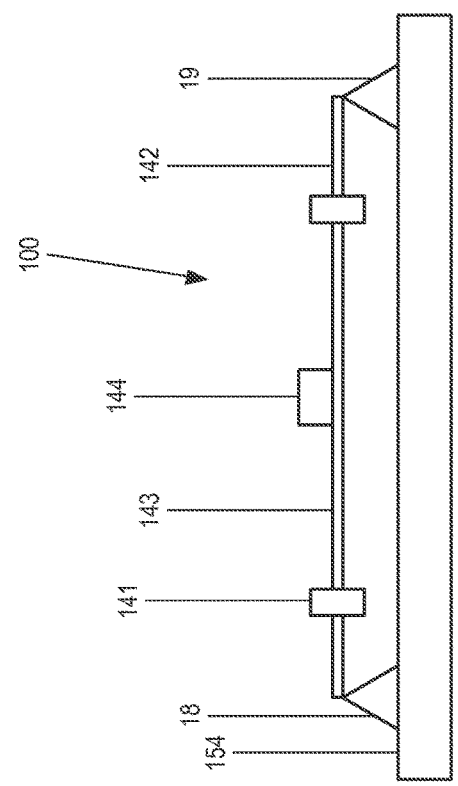
FIG. 1C is a side elevation view of another embodiment of a calorimetric sensor that includes a nanotube oriented between a pair of electrical contacts and supported by mechanical supports.

As illustrated in FIG. 1C, one or more mechanical supports 18, 19 may be independent from the electrical contacts 141, 142. For instance, triangular mechanical supports 18,19 may support the nanotube 143 independent of the electrical contacts 141, 142. Any of a wide variety of mechanical supports 18, 19, including various sizes, shapes, materials, and/or heights, may be utilized in conjunction with any of the various embodiments of calorimetric sensors described herein (e.g., calorimetric sensor 100).

FIG. 1D is a plan view of a calorimetric sensor that includes separate current and voltage sources. As illustrated, in certain embodiments the calorimetric system may utilize a four-wire configuration for independently passing current through the nanotube 143 and measuring a voltage across the nanotube 143. For example, a first set of wires 21 might be used for passing current through the nanotube 143 and a second set of wires 22 may be used for measuring voltage. The four-wire configuration may increase sensitivity to changes in the properties of the nanotube, and/or reduce sensitivity to changes in the properties of the connecting wires, contacts, substrate, etc. Although many electrical connections throughout the drawings are shown as two-wire configurations for ease of illustration, it should be understood that other embodiments can instead include a four-wire configuration, such as, for example, the four-wire configuration of FIG. 1D or 5. Either two-wire or four-wire measurements may be made using DC, pulsed DC, AC, or other current waveform. In particular, a DC signal may be used to measure the resistance of the nanotube while an AC signal is used to heat the nanotube or to measure the resistance of other portions of the sensing circuit, or vice versa.

Figure 3:
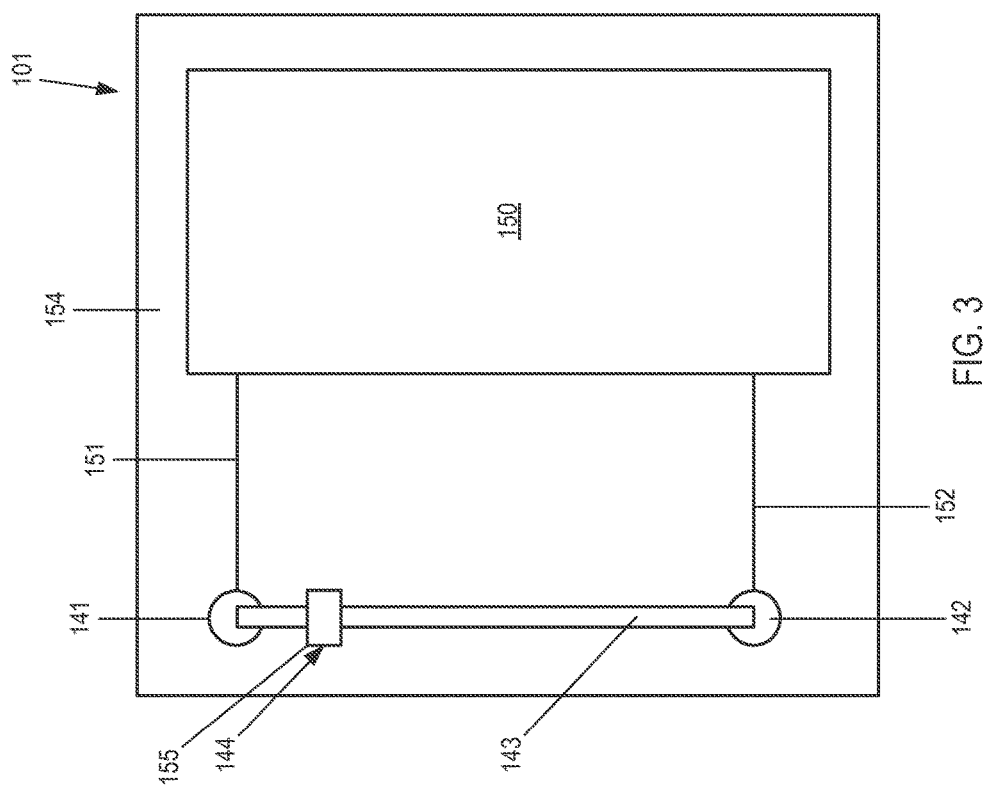
FIG. 3 is a plan view of another embodiment of a calorimetric sensor that includes a reaction site positioned at an end of a nanotube.
Figure 4:
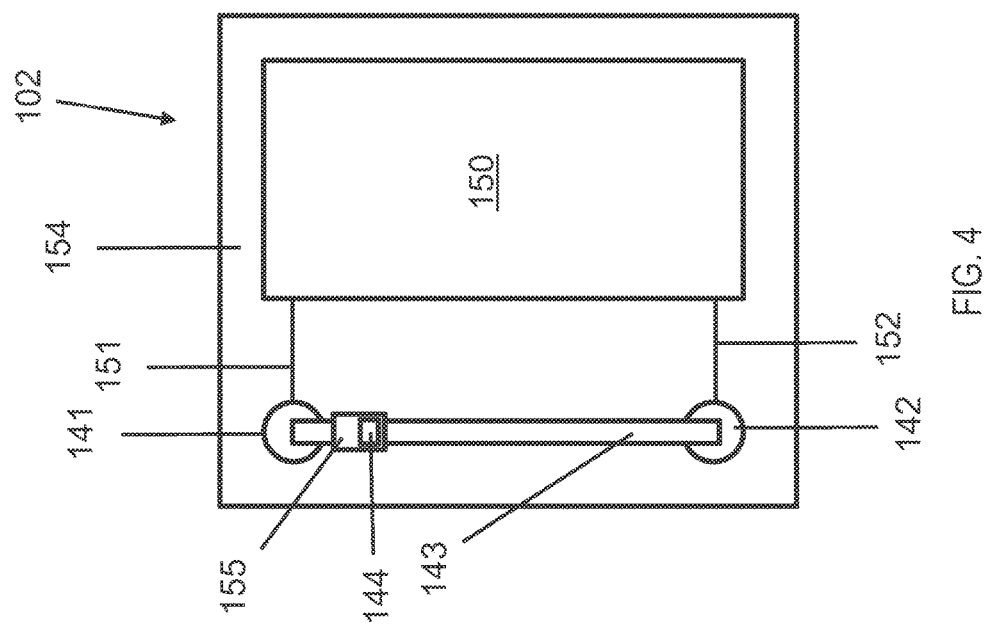
FIG. 4 is a plan view of another embodiment of a calorimetric sensor that includes a reaction site attached to a functional group.

In some embodiments, such as in the calorimetric sensor 101 schematically depicted in FIG. 3, a functional group 155 is attached to an end of the nanotube 143. In further embodiments, the reaction site 144 can be defined by the functional group 155. In still further embodiments, the reaction site 144 is attached to the functional group 155, as schematically depicted in the calorimetric sensor 102 of FIG. 4.

Figure 5:
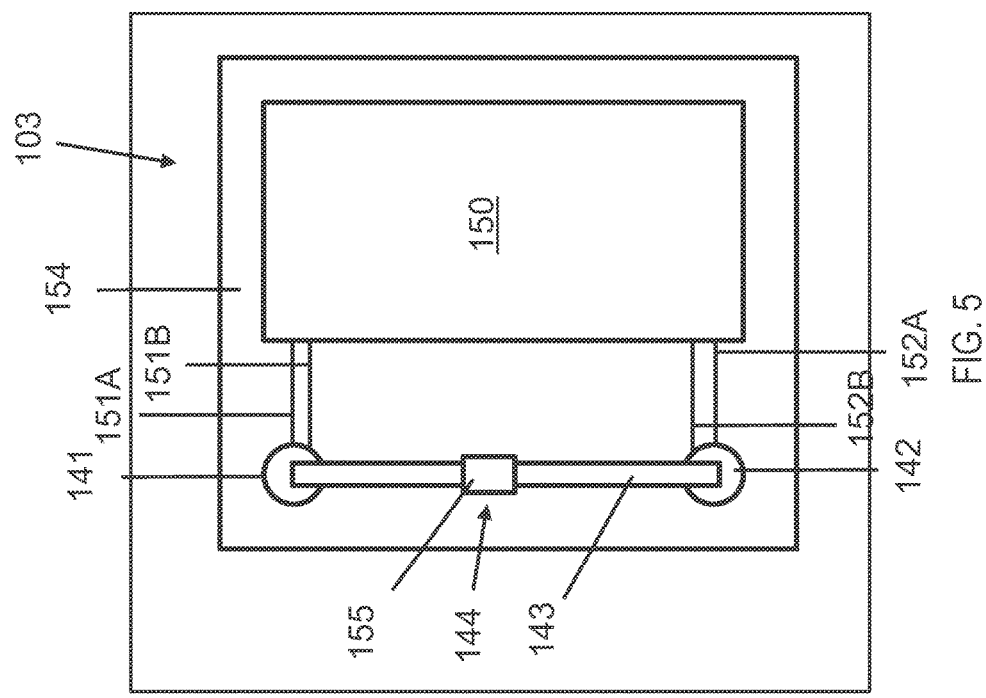
FIG. 5 is a plan view of another embodiment of a calorimetric sensor for which a functional group defines a reaction site.
Figure 6:
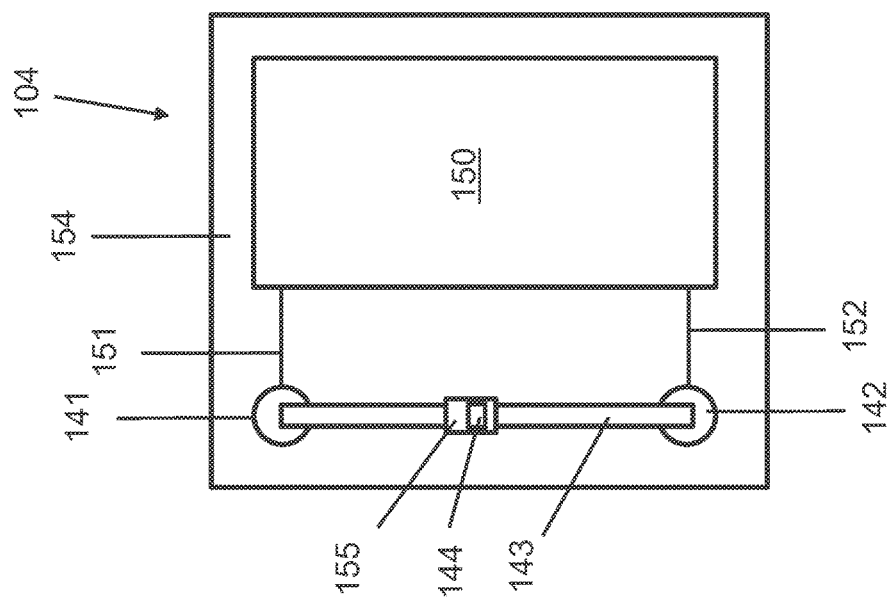
FIG. 6 is a plan view of another embodiment of a calorimetric sensor.

In some embodiments, a functional group 155 is attached to a sidewall of the nanotube 143, as depicted in the calorimetric sensor 103 of FIG. 5. In further embodiments, the reaction site 144 is defined by the functional group 155. In still further embodiments, such as in the calorimetric sensor 104 schematically depicted in FIG. 6, the reaction site 144 is attached to the functional group.

With reference to FIG. 5, certain embodiments may utilize a four-wire configuration for independently passing current through the nanotube 143 and measuring a voltage across the nanotube 143. For example, a first set of wires 151A, 152A might be used for passing current through the nanotube 143 and a second set of wires 151B, 152B may be used for measuring voltage. The four-wire configuration can increase sensitivity. Although many electrical connections throughout the drawings are shown as two-wire configurations for ease of illustration, it should be understood that other embodiments can instead include a four-wire configuration, such as, for example, the four-wire configuration of FIG. 5.

In some embodiments, the reaction site 144 is covalently boded to the nanotube 143, such as, for example, in an arrangement such as that depicted in FIG. 1B. In other embodiments, the reaction site 144 is attached to a functional group 155 that is covalently boded to the nanotube, such as, for example, in an arrangement such as that depicted in FIG. 4 or FIG. 6. In still other embodiments, the reaction site 144 is noncovalently bonded to the nanotube 143. Any of the foregoing arrangements can be formed in any suitable manner, as discussed further below.

In some embodiments, one or more polymers 149 are oriented about an exterior of the nanotube 143. For example, the one or more polymers 149 may be positioned about the nanotube 143 in a helical arrangement, such as that schematically depicted in FIG. 7. In some embodiments, the one or more polymers 149 are not chemically bonded to the nanotube 143, but rather, are physically or mechanically attached to the nanotube 143. Other suitable arrangements are also contemplated. In further embodiments, the reaction site 144 is defined by the one or more polymers 149. In other embodiments, the reaction site 144 is attached to the one or more polymers 149, such as schematically illustrated in FIG. 8.

In certain embodiments, the nanotube 143 is derivatized and/or functionalized to support the reaction site 144. In some embodiments, the reaction site 144 comprises an atom configured to chemically interact with a target material. In some embodiments, the reaction site 144 comprises a molecule configured to chemically interact with a target material. In certain of such embodiments, the molecule comprises a polymer.

In some embodiments, the reaction site 144 comprises a biological element configured to interact with an analyte. In various of such embodiments, the biological element comprises one or more of an enzyme, an antibody, an antigen, a nucleic acid, a protein, a cell receptor, an organelle, a microorganism, a tissue, a biologically derived material, or a biomimic/biomimetic component.

Figure 9:
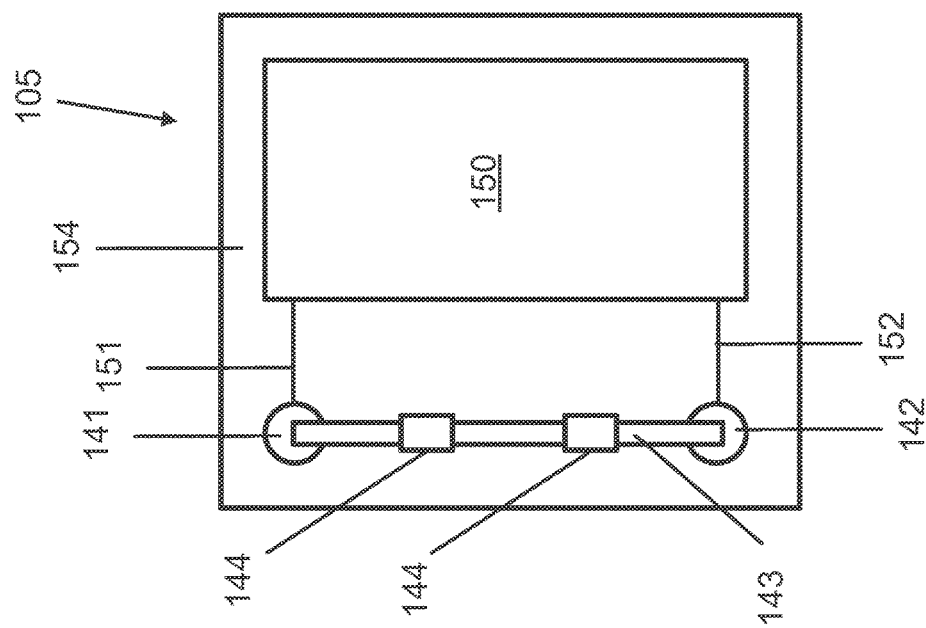
FIG. 9 is a plan view of another embodiment of a calorimetric sensor that includes a nanotube that supports multiple reaction sites.

In some embodiments, a calorimetric sensor 105 includes one or more additional reaction sites 144 that are each for a chemical or biological reaction are supported by the nanotube 143, as shown in FIG. 9. In certain embodiments, the circuit 150 is configured to detect a thermal change of one or more of the reaction sites 144 that are supported by the nanotube 143 due to the chemical or biological reaction at each of the one or more of the reaction sites. In the illustrated embodiment, the nanotube 143 supports two reaction sites 144. In further embodiments, the nanotube 143 can support more than two, more than three, more than four, etc. reaction sites 144.

With reference to FIG. 10, in some embodiments, a calorimetric sensor 106 includes a plurality of nanotubes 143 (e.g., two or more, three, four, five, 10, 50, 100, 500, 1,000, or more nanotubes) that are oriented between the first and second electrical contacts 141, 142. Each of the nanotubes can be electrically coupled with each of the first and second electrical contacts 141, 142. The calorimetric sensor 106 can include a plurality of reaction sites 144 (e.g., two or more, three or more, four or more reaction sites) for a chemical or biological reaction. Each of the reaction sites can be supported by one of the nanotubes 143.

The circuit 150 can be configured to detect a thermal change of any of the reaction sites 144 supported by any of the nanotubes 143 due to one or more chemical or biological reactions at one or more of the reaction sites 144 based on an effect of the thermal change on any of the nanotubes 143.

With reference to FIG. 11, in some embodiments of a calorimetric sensor 107, one or more of the plurality of nanotubes 143 each supports a plurality of reaction sites 144 that are each for a chemical or biological reaction.

Figure 12B:
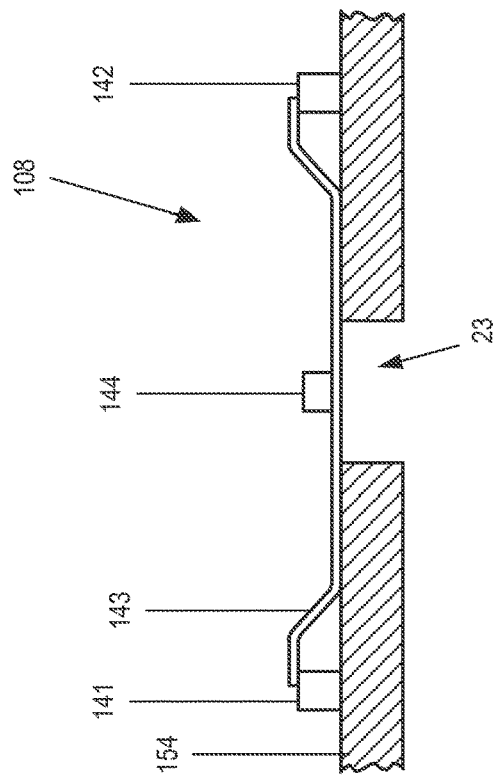
FIG. 12B is an elevation view of another embodiment of a calorimetric sensor that includes a substrate with a gap near a reaction site.
Figure 12A:
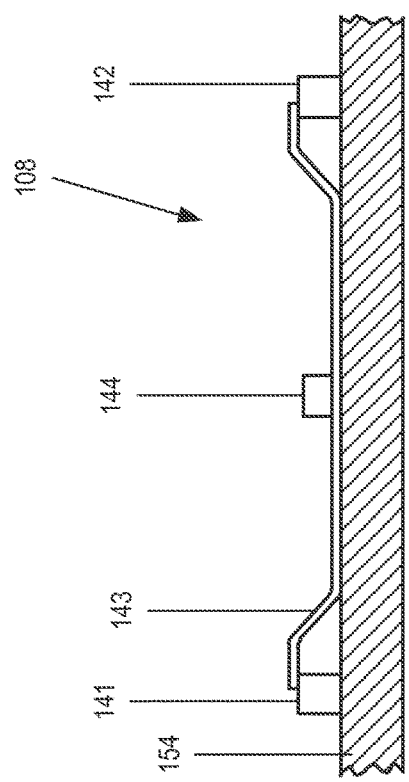
FIG. 12A is an elevation view of another embodiment of a calorimetric sensor that includes a substrate, wherein a portion of a nanotube contacts and is supported at least in part by the substrate.

With reference again to FIGS. 1A and 1B, in some embodiments, a nanotube 143 is suspended between the first and second electrical contacts 141, 142 in spaced relation from other portions of the calorimetric sensor 100. With reference to FIGS. 12A and 12B, in some embodiments, a calorimetric sensor 108 includes a substrate 154. In further embodiments, the nanotube 143 contacts and is supported at least in part by the substrate 154 at a position between the first and second electrical contacts 141, 142. In various embodiments, the substrate comprises one or more of silicon, $SiO_2$, SiNx, GaAs, GaN, plastic, or paper. As shown in FIG. 12B, in some embodiments, substantially all of the nanotube 143 may be supported by the electrical contacts 141, 142 and/or the substrate 154, except for in the vicinity of the reaction site 144. For example, in the illustrated embodiment, the nanotube 143 is suspended over a cavity 23 in the substrate 154. Such an arrangement may increase the sensitivity of the system, as heat from a reaction at the reaction site 144 is not dissipated into the substrate 154.

FIG. 12C is an elevation view of another embodiment of a calorimetric sensor 25 with a nanotube 143 extending around an edge of a substrate 154 and a reaction site 144 positioned off of the substrate 154. The nanotube 143 may contact and/or supported at least in part by the substrate 154 at a position between the first and second electrical contacts 141, 142.

FIG. 12D is an elevation view of another embodiment of a calorimetric sensor 26 with a nanotube 143 and a reaction site 144 extending off of an edge of the substrate 154. The nanotube 143 may contact and/or supported at least in part by the substrate 154 at a position between the first and second electrical contacts 141, 142.

Figure 12E:
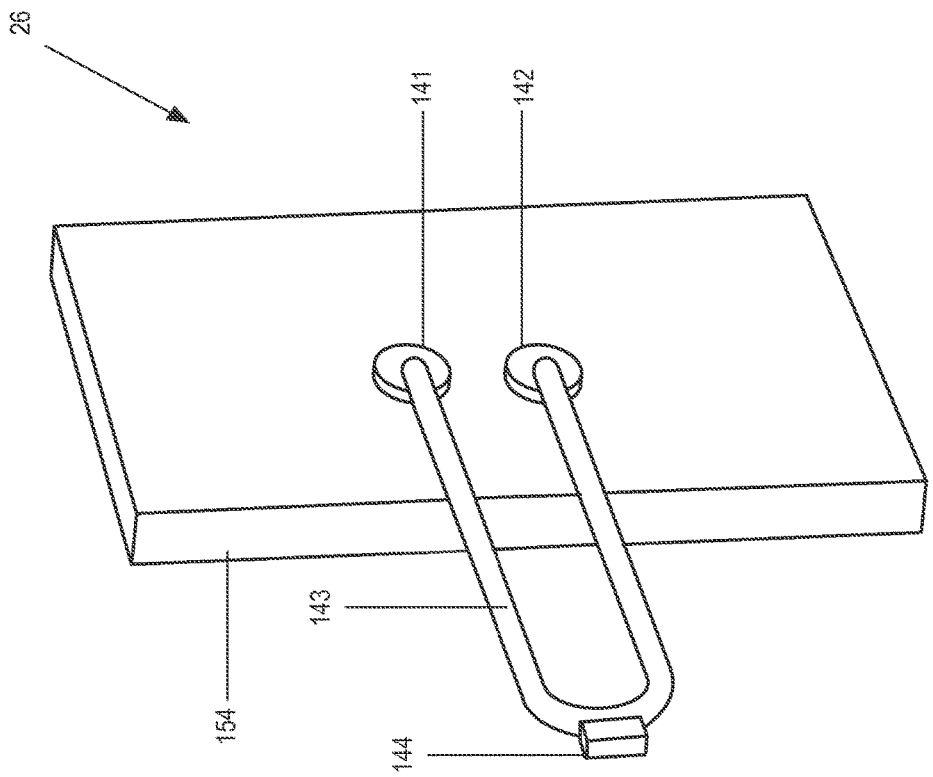
FIG. 12E is an embodiment of a perspective view of the calorimetric sensor of FIG. 12D.

FIG. 12E is an embodiment of a perspective view of the calorimetric sensor 26 of FIG. 12D. As illustrated, the nanotube 143 and reaction site 144 may extend off the edge of the substrate 154. The nanotube 143 may contact and/or supported at least in part by the substrate 154 at a position between the first and second electrical contacts 141, 142.

In various embodiments of the sensors described above, a thermal change of the reaction site 144 comprises an absorption of heat by the chemical or biological reaction. In other embodiments, the thermal change comprises a release of heat by the chemical or biological reaction. In some embodiments, the effect of the thermal change on the nanotube 143 comprises a change in a resistance of the nanotube 143 due to a change in temperature of the nanotube 143, whether that change is an increase in temperature or a decrease in temperature.

In some embodiments, the circuit 150 is configured to determine a magnitude of the change in the resistance of the nanotube 143 based on a change in voltage across the first and second electrical contacts 141, 142. In some embodiments, the circuit 150 is configured to determine whether or not a chemical or biological reaction at the reaction site 144 occurs by determining whether or not a voltage across the first and second electrical contacts 141, 142 changes.

In some embodiments, the circuit 150 is configured to determine a magnitude of the change in the resistance of the nanotube 143 based on a change in current passing through the nanotube 143. In some embodiments, the circuit 150 is configured to determine whether or not a chemical or biological reaction at the reaction site 144 occurs by determining whether or not a current passing through the nanotube 143 changes.

In some embodiments, the circuit 150 is configured to determine a magnitude of the change in resistance of the nanotube 143 based on a change in power dissipated in the circuit 150. In some embodiments, the circuit 150 is configured to determine whether or not a chemical or biological reaction at the reaction site 144 occurs by determining whether or not a level of power dissipated in the circuit 150 changes.

Figure 13A:
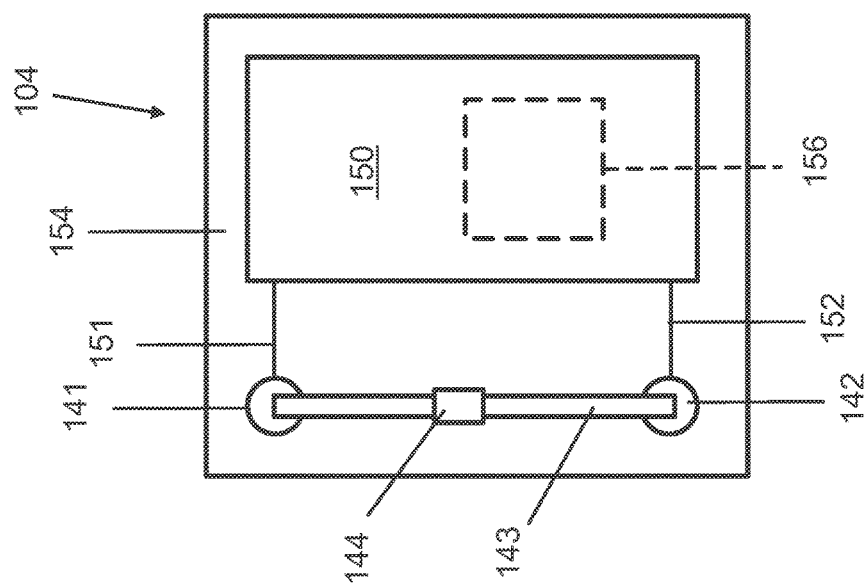
FIG. 13A is a plan view of another embodiment of a calorimetric sensor that includes a feedback circuit.

In certain embodiments, the circuit 150 is configured to counteract a change in the resistance of the nanotube 143 so as to maintain the nanotube 143 at a constant resistance. With reference to FIG. 13A, in some embodiments, a calorimetric sensor 109 includes a circuit 150 that has a feedback circuit 156 that is configured to counteract a change in the resistance of the nanotube 143 by controlling a current within the feedback circuit 156. In certain embodiments, a magnitude of the thermal change of the reaction is detected via a magnitude of a change in the current used to maintain the nanotube 143 at the constant resistance.

In some embodiments, the circuit 150 is configured to maintain a constant voltage across the nanotube 143. In further embodiments, changes in the circuit 150 that aid in maintaining the constant voltage are used to determine whether or not a chemical or biological reaction occurs at the reaction site 144. In some embodiments, changes in the circuit 150 that aid in maintaining the constant voltage are used to determine a magnitude of a chemical or biological reaction at the reaction site 144.

In some embodiments, the circuit 150 is configured to pass a constant current through the nanotube 143. In certain of such embodiments, changes in the circuit 150 that aid in maintaining the constant current are used to determine whether or not a chemical or biological reaction occurs at the reaction site 144. In some embodiments, changes in the circuit 150 that aid in maintaining the constant current are used to determine a magnitude of a chemical or biological reaction at the reaction site 144.

In some embodiments, the circuit 150 is configured to dissipate a constant power. In certain of such embodiments, changes in the circuit 150 that aid in maintaining the constant power are used to determine whether or not a chemical or biological reaction occurs at the reaction site 144. In some embodiments, changes in the circuit 150 that aid in maintaining the constant power are used to determine a magnitude of a chemical or biological reaction at the reaction site 144.

Figure 13B:
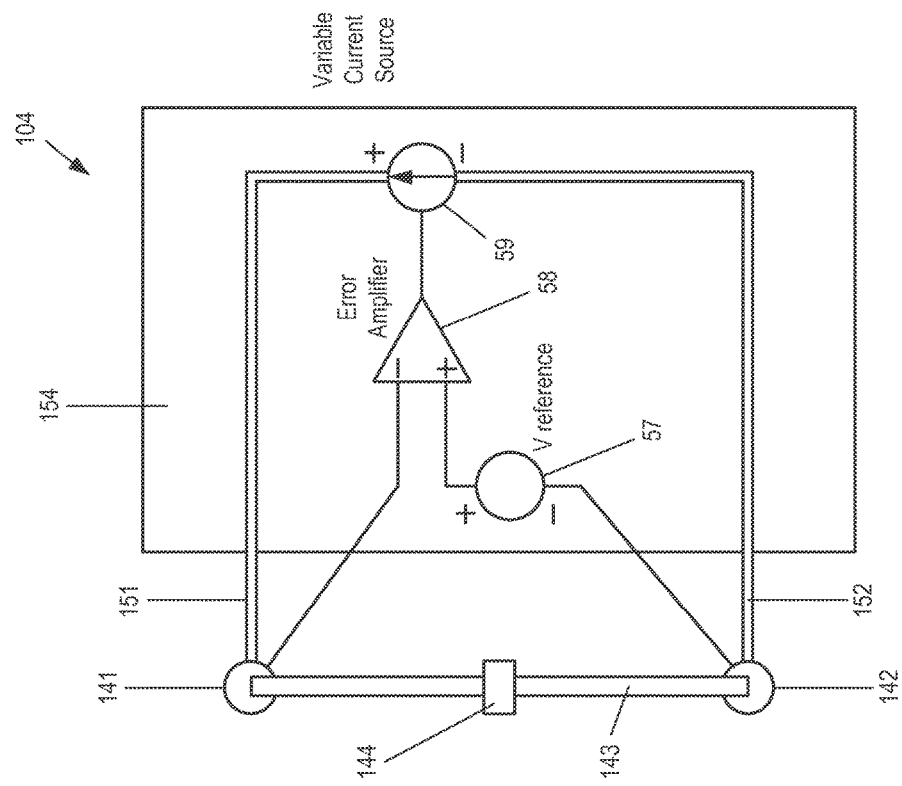
FIG. 13B is a plan view of another embodiment of a calorimetric sensor with a feedback circuit, including a current source and an amplifier.

FIG. 13B is a plan view of an embodiment of the calorimetric sensor 104 shown in FIG. 13A, in which the feedback circuit 156 is shown as including a voltage reference 57, an error amplifier 58, and a current source 59. Additional and/or alternative circuit components may be utilized in a feedback circuit 156.

Figure 14:
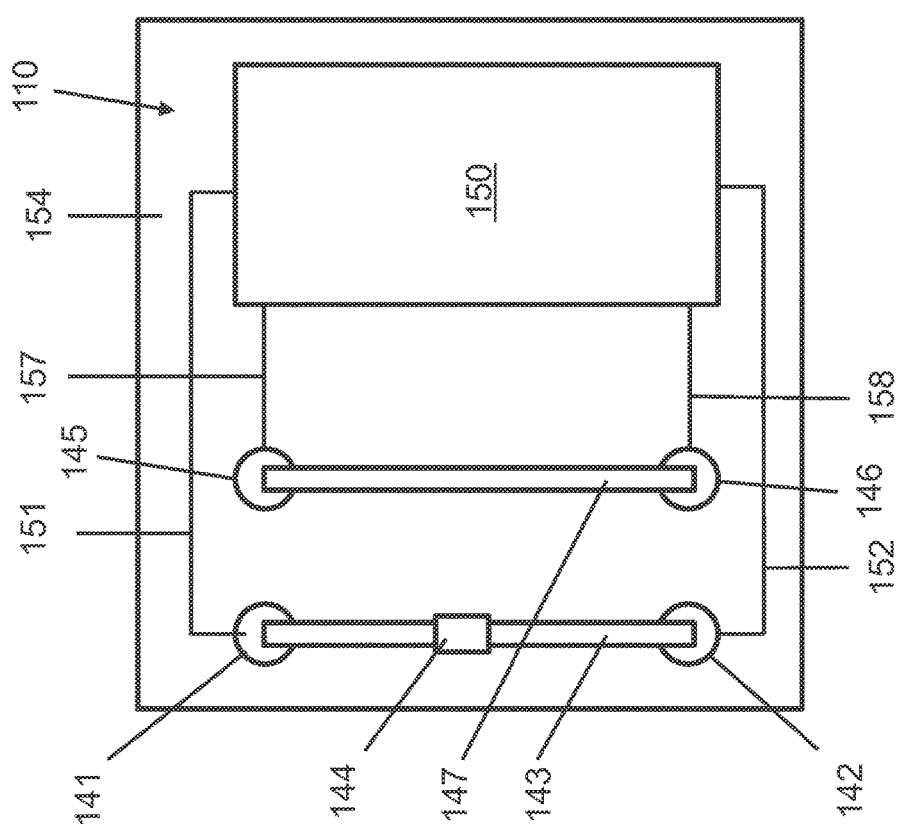
FIG. 14 is a plan view of an embodiment of a calorimetric sensor that includes multiple pairs of electrical contacts coupled with a circuit, with each pair of electrical contacts including a nanotube oriented between them.

With reference to FIG. 14, in some embodiments, a calorimetric sensor 110 includes a third electrical contact 145 and a fourth electrical contact 146 spaced from the third electrical contact 145. An additional or second nanotube 147 can be oriented between the third and fourth electrical contacts 145, 146. The second nanotube 147 can be electrically coupled with each of the third and fourth electrical contacts. The first and second nanotubes 143, 147 can comprise any suitable arrangement discussed herein. The first and second nanotubes 143, 147 can have the same arrangement or can have different arrangements. Although the embodiment depicted in FIG. 14 comprises two sets of nanotubes and electrical contacts, any suitable number of such sets of nanotubes and electrical contacts is contemplated (e.g., three, four, five, 10, 20, 30, 40, 50, 100, or more). In certain embodiments, the circuit 150 is coupled with each nanotube (e.g., 143, 147) via the electrical contacts (e.g., 141, 142, 146, 147), respectively.

In the illustrated embodiment, the circuit 150 is coupled with the electrical contacts 145, 156 via electrical leads 157, 158. In other embodiments, the electrical contacts 141, 142, 145, 146 can be omitted or replaced with non-conducting material, and the electrical leads 151, 152, 157, 158 can be connected to the nanotubes 143, 147 directly. Stated otherwise, the electrical leads 151, 152, 157, 158 may also be referred to as electrical contacts.

In some embodiments, the second nanotube 147 is devoid of any couplings to reaction sites for chemical or biological reactions of a variety that would be detectable via the first reaction site 144. In certain embodiments, the second nanotube 147 is non-functionalized.

Figure 15:
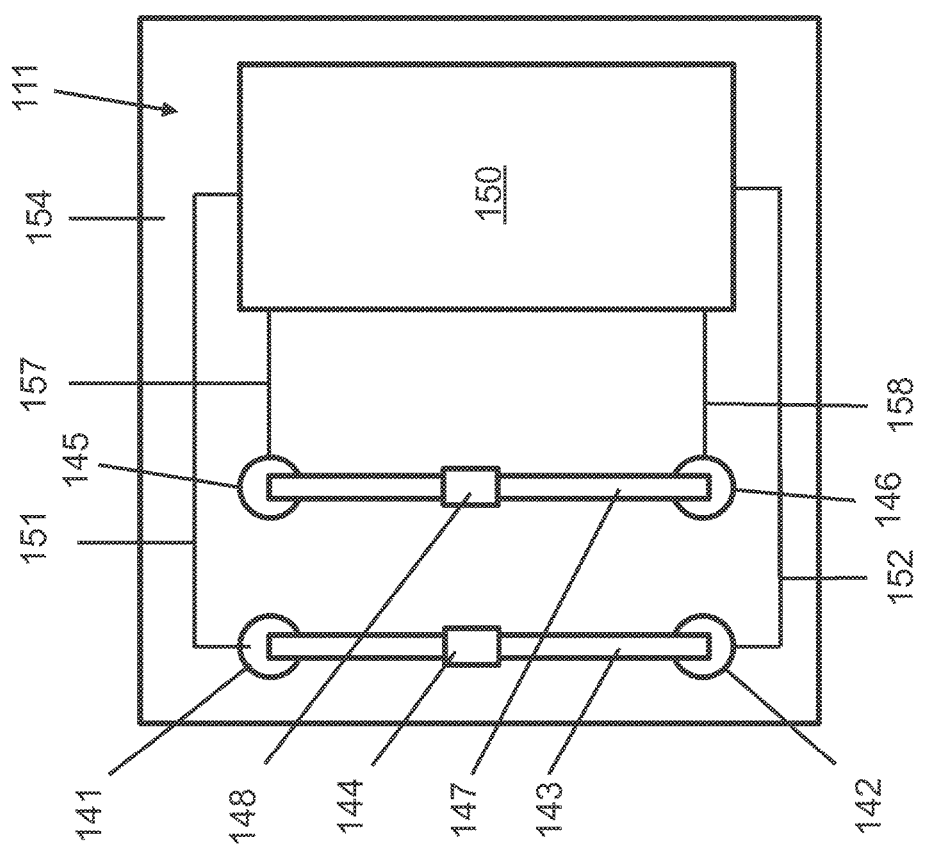
FIG. 15 is a plan view of another embodiment of a calorimetric sensor that includes multiple pairs of electrical contacts coupled with a circuit, with each pair of electrical contacts including a nanotube oriented between them.

With reference to FIG. 15, in some embodiments, a calorimetric sensor 111 includes a second nanotube 147 that is functionalized to support a second reaction site 148 for a second chemical or biological reaction. In some embodiments, the second reaction site is configured to be used to calibrate activity sensed via the first reaction site 144.

In certain embodiments of the calorimetric sensors 110, 111, the circuit 150 is configured to detect the thermal change of the first reaction site 144 based on a differential measurement of the first and second nanotubes 143, 147. In certain of such embodiments, the differential measurement compares a resistance of the first nanotube 143 with a resistance of the second nanotube 147. In some embodiments, the differential measurement compares a current flow through the first nanotube 143 with a current flow through the second nanotube 143. In some embodiments, the differential measurement compares a voltage across the first and second electrical contacts 141, 142 with a voltage across the third and fourth electrical contacts 145, 146.

In certain embodiments of the calorimetric sensors 110, 111, the circuit 150 is configured to counteract a change in a first resistance of the first nanotube 143 so as to maintain the first nanotube 143 at the first resistance and counteract a change in a second resistance of the second nanotube 147 so as to maintain the second nanotube 147 at the second resistance. In certain of such embodiments, the first resistance and the second resistance are the same prior to initiation of the chemical or biological reaction at the first reaction site 144. In some embodiments, the first resistance and the second resistance are different from each other prior to initiation of the chemical or biological reaction at the first reaction site 144.

Figure 16:
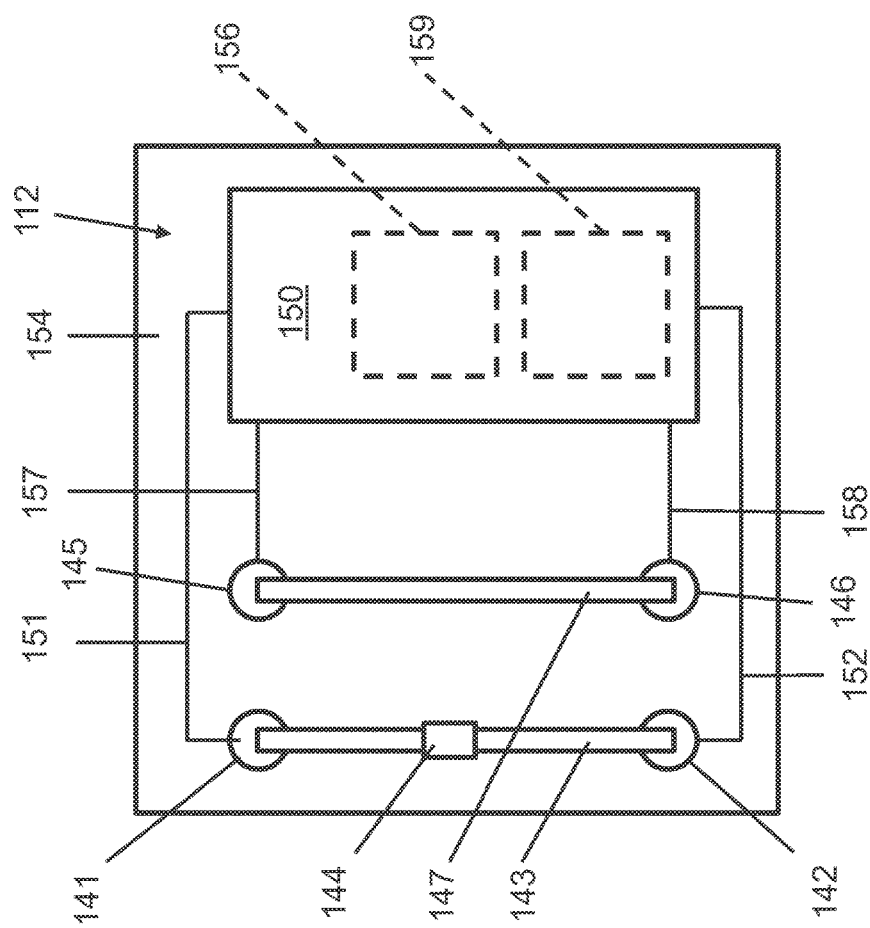
FIG. 16 is a plan view of another embodiment of a calorimetric sensor that includes multiple pairs of electrical contacts coupled with a circuit, with each pair of electrical contacts including a nanotube oriented between them.
Figure 17:
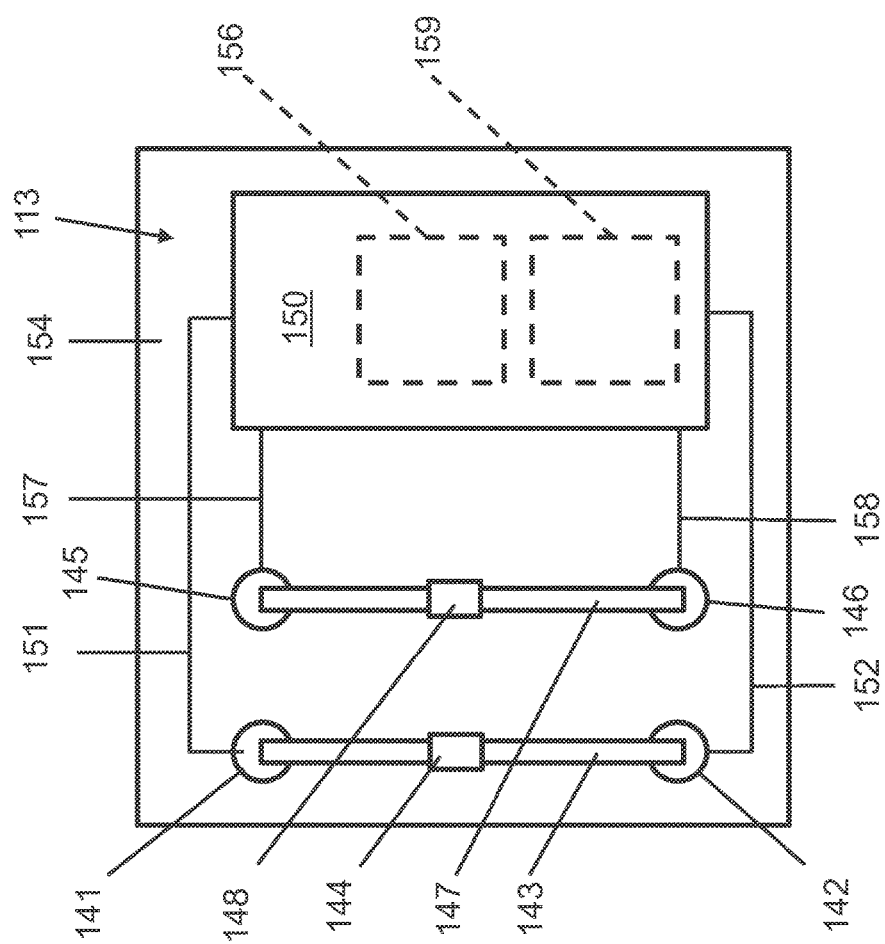
FIG. 17 is a plan view of another embodiment of a calorimetric sensor that includes multiple pairs of electrical contacts coupled with a circuit, with each pair of electrical contacts including a nanotube oriented between them.

With reference to FIGS. 16 and 17, in certain embodiments of calorimetric sensors 112, 113, which resemble the sensors 110, 111 described above in many respects, each circuit 150 includes a first feedback circuit 156 that is configured to counteract a change in the first resistance of the first nanotube 144 by controlling a first current within the first feedback circuit 156 and includes a second feedback circuit 159 that is configured to counteract a change in the second resistance of the second nanotube 147 by controlling a second current within the second feedback circuit 159. In certain of such embodiments, the differential measurement compares a magnitude of a change in the first current used to maintain the first nanotube 143 at the first resistance with a magnitude of a change in the second current used to maintain the second nanotube 147 at the second resistance.

In certain embodiments of the sensors 110, 111, 112, 113, the second nanotube 147 is non-functionalized. In certain of such embodiments, the first nanotube 143 is functionalized to support the first reaction site 144. In some embodiments, the circuit 150 is configured to detect the thermal change of the first reaction site 144 based on a differential measurement of the first and second nanotubes 143, 147. In certain of such embodiments, the differential measurement compares a resistance of the first nanotube 143 with a resistance of the second nanotube 147. In some embodiments, the differential measurement compares a current flow through the first nanotube 143 with a current flow through the second nanotube 147. In some embodiments, the differential measurement compares a voltage across the first and second electrical contacts 141, 142 with a voltage across the third and fourth electrical contacts 145, 146.

In some embodiments of the sensors 110, 111, 112, 113, the circuit 150 is configured to counteract a change in a first resistance of the first nanotube 143 so as to maintain the first nanotube 143 at the first resistance and counteract a change in a second resistance of the second nanotube 147 so as to maintain the second nanotube 147 at the second resistance. In certain of such embodiments, the first resistance and the second resistance are the same prior to initiation of the chemical or biological reaction at the first reaction site 144. In other embodiments, the first resistance and the second resistance are different from each other prior to initiation of the chemical or biological reaction at the first reaction site 144.

In certain embodiments, of the sensors 112, 113, the first feedback circuit 156 is configured to counteract a change in the first resistance of the first nanotube 144 by controlling a first current within the first feedback circuit 156 and the second feedback circuit 159 is configured to counteract a change in the second resistance of the second nanotube 147 by controlling a second current within the second feedback circuit 159. In certain of such embodiments, the differential measurement mentioned above compares a magnitude of a change in the first current used to maintain the first nanotube 143 at the first resistance with a magnitude of a change in the second current used to maintain the second nanotube 147 at the second resistance.

In certain embodiments of the sensors 111, 113, the second reaction site 148 is configured for a second chemical or biological reaction that is different from the first chemical or biological reaction of the first reaction site 144. The second reaction site 148 can be supported by the second nanotube 147. In certain of such embodiments, the circuit 150 is configured to detect a second thermal change of the second reaction site 148 due to the second chemical or biological reaction based on an effect of the thermal change on the second nanotube 147. In some embodiments, the circuit 150 is configured to detect one or more of the first and second thermal changes of one or more of the first and second reaction sites 144, 148, respectively, based on a differential measurement of the first and second nanotubes 143, 147. In some embodiments, the differential measurement compares a resistance of the first nanotube 143 with a resistance of the second nanotube 147. In some embodiments, the differential measurement compares a current flow through the first nanotube 143 with a current flow through the second nanotube 147. In some embodiments, the differential measurement compares a voltage across the first and second electrical contacts 141, 142 with a voltage across the third and fourth electrical contacts 145, 146.

In some embodiments of the sensors 111, 113, the circuit 150 is configured to counteract a change in a first resistance of the first nanotube 143 so as to maintain the first nanotube at the first resistance and counteract a change in a second resistance of the second nanotube 147 so as to maintain the second nanotube at the second resistance. In certain of such embodiments, the first resistance and the second resistance are the same prior to initiation of the first or second chemical or biological reactions at the first or second reaction sites 144, 148, respectively. In other embodiments, the first resistance and the second resistance are different from each other prior to initiation of the first or second chemical or biological reactions at the first or second reaction sites 144, 148, respectively.

In some embodiments of the sensor 113, the circuit 150 includes the first feedback circuit 156, which can be configured to counteract a change in the first resistance of the first nanotube 143 by controlling a first current within the first feedback circuit. The second feedback circuit 159 can be configured to counteract a change in the second resistance of the second nanotube 147 by controlling a second current within the second feedback circuit 159. In some embodiments, the differential measurement mentioned above compares a magnitude of a change in the first current used to maintain the first nanotube 143 at the first resistance with a magnitude of a change in the second current used to maintain the second nanotube 147 at the second resistance.

In various embodiments of the calorimetric sensors 110, 111, 112, 113, one or both of the first and second nanotubes 143, 147 each comprises a carbon nanotube, each comprises an inorganic nanotube, each comprises a single-walled nanotube, or each comprises a multi-walled nanotube.

In some embodiments, the first and second nanotubes 143, 147 are functionalized to support the first and second reaction sites, respectively. In certain embodiments, one or both of the first and second nanotubes 143, 147 are exohedrally functionalized. In some embodiments, one or both of the first and second reaction site are at an exterior of the first and second nanotubes 143, 147, respectively. In some embodiments, one or both of the first and second nanotubes 143, 147 are endohedrally functionalized. One or both of the first and second reaction sites can be at an interior of the first and second nanotubes 143, 147, respectively.

For any suitable embodiment, one or more separate functional groups 155 can be attached to an end of one or more of the first and second nanotubes 143, 147. In some embodiments, the first and second reaction sites 144, 148 are defined by the functional groups. In some embodiments, the first and second reaction sites 144, 148 are attached to the functional groups. In some embodiments, one or more separate functional groups are attached to a sidewall of one or more of the first and second nanotubes 143, 147, respectively.

In some embodiments, the first and second reaction sites 144, 148 are covalently boded to the first and second nanotubes 143, 147, respectively. In some embodiments, the first and second reaction sites 144, 148 are attached to separate functional groups that are covalently boded to the first and second nanotubes 143, 147, respectively. In other embodiments, the first and second reaction sites 144, 148 are noncovalently bonded to the first and second nanotubes 143, 147, respectively.

Any suitable arrangement for either of the first and second nanotubes 143, 147 is possible, such as those discussed above. Further, the first and second nanotubes 143, 147 can be of the same or different variety.

Figure 7:
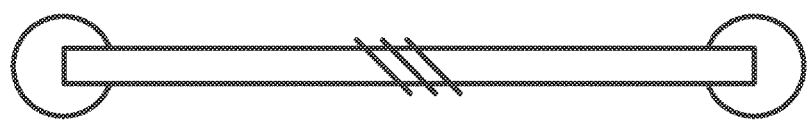
FIG. 7 is a plan view of an embodiment of a nanotube that has one or polymers positioned about it in a helical pattern.
Figure 8:
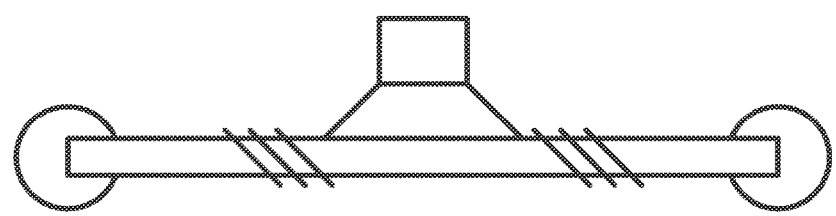
FIG. 8 is a plan view of another embodiment of a nanotube similar to that illustrated in FIG. 7 with a reaction site.

For example, in various embodiments, one or more polymers (such as shown in FIGS. 7 and 8) can be oriented about an exterior of each of the first and second nanotubes 144, 148. The first and second reaction sites 144, 148 can be defined by the one or more polymers. The first and second reaction sites 144, 148 can be attached to the one or more polymers.

The first and second nanotubes 143, 147 can be derivatized to support the first and second reaction sites 144, 148, respectively. One or more of the first and second reaction sites 144, 148 can each comprise an atom configured to chemically interact with a target material or a molecule configured to chemically interact with a target material. In some embodiments, the molecule comprises a polymer.

In various embodiments, one or more of the first and second reaction sites 144, 148 each comprises a biological element configured to interact with an analyte. In various embodiments, each biological element can comprise one or more of an enzyme, an antibody, an antigen, a nucleic acid, a protein, a cell receptor, an organelle, a microorganism, a tissue, a biologically derived material, or a biomimic component.

Figure 18:
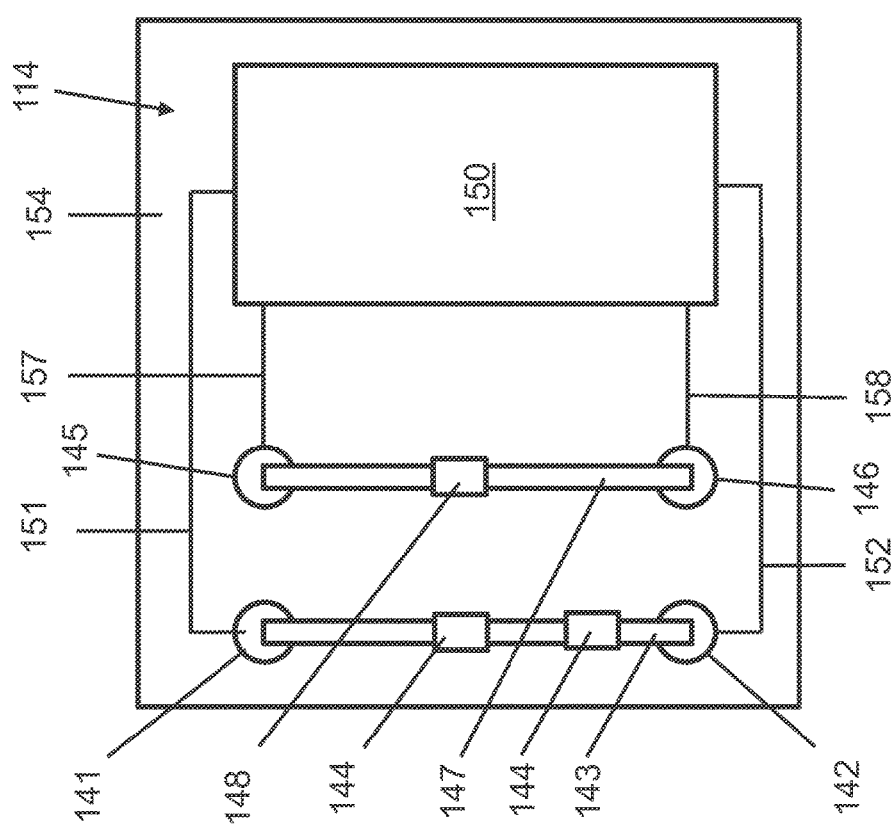
FIG. 18 is a plan view of another embodiment of a calorimetric sensor that includes multiple pairs of electrical contacts coupled with a circuit, with each pair of electrical contacts including a nanotube oriented between them.
Figure 19:
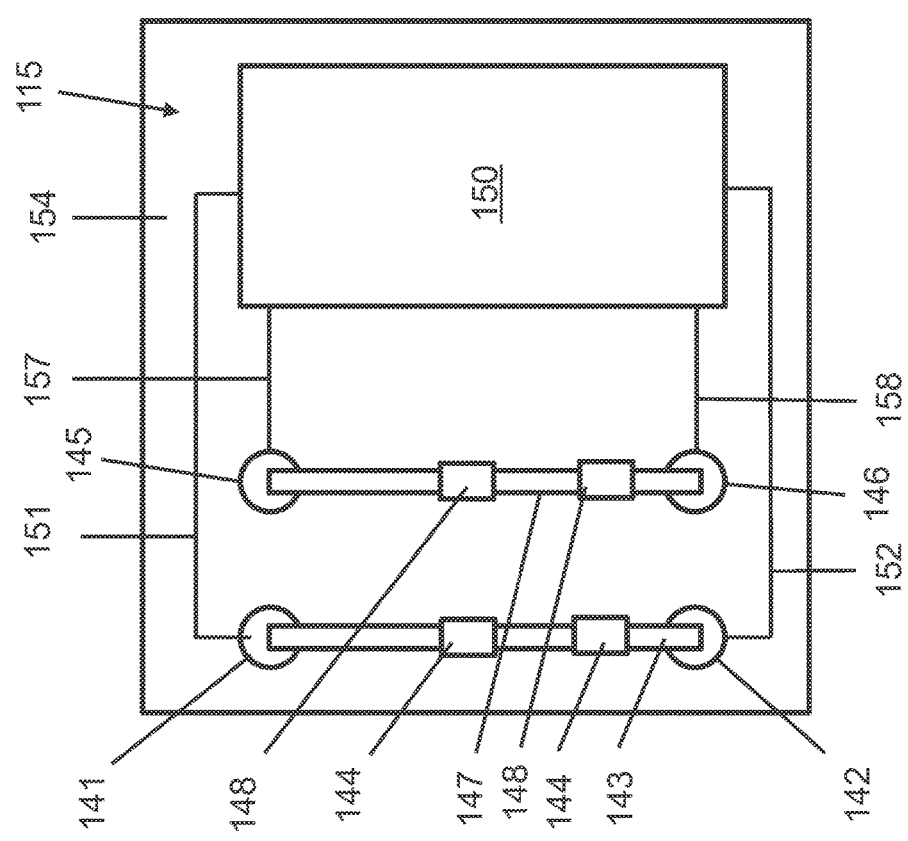
FIG. 19 is a plan view of another embodiment of a calorimetric sensor that includes multiple pairs of electrical contacts coupled with a circuit, with each pair of electrical contacts including a nanotube oriented between them.

With reference to FIGS. 18 and 19, in some embodiments of calorimetric sensors 114, 115, the first nanotube 143 can further support one or more additional first reaction sites 144 that are each for the first chemical or biological reaction. With reference to FIG. 19, in some embodiments, the second nanotube 147 further supports one or more additional second reaction sites 148 that are each for the second chemical or biological reaction.

In some embodiments, features of the sensors 106, 107 can be combined with features of the sensors 110, 111, 112, 113, 114, 115 such that one or more additional first nanotubes 143 are oriented between the first and second electrical contacts 141, 142. One such embodiment is depicted in FIG. 20A. In certain embodiments, a calorimetric sensor 116 can include multiple first nanotubes 143 that can each be electrically coupled with each of the first and second electrical contacts 141, 142. Moreover, in some embodiments, one or more additional first reaction 144 sites for the first chemical or biological reaction can be present, and each of the one or more additional first reaction sites 144 can be supported by one of the one or more additional nanotubes 143.

Further, in some embodiments, one or more additional second nanotubes 147 can be oriented between the third and fourth electrical contacts 145, 146. The one or more additional second nanotubes 147 can each be electrically coupled with each of the third and fourth electrical contacts 145, 146. In some embodiments, one or more additional second reaction sites 148 for the second chemical or biological reaction can supported by one of the one or more additional second nanotubes 147.

In some embodiments, the circuit 150 is configured to detect a thermal change of any of the reaction sites 144, 148 supported by any of the nanotubes 143, 147 due to one or more chemical or biological reactions at one or more of the reaction sites based on an effect of the thermal change on any of the nanotubes 143, 147. In certain of such embodiments, one or more of the nanotubes 143, 147 each supports a plurality of reaction sites 144, 148, respectively, that are each for a chemical or biological reaction.

In various embodiments of the sensors 110, 111, 112, 113, 114, 115, the first nanotube 143 is suspended between the first and second electrical contacts 141, 142 in spaced relation from other portions of the sensor and the second nanotube is suspended between the third and fourth electrical contacts 145, 146 in spaced relation from other portions of the sensor.

In some embodiments, at least one of the first and second nanotubes 143, 147 contacts and is supported by the substrate 154 at a position between the first and second electrical contacts 141, 142 or between the third and fourth electrical contacts 145, 146, respectively. The substrate may be of any suitable variety, such as those discussed above.

In various embodiments, one or more of the reaction sites 144, 148 can be resettable. In some embodiments, one or more of the chemical or biological reactions are reversible. In some embodiments, one or more of the reaction sites 144, 148 are configured to be returned to a pre-reaction state via heating of the reaction site. In certain of such embodiments, the circuit 150 is configured to heat the first nanotube 143 to thereby heat the first reaction site 144. In certain of such embodiments, the circuit 150 is configured to heat the first nanotube 143 by passing a current through the first nanotube 143.

In some embodiments, the first reaction site 144 is configured to be returned to a pre-reaction state via immersion of the first reaction 144 site in a medium. In certain of such embodiments, the medium comprises a solvent. In some embodiments, the medium comprises an acid. In some embodiments, the medium comprises an alkali.

Any suitable method for manufacturing any of the foregoing calorimetric sensors is contemplated. In some embodiments, processes commonly used in microfabrication or semiconductor device fabrication can be used for at least a portion of some processes. For example, in some instances, the substrate 154, the electrical leads 151, 152, 157, 158, and/or the electrical contacts 141, 142, 145, 146 can be formed via any suitable methods of manufacture, such as one or more of thermal oxidation, chemical vapor deposition, physical vapor deposition, photolithography, shadow masking, or etching. The processes can further include suitable methods of electrically coupling the one or more nanotubes 143, 147 to the electrical contacts 141, 142, 145, 146.

Various methods, or portions thereof, that are described herein are not depicted in a step-by-step fashion in the drawings. Rather, one skilled in the art will understand such step-by-step methods from the written disclosure thereof and/or the drawings associated therewith. Moreover, to the extent a visual depiction of the methods described herein is desired, any suitable flow of method steps or stages may be depicted in a flow chart in which each recited step or stage is depicted in a separate box, and the boxes are connected via arrows showing an order of operations.

Some methods of manufacturing a calorimetric sensor 100-115 include electrically coupling a first nanotube 143 with each of a first electrical contact 141 and a second electrical contact 142 that are spaced from each other. The first nanotube 143 can include a first reaction site 144 for a first chemical or biological reaction. Some methods further include electrically coupling a circuit 150 with the first and second electrical contacts 141, 142. The circuit 150 can be configured to detect a first thermal change of the reaction site 144 due to the chemical or biological reaction based on an effect of the thermal change on the nanotube 143.

In various embodiments, the nanotube 143 is formed via arc-discharge evaporation, chemical vapor deposition, catalytic chemical vapor deposition, laser ablation, or template synthesis. Any suitable type of nanotube is contemplated, such as discussed above. For example, in various embodiments, the nanotube 143 comprises a carbon nanotube, an inorganic nanotube, a single-walled nanotube, or a multi-walled nanotube.

Some methods include functionalizing the nanotube 143 to support the reaction site 144. In various embodiments, functionalizing the nanotube comprises ion-beam functionalization or microwave-stimulated functionalization.

In various embodiments, the nanotube 143 is exohedrally functionalized. The reaction site 144 can be at an exterior of the nanotube 143. In some embodiments, the nanotube 143 is endohedrally functionalized. The reaction site 144 can be at an interior of the nanotube 143.

Some methods include attaching a functional group 155 to an end of the nanotube 143. The reaction site 144 can be defined by the functional group 155. Some methods include attaching the reaction site 144 to the functional group 155.

In some methods, the functional group 155 is attached to a sidewall of the nanotube 143. The reaction site 144 can be defined by the functional group 155. In some instances, methods include attaching the reaction site 144 to the functional group 155. In some methods, the reaction site 144 is covalently boded to the nanotube. Some methods include attaching the reaction site 144 to a functional group 155 that is covalently boded to the nanotube 143. In other methods, the reaction site is noncovalently bonded to the nanotube.

In like manner, any suitable method may be employed to achieve any of the arrangements for calorimetric sensors discussed above with respect to FIGS. 1-19. Thus, where a particular arrangement is described, a method may include forming the appropriate components to achieve the arrangement. As a further example, FIGS. 7 and 8 illustrate that in some embodiments, one or more polymers 149 are oriented about an exterior of the nanotube 143. Thus, some methods include orienting one or more polymers 149 about an exterior of the nanotube in any suitable manner.

Various methods of sensing a chemical or biological reaction are also possible. For example, in some methods, one or more of the calorimetric sensors discussed above with respect to FIGS. 1-19 are used in manners apparent from the foregoing descriptions. For example, in some instances, a method of sensing a chemical or biological reaction comprises exposing a first nanotube 143 to a first thermal change that takes place at a first reaction site 144 when the first reaction site undergoes a first chemical or biological reaction, wherein the first nanotube 143 is electrically coupled with a first electrical contact 141 and a second electrical contact 142. The method further comprises detecting that the first thermal change has had an effect on the nanotube 143.

In some instances, detecting that the first thermal change has had an effect on the nanotube is accomplished via a circuit 150 that is coupled with the first and second electrical contacts 141 142. The nanotube 143 may be of any suitable variety, such as those discussed above. In some embodiments, the reaction site 144 comprises a molecule configured to chemically interact with a target material, and the method can include detecting the chemical interaction of the target material with the molecule. In various embodiments, the molecule comprises a polymer.

In some embodiments, the reaction site 144 comprises a biological element configured to interact with an analyte, and the method can include detecting the interaction of the biological element with the analyte. In various embodiments, the biological element comprises one or more of an enzyme, an antibody, an antigen, a nucleic acid, a protein, a cell receptor, an organelle, a microorganism, a tissue, or a biologically derived material, a biomimic component.

In some methods, one or more additional reaction sites 144 that are each for a chemical or biological reaction are supported by the nanotube 143. Methods can include detecting a thermal change of one or more of the reaction sites 144 that are supported by the nanotube due to the chemical or biological reaction at each of the one or more of the reaction sites 144. In some methods, each of said detecting that the first thermal change has had an effect on the nanotube 143 and said detecting a thermal change of one or more of the reaction sites 144 that are supported by the nanotube 143 due to the chemical or biological reaction at each of the one or more of the reaction sites 144 is accomplished via the circuit 150.

In some embodiments, one or more additional nanotubes 147 are oriented between the first and second electrical contacts and one or more additional reaction sites 148 for a chemical or biological reaction are supported by one of the one or more additional nanotubes 147, as discussed above. In some embodiments, the second nanotube 147 is devoid of any couplings to reaction sites for chemical or biological reactions of a variety that would be detectable via the first reaction site 144. In various embodiments, the second nanotube is non-functionalized or supports a second reaction site 148 that is for a second chemical or biological reaction that is different from the first chemical or biological reaction for which the first reaction site 144 is configured.

Certain methods include detecting a thermal change of any of the reaction sites 144, 147 supported by any of the nanotubes 143, 147 due to one or more chemical or biological reactions at one or more of the reaction sites based on an effect of the thermal change on any of the nanotubes.

In some instances, detecting a thermal change of any of the reaction sites supported by any of the nanotubes due to one or more chemical or biological reactions at one or more of the reaction sites based on an effect of the thermal change on any of the nanotubes and said detecting that the first thermal change has had an effect on the nanotube is accomplished via the circuit 150.

Some methods include determining a magnitude of the change in the resistance of the nanotube 143 based on a change in voltage across the first and second electrical contacts. Some methods include determining a magnitude of the change in the resistance of the nanotube based on a change in current passing through the nanotube.

Some methods include counteracting a change in the resistance of the nanotube 143 so as to maintain the nanotube at a constant resistance. In some instances, each of said counteracting a change in the resistance of the nanotube so as to maintain the nanotube at a constant resistance and said detecting that the first thermal change has had an effect on the nanotube is accomplished via the circuit 150.

In some embodiments, the circuit 150 comprises a feedback circuit 156. Some methods can include counteracting, via the feedback circuit 156, a change in the resistance of the nanotube 143 by controlling a current within the feedback circuit 156. Some methods include detecting a magnitude of the thermal change of the reaction via a magnitude of a change in the current used to maintain the nanotube 143 at the constant resistance.

Some methods include detecting a thermal change of the first reaction site 144 based on a differential measurement of the first and second nanotubes 144, 147. In certain of such methods, this is accomplished via a circuit 150. For example, the circuit 150 may be one of the circuits 150 depicted in FIGS. 15-18.

In some methods, the differential measurement compares a resistance of the first nanotube 143 with a resistance of the second nanotube 147. In some methods, the differential measurement compares a current flow through the first nanotube 143 with a current flow through the second nanotube 147. In some methods, the differential measurement compares a voltage across the first and second electrical contacts 141, 142 with a voltage across the third and fourth electrical contacts 145, 146.

Some methods include counteracting a change in a first resistance of the first nanotube 143 so as to maintain the first nanotube at the first resistance and counteracting a change in a second resistance of the second nanotube 144 so as to maintain the second nanotube at the second resistance. In some instances, the first resistance and the second resistance are the same prior to initiation of the chemical or biological reaction at the first reaction site 144. In other instances, the first resistance and the second resistance are different from each other prior to initiation of the chemical or biological reaction at the first reaction site 144.

In some instances, counteracting a change in the first resistance of the first nanotube 143 is accomplished by controlling a first current within a first feedback circuit 156. Counteracting a change in the second resistance of the second nanotube 144 can be accomplished by controlling a second current within a second feedback circuit 159.

In some methods, the differential measurement mentioned above compares a magnitude of a change in the first current used to maintain the first nanotube 143 at the first resistance with a magnitude of a change in the second current used to maintain the second nanotube 147 at the second resistance.

In some embodiments, multiple first nanotubes 143 are oriented between and are electrically coupled with each of the first and second electrical contacts 141, 142; multiple first reaction sites 144 for the first chemical or biological reaction are supported by one of the multiple first nanotubes; multiple second nanotubes 147 are oriented between and are electrically coupled with each of the third and fourth electrical contacts 145, 146; and multiple second reaction sites 148 for the second chemical or biological reaction are supported by one of the one or more additional second nanotubes 147, such as depicted, for example, in FIG. 20A. Certain methods can include detecting a thermal change of any of the reaction sites 144, 148 supported by any of the nanotubes 143, 147 due to one or more chemical or biological reactions at one or more of the reaction sites based on an effect of the thermal change on any of the nanotubes. In some embodiments, one or more of the nanotubes 143, 147 each supports a plurality of reaction sites 144, 148 that are each for a chemical or biological reaction.

In some instances, one or more of the first and second reaction site 144, 148 is resettable. For example, in some embodiments, the chemical or biological reaction is reversible. Some methods can include returning a reaction site 144, 148 to a pre-reaction state via heating. In some embodiments, the circuit 150 heats the first or second nanotube 143, 147 to thereby heat the reaction site 144, 148. For example, the circuit 150 may pass a current through the first and/or second nanotubes 143, 147.

In some embodiments, a reaction site 144, 148 can be configured to be returned to a pre-reaction state via immersion thereof in a medium. In various embodiments, the medium can comprise a solvent, an acid, or an alkali.

Figure 20B:
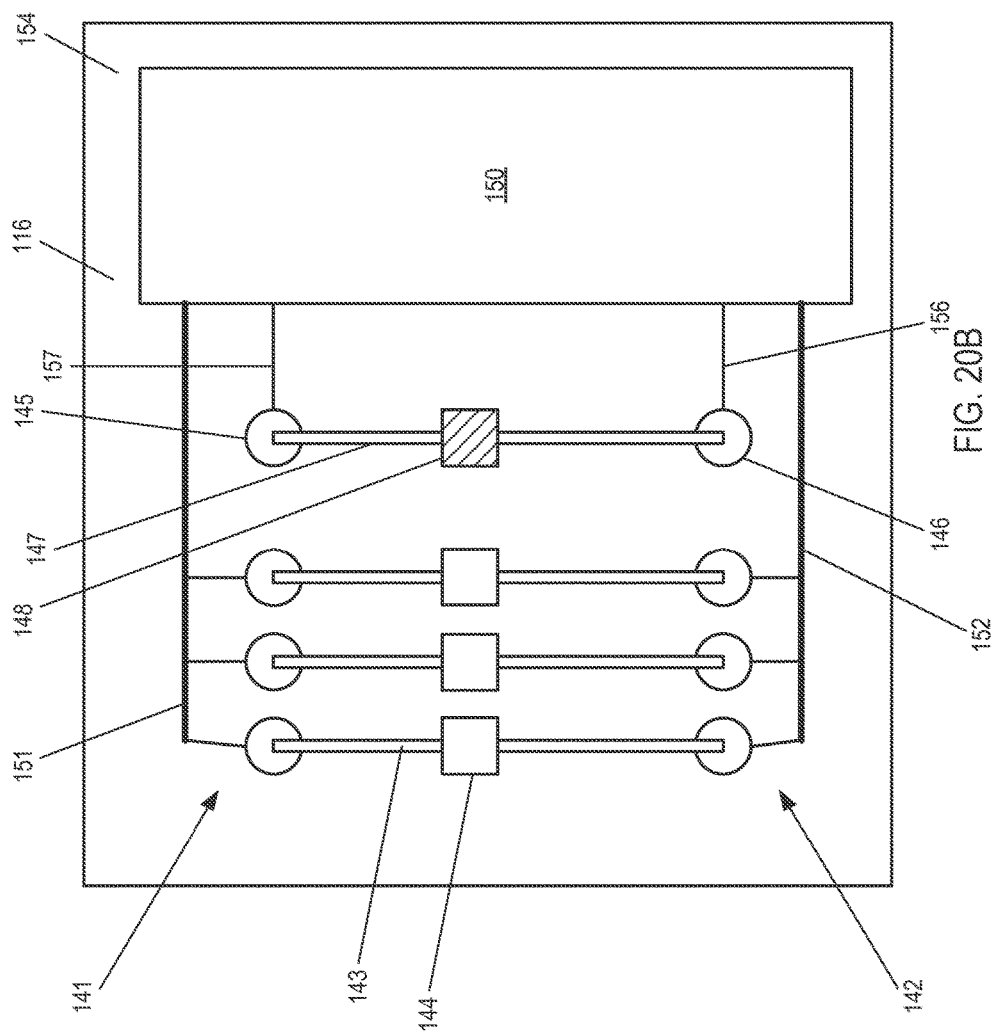
FIG. 20B is a plan view of another embodiment that includes a first set of calorimetric sensors and a second, reference calorimetric sensor.

FIG. 20B is a plan view of another embodiment that includes a single reference sensor (reaction site 148) and a set of other sensors (reaction sites 144). By scaling the measurements made via reaction site 148, reaction site 148 can provide an accurate reference point for any number of corresponding reaction sites 144. Thus, any number of reference nanotube calorimetric sensors may be used with any number of measurement nanotube calorimetric sensors.

Figure 21:
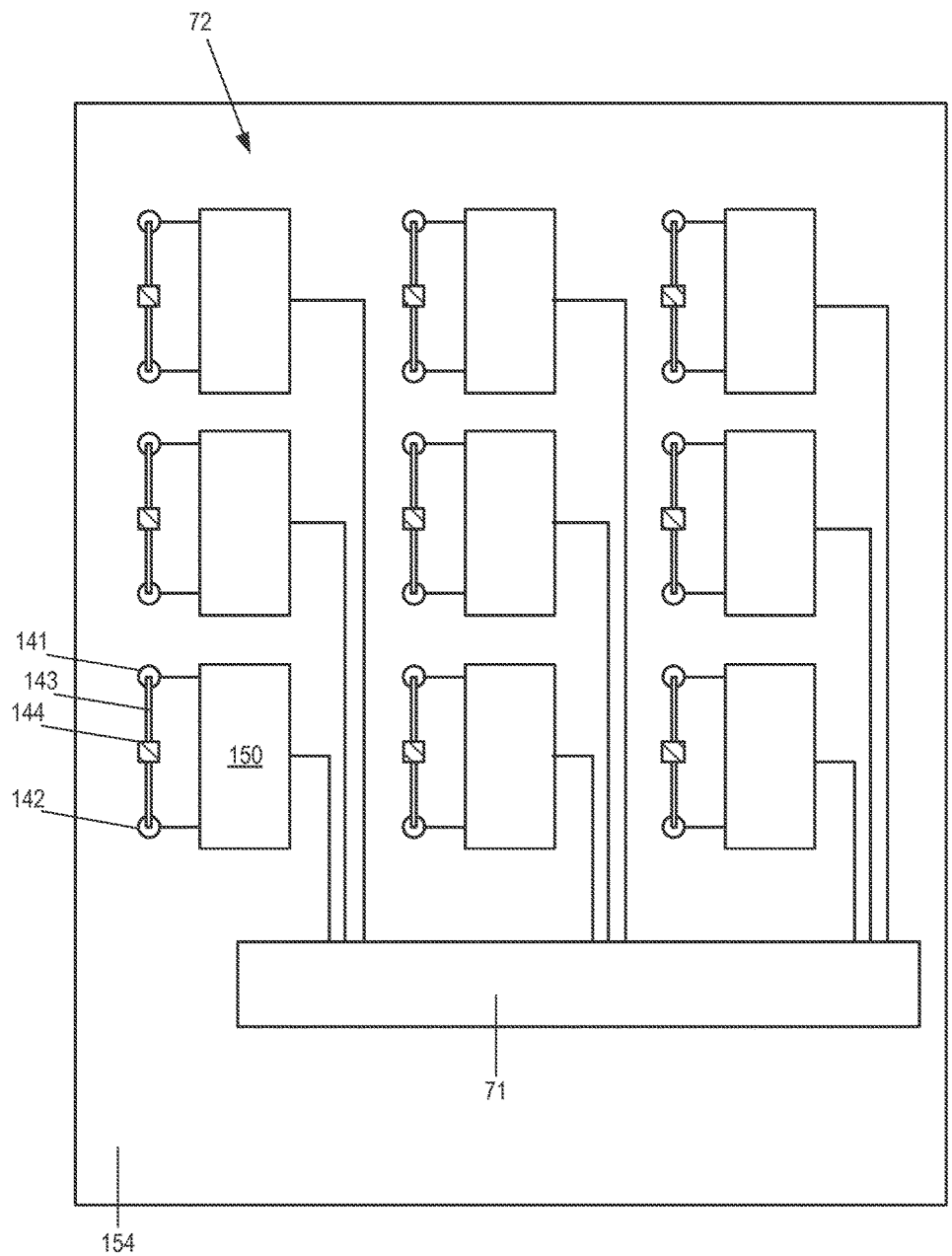
FIG. 21 is a plan view of an embodiment of a system that includes an array of calorimetric sensors coupled to readout electronics.

In certain embodiments, a system 200 that can be used for calorimetric sensing can include a plurality of any of the calorimetric sensors described above. In various embodiments, one or more of the varieties of sensors described herein may be used. The sensors 100 may be arranged in an array, such as the two-dimensional array illustrated in FIG. 21. In the illustrated embodiment, the plurality of sensors are oriented in a first direction to form a two-dimensional array. Readout electronics 171 may be in communication with each of the circuits 150 of each sensor. As in various embodiments, each sensor may include a nanotube 143, electrical contacts 141, 142, and a reaction site 144. In some embodiments, the entire array may be on a single substrate 154. In other embodiments, one or more of the sensor within the array may be on a different substrate.

As described herein, In some embodiments, a system for calorimetric sensing includes a plurality of sensors that are oriented in both a first direction and a second direction to form a two-dimensional array.

Figure 22:
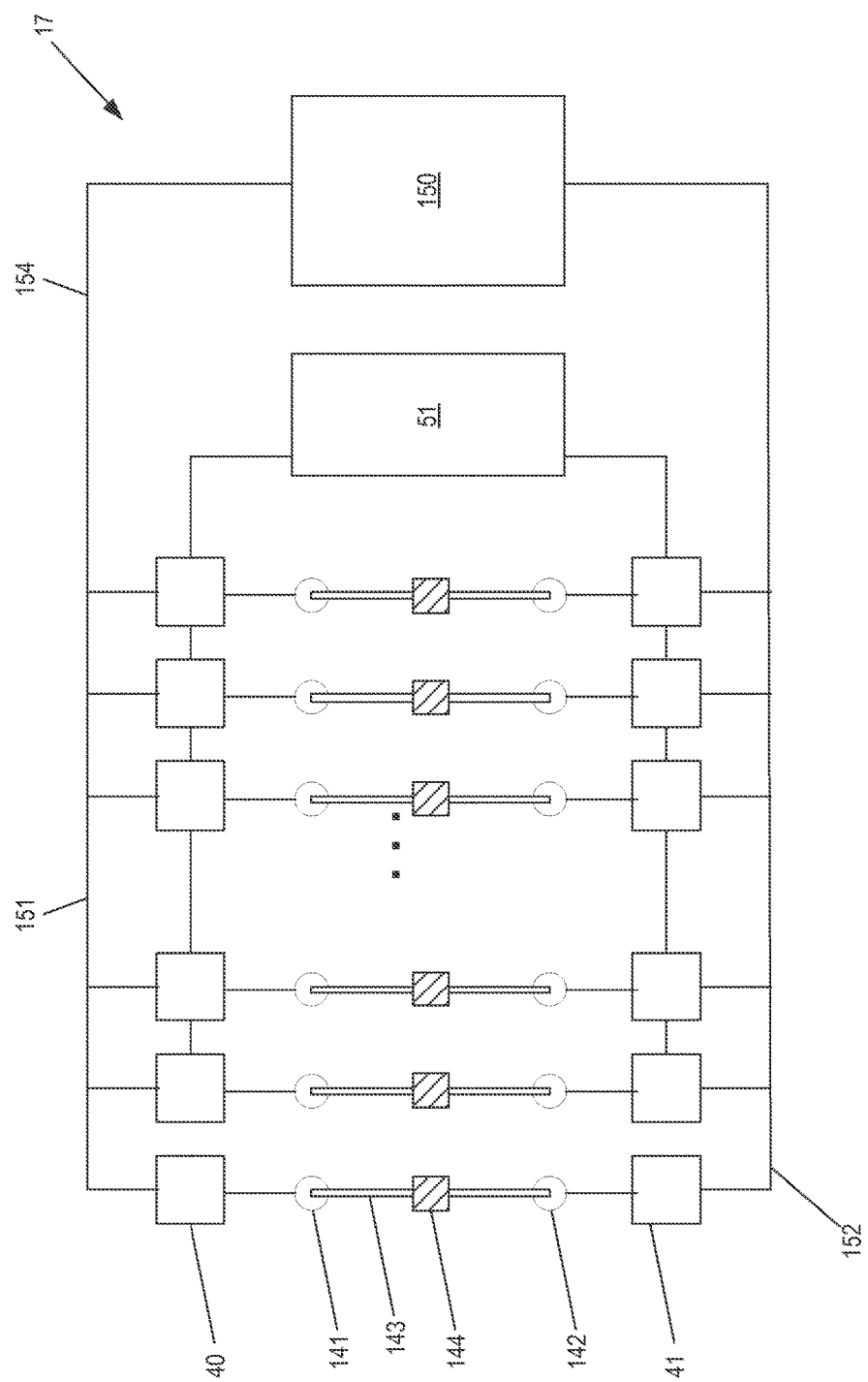
FIG. 22 is a plan view of an embodiment of a system that includes an array of switchable calorimetric sensors.

With reference to FIG. 22 a system may include an array of switchable calorimetric sensors. Sensor electronics 150 may be in communication with each of the various sensors, where each sensor includes a nanotube 143, electrical contacts 141, 142, and a reaction site 144. Switches 40, 41 may be controlled by a switch control 51. The switch control 51 may be in communication with sensor electronics and/or a separate controller (not shown), such as a readout electronic component. The switch control may selectively switch the switch 40, 41 to selectively control which of the sensors is used to provide data to the sensor electronics 150.

The switches may be used to sequentially read data from each of the sensors and/or selectively read data from only a subset of sensors. The number of sensors and corresponding switches may be increased or decreased. In some embodiments, each sensor has only one switch, instead of two switches as illustrated. In some embodiments, the switches may be implemented by selective control of a current and/or voltage provided to each of the sensors.

In some embodiments, a system for calorimetric sensing includes a plurality of sensors. A processor may be electrically coupled with the circuits of at least a plurality of the sensors. The sensors may be oriented in a first direction to form a one-dimensional array.

Figure 23B:
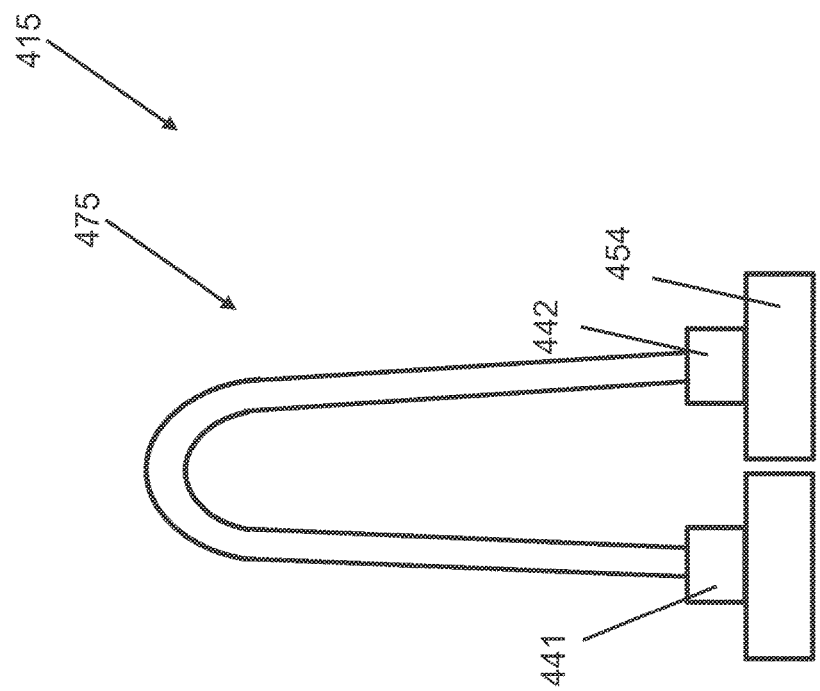
FIGS. 23A and 23B are elevation views of embodiments that depict a nanostructure that comprises an arc.
Figure 23A:
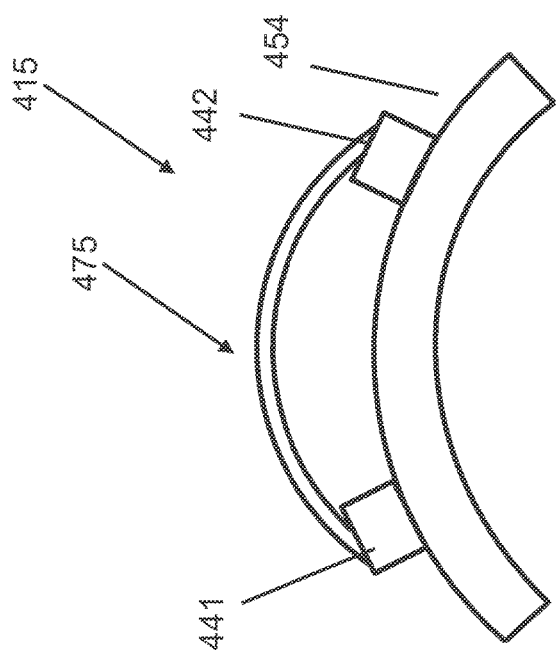

With reference to FIGS. 23A and 23B, in certain embodiments, for at least one of the sensor elements 415, the nanostructure 475 defines an arc between the first and second electrical contacts 441, 442. In some embodiments, such as that depicted in FIG. 23A, the arc shape may be achieved by bending the substrate. In other embodiments, such as that depicted in FIG. 23B, the arc shape may be achieved by moving portions of the substrate toward each other.

In some embodiments, the substrate and/or nanotube(s) may be made to project or curve outward. In some embodiments, the nanostructure may comprises an S shape or other shape that allows the sensors on a nanotube to be spaced closer together than the spacing of the electrical contacts for each respective sensor. For instances, the nanotubes may curve or be bent such that that the sensors are clustered or grouped near a center location, while the electrical contacts are spaced (evenly or unevenly) farther apart.

Figure 24:
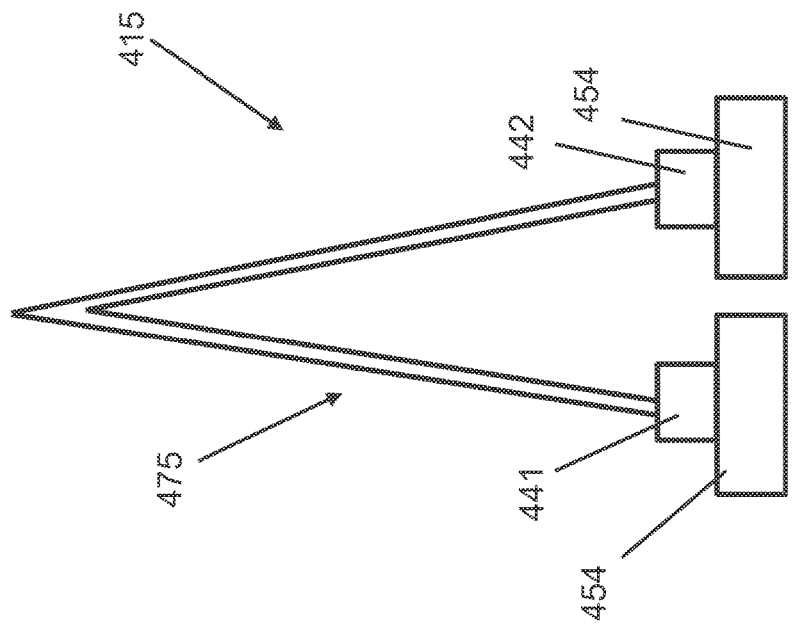
FIG. 24 is an elevation view of a portion of another embodiment that depicts nanostructures that comprise a V shape.

With reference to FIG. 24, in some embodiments, for at least one of the sensor elements 415, the nanostructure 475 comprises a V-shape. In some instances, the V-shape is formed by buckling the nanostructure 475. For example, the buckling is achieved via a damage process, such as, for example, an ion beam process. In some embodiments, the buckling is achieved at a functionalized portion of the nanostructure 475.

Figure 25:
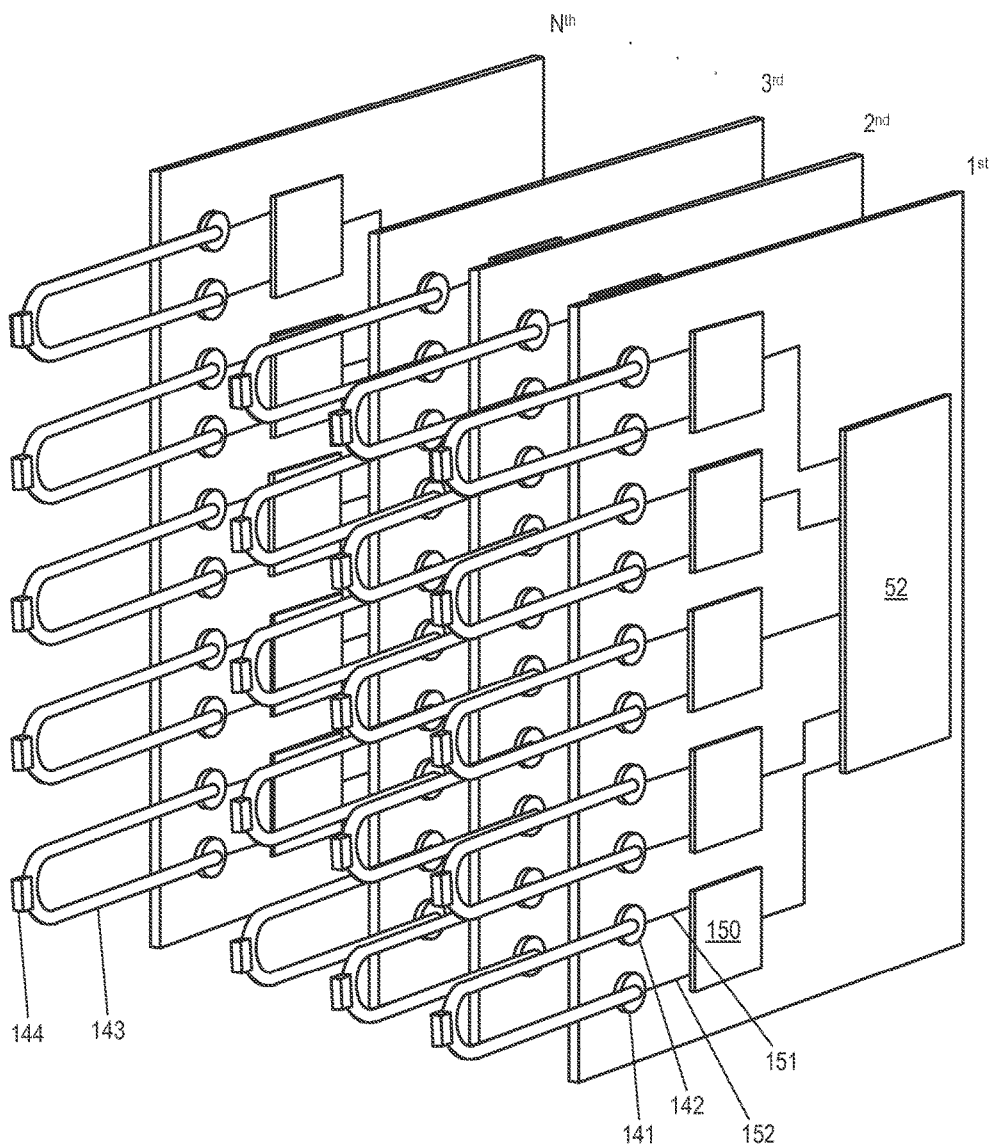
FIG. 25 is a perspective view of a two-dimensional array of calorimetric sensors, according to one exemplary embodiment.

With reference to FIG. 25, a plurality of reaction sites 144 connected to nanotubes 143 may be formed in an array. As illustrated, each of the reaction sites 144 may extend off of the substrate. The array may be two-dimensional, as illustrated, or the array may be one-dimensional. Each of the sensors may include a nanotube 143, electrical contacts 141, 142, and/or electrical leads 151, 152. Various sensor circuitry 150 and possibly unifying controller circuitry 52 may be used to gather sensor data from the array of calorimetric sensors.

Figure 26:
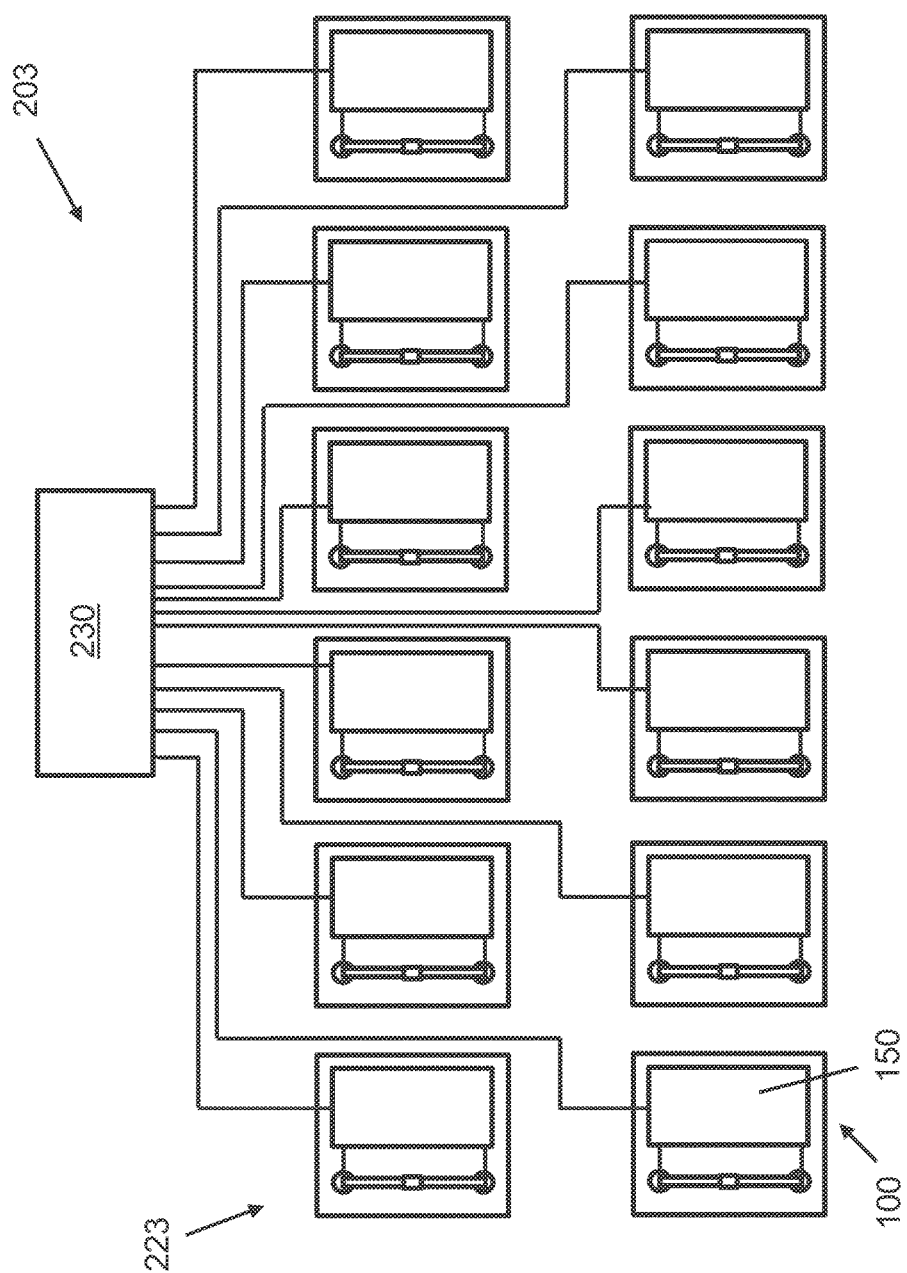
FIG. 26 is a plan view of another embodiment of a system that includes a two-dimensional array of calorimetric sensors.

With reference to FIG. 26, in some embodiments, a system 203 for calorimetric sensing includes a plurality of sensors 100. A processor 230 is electrically coupled with the circuits 150 of at least a plurality of the sensors 100. In the illustrated embodiment, the sensors 100 are oriented in both a first direction and a second direction to form a two-dimensional array 223.

In certain embodiments, a system can include an array of sensors. The circuits of the sensors can be electrically coupled with the processor. The system can further include a display that can provide a pictorial representation of the array via a computer system. Other or further suitable readout or user interface mechanisms may be coupled with the processor.

For the sake of brevity, conventional techniques for computing, data entry, data storage, networking, and/or the like may not be described in detail herein. Furthermore, the connecting lines shown in various figures contained are intended to represent exemplary functional relationships and/or communicative, logical, and/or physical couplings between various elements. A skilled artisan will appreciate, however, that many alternative or additional functional relationships, physical connections, wireless connections, or the like may be present in a practical implementation of the systems or methods described.

Additionally, principles of the present disclosure may be reflected in a computer program product on a computer-readable storage medium having computer-readable program code means embodied in the storage medium. Any suitable tangible, non-transitory computer-readable storage medium may be utilized, including magnetic storage devices (hard disks, floppy disks, and the like), optical storage devices (CD-ROMs, DVDs, Blu-Ray discs, and the like), flash memory, and/or the like. These computer program instructions may be loaded onto a general purpose computer, special purpose computer, or other programmable data processing apparatus to produce a machine, such that the instructions that execute on the computer or other programmable data processing apparatus create means for implementing the functions specified. These computer program instructions may also be stored in a computer-readable memory that can direct a computer or other programmable data processing apparatus to function in a particular manner, such that the instructions stored in the computer-readable memory produce an article of manufacture including implementing means which implement the function specified. The computer program instructions may also be loaded onto a computer or other programmable data processing apparatus to cause a series of operational steps to be performed on the computer or other programmable apparatus to produce a computer-implemented process, such that the instructions which execute on the computer or other programmable apparatus provide steps for implementing the functions specified.

Figure 27:
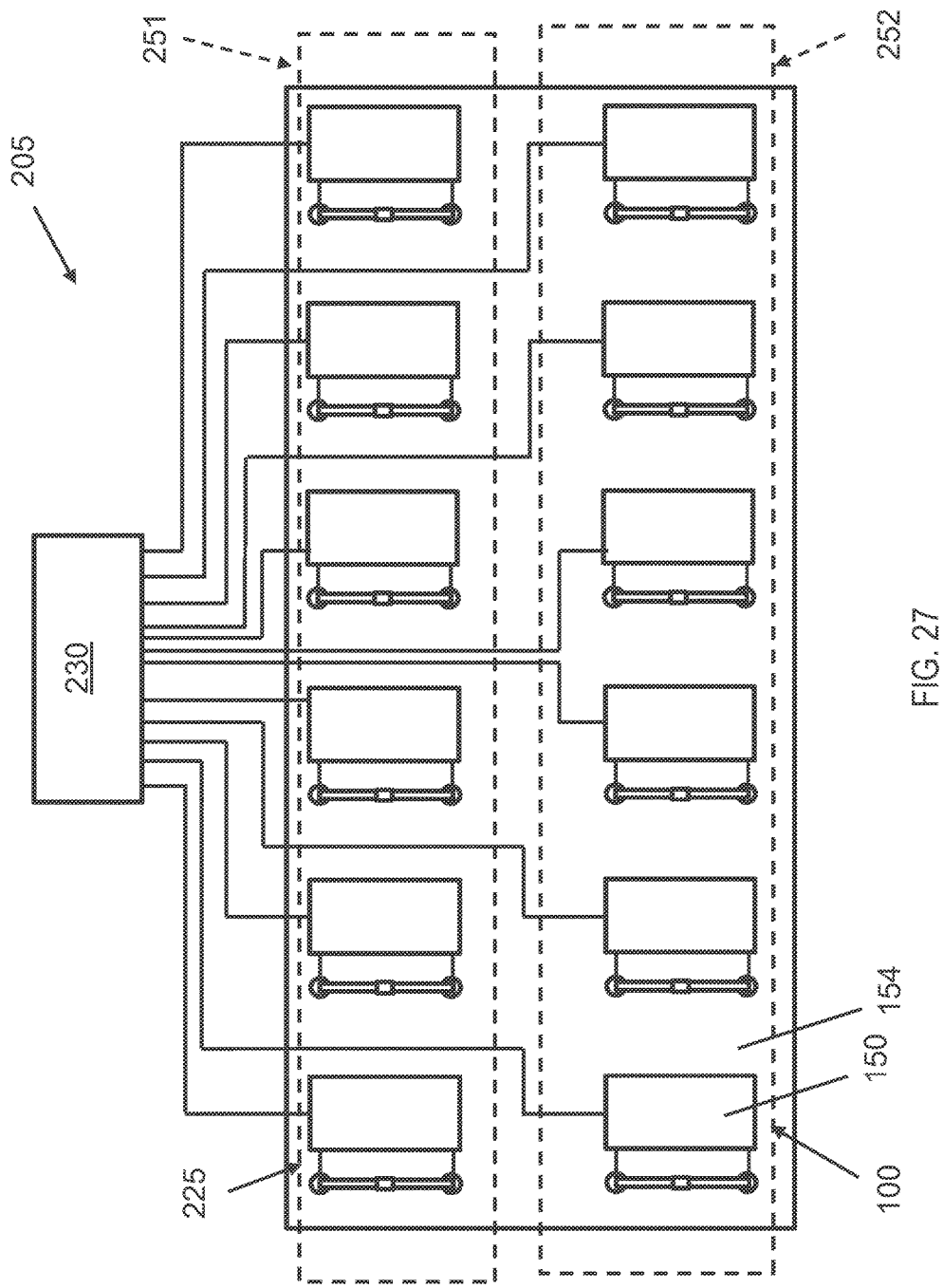
FIG. 27 is a plan view of another embodiment of a system that includes an array of calorimetric sensors.

With reference to FIG. 27, certain embodiments, a system 205 can include an array 225 of sensors 100. The circuits 150 of the sensors 100 can be electrically coupled with the processor 230. In some embodiments, the array 225 of sensors 100 is formed on a single substrate 154 that is common to all of the sensors 100. In the illustrated embodiment, the processor 230 is shown separate from the substrate 154. In other embodiments, the processor 230 may also be formed on the substrate 154. In the illustrated embodiment, each sensor 100 includes a dedicated circuit 150.

With reference to FIG. 28, in some embodiments, a system 206 may include multiple sensors 100, and each sensor 100 may be electrically coupled with a circuit 150 that is common to all of the sensors 100 within the array 225. It may be said that each sensor 100 within the array comprises a circuit, given that each sensor 100 is separately connected to the circuit 150 via different electrical leads and thus may be said to have a different circuitous path relative to the circuit 150. In some embodiments, the circuit 150 can include a processor 230, such as discussed elsewhere herein.

In some embodiments, any of the systems 200, 201, 202, 203, 204, 205, 206 are configured to determine whether one or more reactions occur at one or more of the sensors 100, respectively, to determine one or more positions within the respective array 220, 221, 222, 223, 224, 225 at which the one or more reactions occur. In some embodiments, a system 200, 201, 202, 203, 204, 205, 206 is configured to determine one or more times at which one or more reactions occur at one or more of the sensors 100, respectively. In some embodiments, a system 200, 201, 202, 203, 204, 205, 206 is configured to determine information regarding one or more of the position, reaction status, or reaction timing for each sensor 100.

In certain embodiments, a system 200, 201, 202, 203, 204, 205, 206 is configured to determine a gradient of an intensive property. For example, the intensive property can be one or more of the concentration of a reactant, the concentration of a catalyst, the concentration of an enzyme, or the concentration of a catalyst.

In certain embodiments, a system 200, 201, 202, 203, 204, 205, 206 is configured to determine a distribution of an intensive property. In some embodiments, the system is configured to determine an absolute value of the distribution. In some embodiments, the distribution is a relative distribution. In various embodiments, the intensive property can be one or more of the concentration of a reactant, the concentration of a catalyst, the concentration of an enzyme, the concentration of a catalyst, temperature, or pH.

In various embodiments, a system 200, 201, 202, 203, 204, 205, 206 is configured to determine one or more of a probability of reaction or a rate of reaction. In some embodiments, each nanotube supports a plurality of reaction sites 144 and/or 148, as discussed above, and the system can be configured to determine a probability of reaction at one or more of the sensors 100. In some embodiments, each nanotube supports a plurality of reaction sites, and the system is configured to determine a rate of reaction at one or more of the sensors.

In various embodiments, the processor 230 performs one or more of the functions described above. For example, in various embodiments, it is the processor 230 that is configured to determine whether one or more reactions occur at one or more of the sensors 100, respectively, to determine one or more positions within the array at which the one or more reactions occur. As a further example, the processor 230 may be configured to determine one or more times at which one or more reactions occur at one or more of the sensors, respectively. In some embodiments, the processor 230 is configured to determine information regarding one or more of the position, reaction status, and reaction timing for each sensor. The processor 230 can be configured to determine a gradient based on the information.

As previously mentioned, the systems 200, 201, 202, 203, 204, 205, 206 can include any of the sensors 100-116 discussed above. In some embodiments, each nanotube of the sensors within an array supports a plurality of reaction sites. The processor 230 can be configured to determine a magnitude of reactions that occur at one or more of the sensors.

In some embodiments of the systems 200, 201, 202, 203, 204, 205, 206 each sensor comprises a nanotube electrically coupled with and oriented between a first electrical contact and a second electrical contact, and the nanotube supports a reaction site for a chemical or biological reaction. A circuit coupled with the first and second electrical contacts can be configured to detect a first thermal change of the reaction site due to the chemical or biological reaction based on an effect of the thermal change on the nanotube. The reaction sites of the sensors can be configured for use in the same variety of chemical or biological reaction.

In some embodiments of the systems 200, 201, 202, 203, 204, 205, 206 each sensor comprises a nanotube electrically coupled with and oriented between a first electrical contact and a second electrical contact, wherein the nanotube supports a reaction site for a chemical or biological reaction. A circuit coupled with the first and second electrical contacts can be configured to detect a first thermal change of the reaction site due to the chemical or biological reaction based on an effect of the thermal change on the nanotube. The reaction site of each sensor can be configured for use in a different variety of chemical or biological reaction, as compared with at least one of the remaining sensors.

In some embodiments of the systems 200, 201, 202, 203, 204, 205, 206 each sensor comprises a nanotube electrically coupled with and oriented between a first electrical contact and a second electrical contact, and the nanotube supports a reaction site for a chemical or biological reaction. A circuit coupled with the first and second electrical contacts can be configured to detect a first thermal change of the reaction site due to the chemical or biological reaction based on an effect of the thermal change on the nanotube. A first group that includes one or more sensors can be configured for use in a first variety of chemical or biological reaction and a second group that includes one or more sensors is configured for use in a second variety of chemical or biological reaction that is different from the first variety. In certain of such embodiments, the first group of sensors does not include any sensors that are in the second group of sensors. An illustrative example of first and second groups 251, 252 of sensors 100 is depicted in FIG. 27. Other patterns of the first and second groups 251, 252 are possible.

Various methods of sensing a chemical or biological reaction can utilize any of the systems 200, 201, 202, 203, 204, 205, 206 discussed above, including the examples thereof depicted in the drawings. Some methods include the exposing of a first nanotube of a first sensor within a sensor array to a first thermal change that takes place at a first reaction site when the first reaction site undergoes a first chemical or biological reaction. The methods can further include detecting that the first thermal change has had an effect on the first nanotube.

Some methods include determining whether one or more reactions occur at one or more reaction sites within the sensor array, respectively, to determine one or more positions within the sensor array at which the one or more reactions occur. Other or further methods include one or more of determining one or more times at which one or more reactions occur at one or more of the sensors of the sensor array, respectively; determining information regarding one or more of the position, reaction status, or reaction timing for each sensor of the sensor array; determining a gradient based on the information; determining a probability of reaction at one or more of the sensors of the sensor array; or determining a rate of reaction at one or more of the sensors of the sensor array.

In certain embodiments, each sensor within the sensor array comprises one or more nanotubes that are oriented between a pair of electrical contacts, wherein each nanotube supports a reaction site configured for the first chemical or biological reaction, and wherein the reaction site of each sensor in the array is configured for use in the same variety of chemical or biological reaction, as compared with the remaining sensors. Some methods include detecting a plurality of instances of the first chemical or biological reaction via a plurality of the sensors.

In some embodiments, each sensor within the sensor array comprises one or more nanotubes that are oriented between a pair of electrical contacts, wherein each nanotube supports a reaction site configured for a different variety of chemical or biological reaction, as compared with at least one of the remaining sensors. Some methods include detecting different chemical or biological reactions via a plurality of the sensors within the sensor array.

In some embodiments, each sensor within the sensor array comprises one or more nanotubes that are oriented between a pair of electrical contacts, wherein each nanotube supports a reaction site, wherein a first group that includes one or more sensors is configured for use in a first variety of chemical or biological reaction, and wherein a second group that includes one or more sensors is configured for use in a second variety of chemical or biological reaction that is different from the first variety. Some methods can include detecting one or more instances of the first chemical or biological reaction via the first group of sensors and detecting one or more instances of the second chemical or biological reaction via the second group of sensors. In further embodiments, the first group of sensors does not include any sensors that are in the second group of sensors.

In certain embodiments, a sensor may comprise a substrate, a thermal member spaced from the substrate, and a first nanotube oriented between the substrate and the thermal member. The first nanotube may be in thermal contact with the thermal member. The sensor may further comprises a circuit coupled with the first nanotube. The circuit can be configured to detect a thermal change in the thermal member via a change relative to the nanotube. In certain embodiments, the first nanotube may further be in thermal contact with the substrate.

In some embodiments, the sensor may include one or more electrical leads that electrically couple the nanotube to the circuit. The electrical leads may be electrically coupled to opposite ends of the nanotube. One of the electrical leads may be substantially parallel to a surface of the substrate. The other electrical lead may include a portion that is supported by a support structure. The support structure may be formed in any suitable manner, such as via any suitable microfabrication technique discussed above. In some embodiments, the support structure may be an extension of the substrate. The support structure may be in close proximity or in contact with the nanotube. For example, in some embodiments, the support structure may support the nanotube. Other suitable arrangements are possible.

In some embodiments, the first nanotube assists in suspending the thermal member relative to the substrate to maintain spacing between the thermal member and the substrate. For example, the thermal member may be at a position below the substrate, with gravitational forces pulling the thermal member downwardly away from the substrate in the illustrated orientation. At least a portion of the nanotube can be in tension and counteract the gravitational forces to suspend the thermal member.

FIG. 29A is an elevation view of an embodiment of a sensor that includes a nanotube 143 coupled with a thermal or absorptive member 44. A coating 45 may attach the nanotube to the absorptive member 44. Supports and/or electrical contacts 141, 142 may connect the sensor to a substrate 154. The thermal or absorptive member 44 may comprise an absorptive element to allow the sensor to function as a bolometer.

For example, the absorptive member 44 may be a thermally absorptive material and/or a material sensitive to some type of radiation, such as electromagnetic radiation like ultraviolet or infrared. For instance, the absorptive material may convert electromagnetic radiation to heat, and an increased temperature may be communicated by the sensor to readout electronics.

FIG. 29B is an elevation view of an embodiment of a calorimetric sensor that includes a nanotube 143 that is coupled to an absorptive material 44, and optionally includes a coating member 45. In the illustrated embodiment, the absorptive material 44 is supported by thermally isolating mechanical supports 18. A gap in the substrate 154 may allow for increased exposure to the absorptive material 44 from both above and below.

FIG. 29C is a plan view of a nanotube 143 connected to electrical and/or supporting contacts 141, 142. The nanotube 13 may span a cutout 24 in a substrate 154.

With reference to FIG. 30, in certain embodiments, a system may include an array 420 of sensors 415. In some embodiments, each sensor 415 can include a first electrical contact 441, a second electrical contact 442 spaced from the first electrical contact 441, and a nanostructure 475 electrically coupling the first electrical contact 441 to the second electrical contact 442. The nanostructure 475 can be of any suitable variety, such as, for example, a nanotube or a nanotube mesh. This is true of the nanostructure 475 described in any of the embodiments of sensors discussed herein. A circuit 450 can be coupled with the array 420 of sensors 415 to selectively address one or more sensors 415 within the array. In some embodiments, the sensors 415 can be closely spaced. For example, the sensors 415 can be much closer together than is illustrated in FIG. 30. In some embodiments, the sensors 415 and the circuit 450 are formed on a substrate 454 of any suitable variety, such as those discussed above.

In the illustrated embodiment, the first and second electrical contacts 441, 442 of the array 420 of sensors 415 are arranged in a first row 481 and a second row 482, respectively. In some embodiments, the first and second rows 481, 42 are parallel to each other. In some embodiments, the array 420 of heating elements 415 comprises a one-dimensional array.

Figure 31:
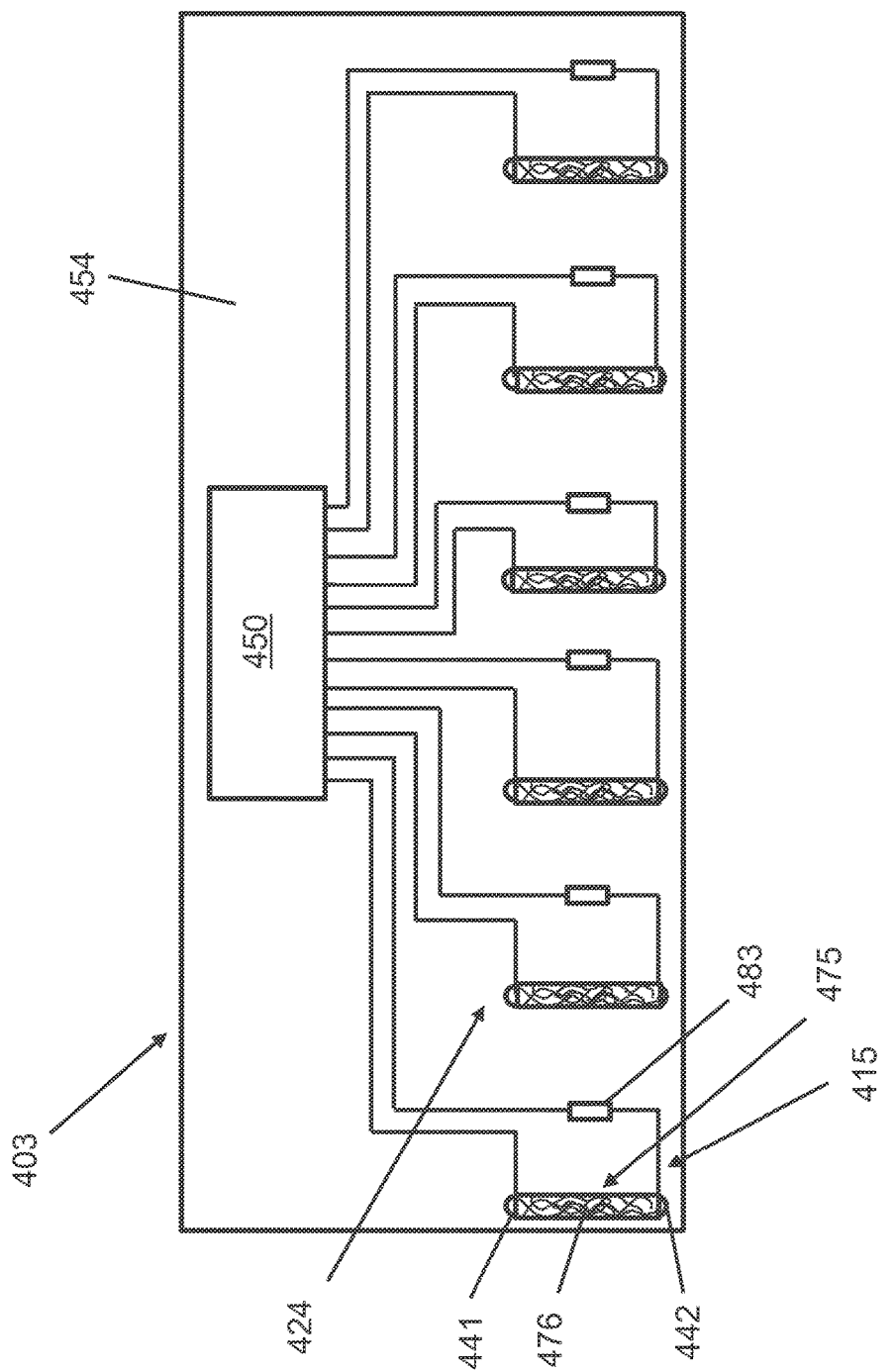
FIG. 31 is a plan view of another embodiment of a heater and/or sensor that includes another embodiment of a one-dimensional array of heating and/or sensing elements, wherein the heating and/or sensing elements comprise nanotube meshes.

With reference to FIG. 31, in some embodiments of a sensor 403, for at least one of the sensors 415 in an array 424, the nanostructure 475 comprises a nanotube mesh 476 that is oriented between the first and second electrical contacts 441, 442. In the illustrated embodiment, the nanostructure 475 of each sensors 415 comprises a separate nanotube mesh 476 that is oriented between the first and second electrical contacts.

Figure 32:
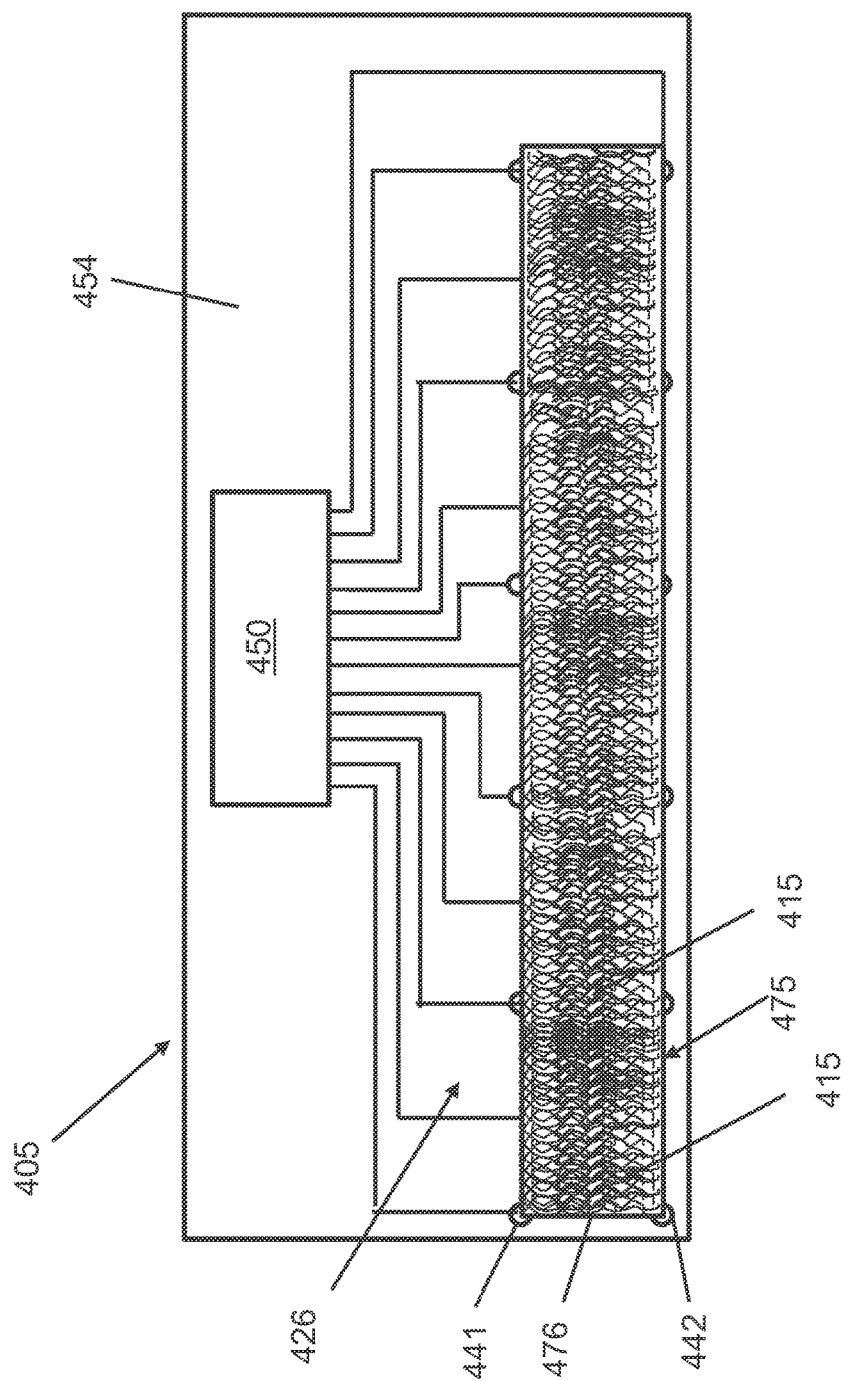
FIG. 32 is a plan view of another embodiment of a heater and/or sensor that includes another embodiment of a one-dimensional array of heating and/or sensing elements, wherein the heating and/or sensing elements comprise a unitary nanotube mesh.

With reference to FIG. 32, in some embodiments of a sensor system 405, a single nanotube mesh 476 is oriented between the first and second electrical contacts 441, 442 of each of the sensor elements in an array 426 of sensor elements 415.

In some embodiments, for at least one of the sensor elements 415 in the array, the nanostructure 475 comprises multiple individual nanotubes that are oriented between the first and second electrical contacts 441, 442. For example, an arrangement of a plurality of nanotubes 443 can be oriented between the first and second electrical contacts 441, 442 in a manner such as that in which the nanotubes 143 are oriented between the first and second electrical contacts 141, 142 in FIG. 20A.

Figure 33:
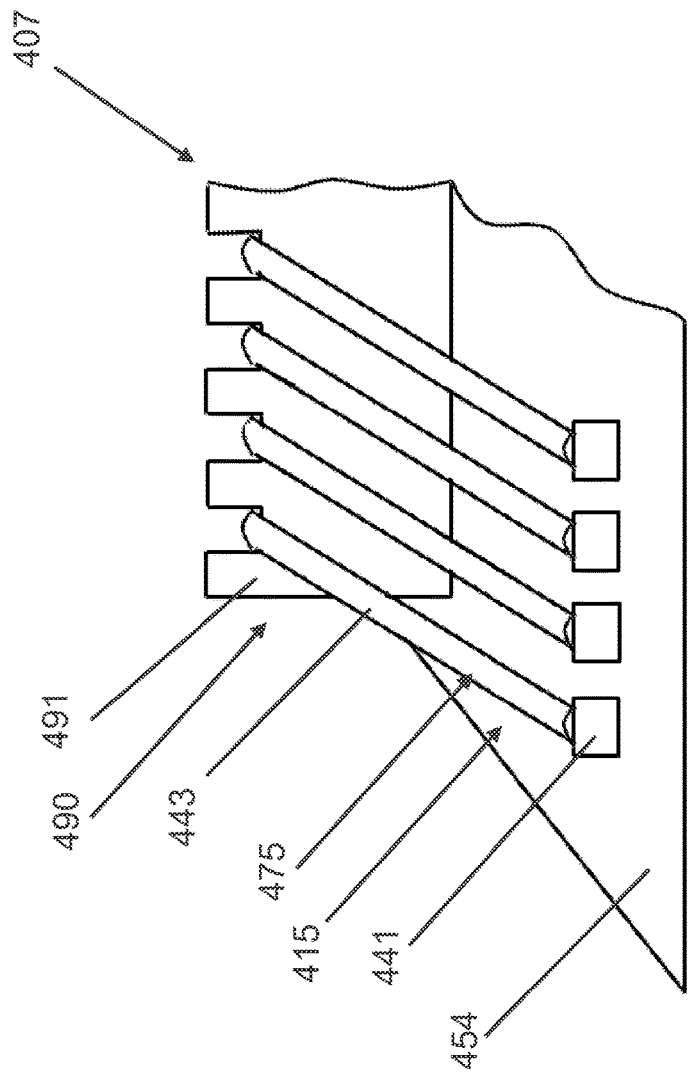
FIG. 33 is a perspective view of a portion of another embodiment of an array of nanotube sensors that includes an embodiment of a structure over which a plurality of nanostructures are oriented.
Figure 34:
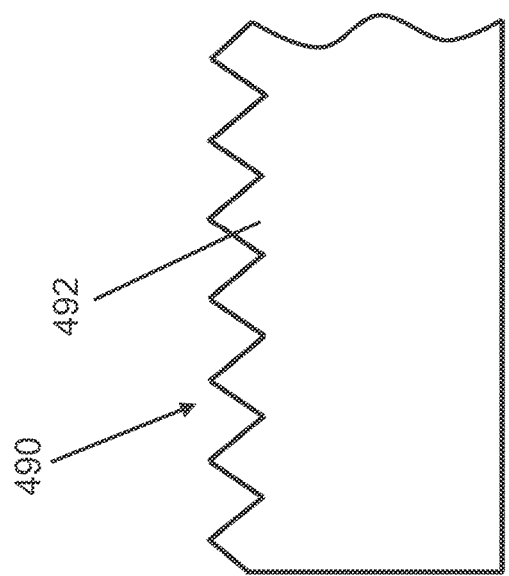
FIG. 34 is an elevation view of another embodiment of a structure over which a plurality of nanostructures can be oriented.

With reference to FIG. 33, in some embodiments, for at least one of the sensing elements 415, the nanostructure 475 is oriented over or through a separate structure 490 to achieve a predetermined spacing and/or a predetermined configuration relative to one or more nanostructures 475 of one or more adjacent sensing elements 415. In various embodiments, the separate structure 490 comprises a microfabricated element. In some embodiments, such as that illustrated in FIG. 33, the separate structure 490 comprises a comb structure 491. With reference to FIG. 34, in some embodiments, the separate structure 490 comprises a sawtooth structure 492. In some embodiments, the separate structure 490 comprises a grooved structure, such as, for example, a structure that includes rectangular or triangular grooves such as those depicted in FIGS. 33 and 34.

Figure 35:
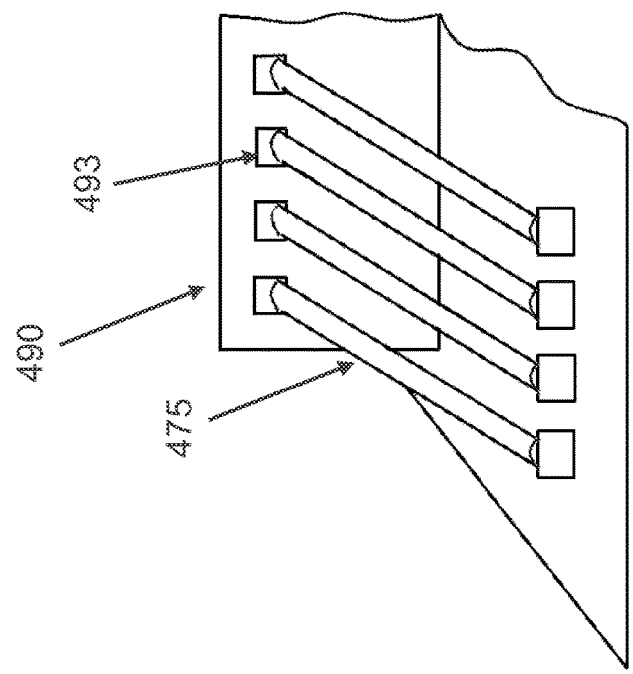
FIG. 35 is a perspective view of a portion of another embodiment of an array of nanotube sensors that includes another embodiment of a structure through which a plurality of nanostructures are oriented.

With reference to FIG. 35, in some embodiments, the separate structure 490 comprises one or more openings 493. The nanostructures 475 can be oriented through the openings 493.

Figure 36:
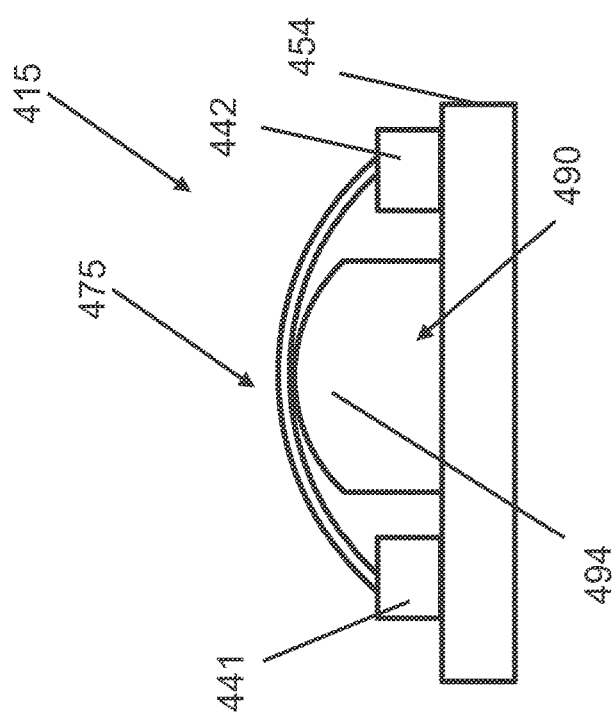
FIG. 36 is an elevation view of a portion of another embodiment of an array of nanotube sensors that includes another embodiment of a structure over which one or more nanostructures can be oriented.

With reference to FIG. 36, in some embodiments, the separate structure 490 comprises a cylindrically surfaced structure 494. In certain of such embodiments, the structure 490 can be configured to support a bowed or arced nanostructure 475. The structures 490 may be formed of any suitable material, such as, for example, a material from which the substrate 454 is formed.

In some embodiments, the predetermined configuration achieved via assistance from the separate structure 490 comprises a V-shape. For example, one or more of the structures 490 depicted in FIGS. 33-35 can be used to achieve an arrangement of nanostructures 475 such as that depicted in FIG. 24.

In some embodiments, the predetermined configuration achieved via assistance from the separate structure 490 comprises an arc. For example, an arrangement such as that depicted in FIG. 36 may be achieved via the structure 494.

Figure 37:
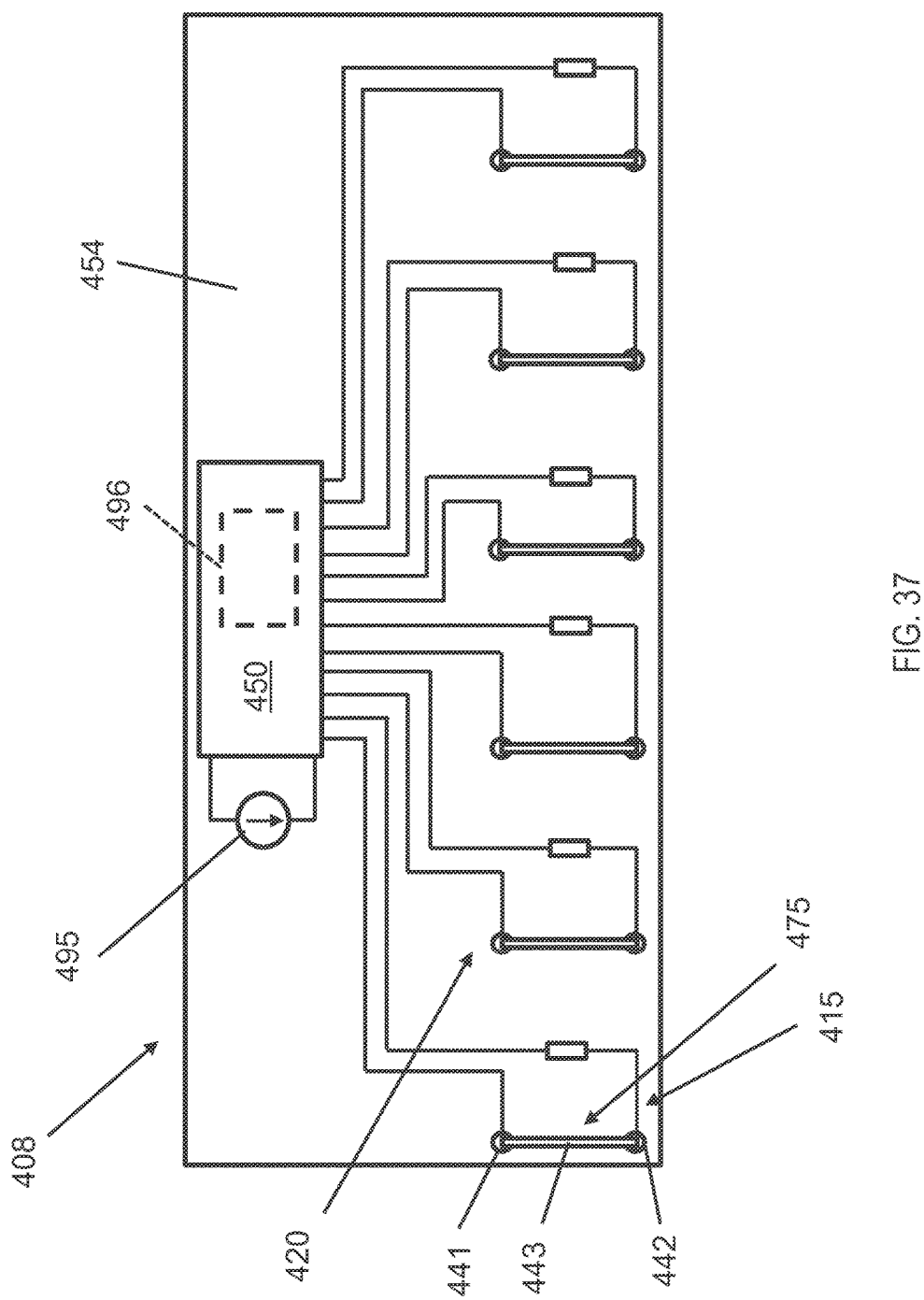
FIG. 37 is a plan view of another embodiment of a heater and/or sensor that includes one or more current sources.

In some embodiments 400-407, each nanostructure 475 may be accessed individually. In certain embodiments, each nanostructure 475 is sufficiently isolated from the remaining nanostructures so as to be individually addressable and/or controllable via one or more of the first and second contacts 441, 442 to which it is electrically coupled. In some embodiments, each nanostructure 475 is configured to be individually addressable and/or controllable via one or more current sources of any suitable variety. For example, as depicted in FIG. 37, some embodiments of a sensor 408 include one or more current sources 495 that can be used to individually address and/or control any of the nanostructures 475. In some instances, the circuit 450 may be used to control delivery of current from the current source 495. In some embodiments, each nanostructure 475 is configured to be individually addressed via one or more measurement circuits. For example, with continued reference to FIG. 37, in some embodiments, the circuit 450 can include one or more measurement circuits 496 that are configured to measure specific properties of the sensing elements 415. In some embodiments, each nanostructure 475 is configured to be individually controlled to characterize one or more properties thereof. In some instances, the one or more properties comprise a resistance of a nanostructure 475.

Figure 38:
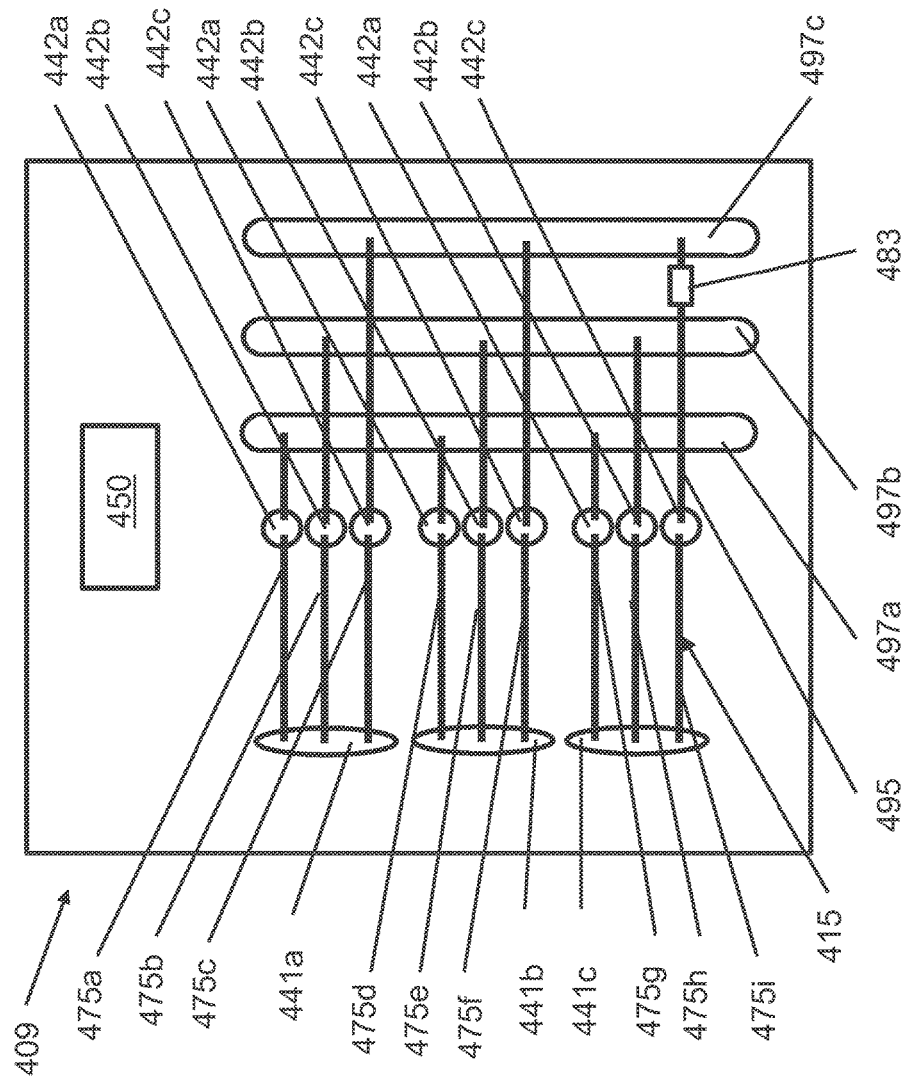
FIG. 38 is a plan view of another embodiment of an array of nanotube sensors that includes an embodiment of a 2-dimensionally addressable matrix.
Figure 39:
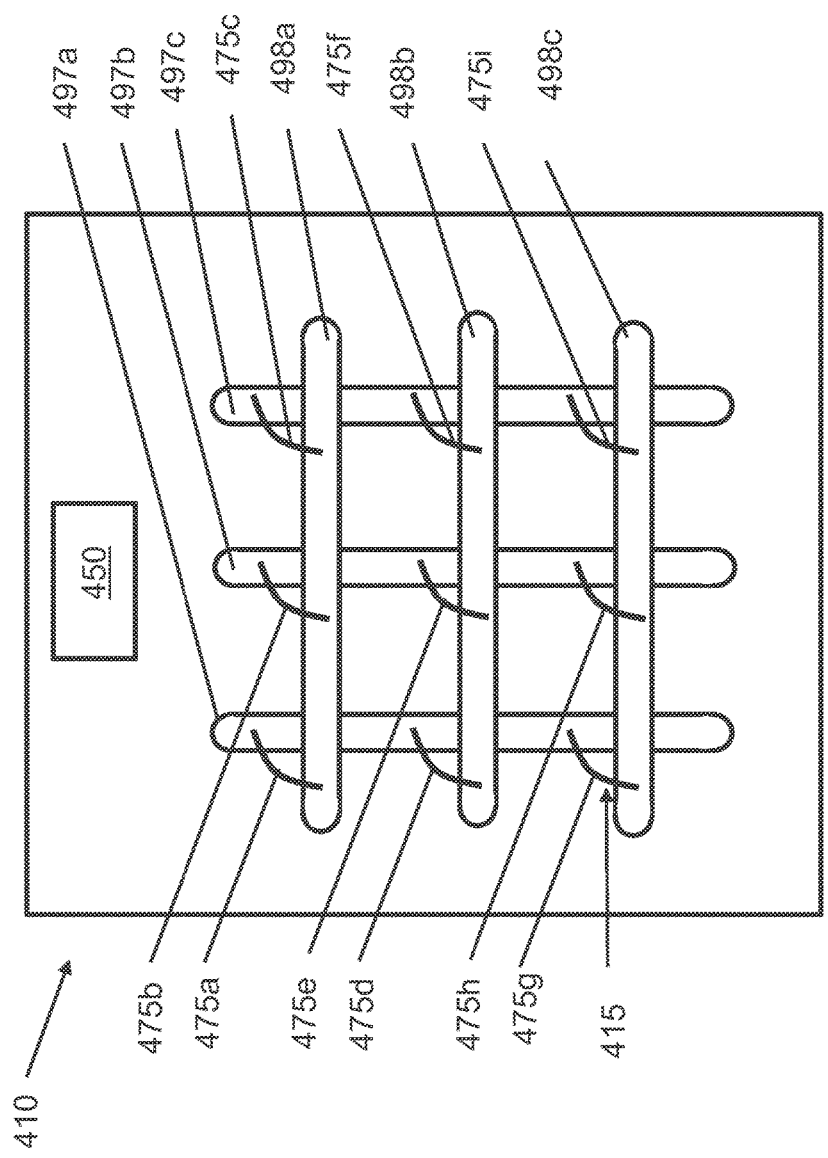
FIG. 39 is a plan view of another embodiment of an array of nanotube sensors that includes another embodiment of a 2-dimensionally addressable matrix.

With reference to FIGS. 38-39, in various embodiments, a sensor 409, 410, 411 comprises an array of sensing elements 415 that comprises a matrix arrangement for facilitating the selective addressing of one or more heating elements 415 within the array. In some embodiments, for a first subset of the sensing elements 415 of the array, the first electrical contact 441 of each sensing element comprises a common electrical contact with which the nanostructure 475 of each sensing element is electrically coupled. For example, in FIG. 38, a subset of sensing elements 415 includes the nanostructures 475a, 475b, 475c, which are connected to a common electrical contact 441a. Similarly, in FIG. 39, a subset of sensing elements 415 includes the nanostructures 475a, 475b, 475c, which are connected to a common electrical contact 498a.

With reference to FIG. 38, in some embodiments, for the first subset of the sensing elements 415 of the array, the second electrical contact 442 of each sensing element comprises a separate electrical contact that is electrically isolated from the second electrical contact of each remaining sensing element of the first subset. For example, for the first subset of sensing elements 415 that includes the nanostructures 475a, 475b, 475c, the second electrical contacts include the separate contacts 442a, 442b, 442c, respectively. Further, in the illustrated embodiment, each second electrical contact of the sensing elements of the first subset is electrically coupled with an additional electrical contact 497a, 497b, 497c that is electrically coupled with one or more sensing elements that are not within the first subset. For example, the electrical contacts 497a, 497b, 497c are electrically coupled with the nanostructures 475d, 475g; 475e, 475h; and 475f, 475i, respectively.

With continued reference to FIG. 38, each of the second electrical contacts of the sensing elements of the first subset is electrically coupled with the corresponding additional electrical contact 497a, 497b, 497c via an electrical interconnector 498. In various embodiments, the electrical interconnector 498 for one or more of the sensing elements 415 of the first subset comprises a nanotube.

In some embodiments, the electrical interconnector 498 for one or more of the sensing elements 415 of the first subset comprises an isolating element 483 to prevent sneak paths for current flow. In some embodiments, the isolating element 483 comprises a diode.

With continued reference to FIG. 38, for a second subset of the array of sensing elements that is different from the first subset, the second electrical contact of each sensing element within the second subset comprises a second common electrical contact with which the nanostructure of each sensing element within the second subset is electrically coupled. For example, a second subset of the sensing elements 415 could include the nanostructures 475a, 475d, 475g. The second electrical contact for each of these nanostructures can comprise the electrical contact 497a, which is electrically coupled with the electrical contacts 442a.

In the illustrated embodiment, the first common electrical contact (e.g., the contact 441a) and the second common electrical contact (e.g., the electrical contact 497a) are oriented substantially parallel to each other.

In FIG. 39, the first common electrical contact (e.g., 498a) and a second common electrical contact (e.g., 497a) are oriented substantially perpendicular to each other. In various embodiments, the first common electrical contact (e.g., 498a) and the second common electrical contact (e.g., 497a) may be oriented at a nonparallel, non-perpendicular angle relative to each other.

As shown in each of FIGS. 38-39, various matrix arrangements each comprise a plurality of electrical contacts that are each coupled with a plurality of the nanostructures of the sensing elements 415 of the array. At least a portion of the plurality of electrical contacts can be oriented in one or more columns or in one or more rows.

As shown in FIG. 39, in some embodiments, the plurality of electrical contacts 497a, 497b, 497c and 498a, 498b, 498c are oriented in a plurality of columns and rows, respectively. In some embodiments, the plurality columns and rows are overlapping.

As shown in FIG. 39, in some embodiments, the plurality of electrical contacts 497, 498 comprise subsets that overlap each other. The overlapping subsets can be electrically isolated from each other in any suitable manner.

With reference generally to the heaters 400-411, in some embodiments, the circuit 450 comprises one or more current sources 495 that are coupled with the first and second contacts 441, 442 (and 498, 497) of the sensing elements 415 to selectively pass current from the first electrical contacts 441 (and 498) to the second electrical contacts 442 (and 497), or vice versa.

In some embodiments, the circuit 450 is configured to measure one or more electrical properties of each nanostructure 475. In various embodiments, the electrical property comprises one or more of a voltage across the nanostructure 475 and a resistance of the nanostructure 475.

In some embodiments, the circuit 450 is configured to measure one or more electrical properties of each pair of first and second electrical contacts 441, 442. In various embodiments, the electrical property comprises one or more of a voltage between the electrical contacts and a resistance between the electrical contacts 441, 442. In some of the drawings discussed above, electrical leads that couple the circuit 450 with other components of the sensors are not shown, but such lead arrangements can be understood from those drawings in which the electrical leads are shown.

Any suitable method for manufacturing any of the foregoing sensors is contemplated. Some methods include forming an array of sensing elements 415 such that each sensing element 415 comprises a first electrical contact 441 (or 498), a second electrical contact 442 (or 497), and a nanostructure 475 electrically coupling the first electrical contact to the second electrical contact. The methods include coupling a circuit 450 with the array of sensing elements 415 such that the circuit 450 is configured to selectively address one or more sensing elements 415 within the array.

Various methods can include arranging the various components of the sensors in any of the arrangements discussed above. Further, any suitable materials may be used in the processes, including those discussed above.

In some methods, forming an array of sensing elements 415 comprises manipulating one or more nanotubes 443 to be oriented between a first and a second electrical contact 441, 442. In some methods, the manipulating comprises direct manipulation via one or more nanoprobes. For example, in some instances, the one or more nanoprobes comprise a nanotube having a movable tip. In some instances, the one or more nanoprobes comprise nanotweezers.

In some methods, manipulating the one or more nanotubes 443 comprises orienting a plurality of nanotubes between the first and a second electrical contact via dielectrophoretic assembly. In certain of such methods, forming the array comprises isolating an individual nanotube that is oriented between the first and second electrical contacts. Said isolating can comprise isolating an individual nanotube from at least one adjacent nanotube. In some instances, isolating an individual nanotube comprises selective removal of nanotubes via an etching process. For example, the etching process can comprise one or more of electron beam etching and ion beam etching.

Some methods include reshaping one or more nanostructures after they have been coupled to the first and second electrical contacts 441, 442. For example, the reshaping can comprise changing a relative position of a set of the first contacts 441 relative to a set of second contacts 442. In some instances, changing a relative position of the first and second contacts 441, 442 comprises moving the contacts closer together. For example, the bent shapes in FIGS. 23 and 24 may be achieved by approximating the substrate portions 454 to which the contacts 441, 442 are attached toward one another at a time after the nanostructures 475 have been attached to the contacts 441, 442.

In some instances, changing a relative position of the first and second contacts 441, 442 comprises rotating the contacts and moving the contacts closer to each other. In some methods, the first and second contacts 441, 442 are spaced from each other in a longitudinal direction. Changing a relative position of the first and second contacts 441, 442, can include displacing the first and second contacts 441, 442 relative to each other along a direction that is transverse to the longitudinal direction. In some instances, displacing the first and second contacts 441, 442 in this manner moves the first and second contacts 441, 442 closer together.

In some methods, displacement of the first and second contacts 441, 442 reshapes the nanostructures into arc shapes, such as depicted in FIGS. 23A and 23B. In some embodiments, the nanostructures are reshaped into "V" shapes, as depicted, for example, in FIG. 24.

Certain methods for sensing are now described. In some instances, one or more of any suitable sensor described herein may be used in these methods. Any process or function for which one or more components of the sensors are configured can be achieved during the course of the methods.

Some methods utilize a sensor that comprises an array of sensing elements 415, wherein each sensing element 415 comprises a first electrical contact 441, a second electrical contact 442, and a nanostructure 475 electrically coupling the first electrical contact to the second electrical contact. The methods can include selectively monitoring one or more individual sensing elements within the array.

Each nanostructure 475 within the array can be sufficiently isolated from the remaining nanostructures so as to be individually addressable via one or more of the first and second contacts 441, 442 to which it is electrically coupled. In some embodiments, the sensor comprises one or more current sources 495, and certain methods can include individually monitoring one or more of the nanostructures via the one or more current sources. In some embodiments, the sensor comprises measurement circuits 496, and certain methods can include individually monitoring one or more of the nanostructures via the measurement circuits.

In some embodiments, each nanostructure 475 is sufficiently isolated from the remaining nanostructures so as to be individually controllable via one or more of the first and second contacts to which it is electrically coupled. In some embodiments, the sensor comprises one or more current sources, and certain methods include individually controlling one or more of the nanostructures via the one or more current sources. In some embodiments, the sensor comprises measurement circuits 476, and certain methods include individually controlling one or more of the nanostructures via the measurement circuits.

Some methods include individually controlling one or more of the nanostructures to characterize one or more properties thereof. The one or more properties can comprise a resistance of a nanostructure.

In some embodiments, the circuit 450 comprises one or more current sources 495 that are coupled with the first and second contacts of the sensing elements, and certain methods include selectively driving current from the first electrical contacts to the second electrical contacts via the one or more current sources.

Certain methods include measuring one or more electrical properties of one or more nanostructures of the array via the circuit. In some instances, the electrical property comprises a voltage across the nanostructure. In other or further instances, the electrical property comprises a resistance of the nanostructure.

Certain methods include measuring one or more electrical properties of each pair of first and second electrical contacts via the circuit. In some instances, the electrical property comprises a voltage between the electrical contacts. In other or further instances, the electrical property comprises a resistance between the electrical contacts.

Figure 40:
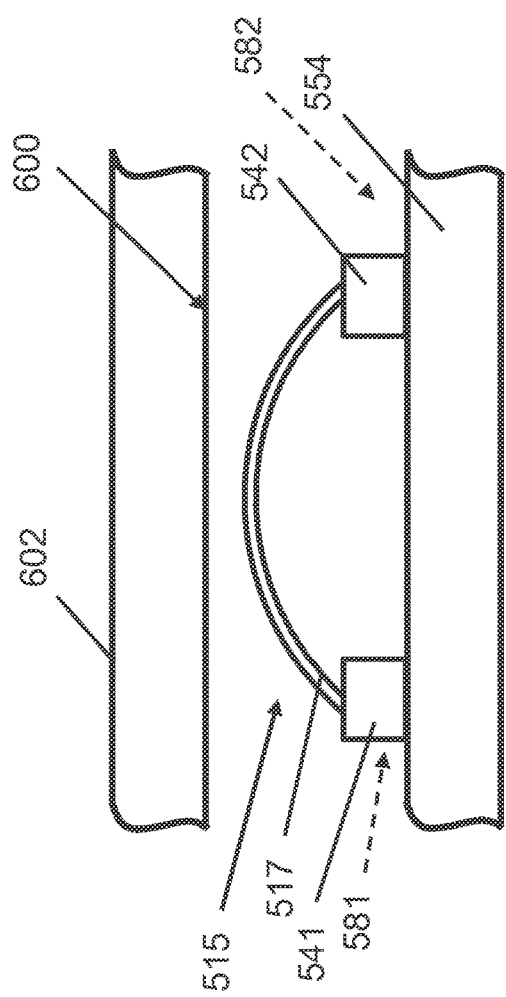
FIG. 40 is an elevation view of a portion of an embodiment of a sensor that is approximated to a surface for heating and/or sensing the surface.

With reference to FIG. 40, in some embodiments, the circuit 550 is configured to determine a thermal property of a surface 600 that is in contact with or in proximity to the first graphene sheet 517 based on an effect of the thermal property on the graphene sheet 517. The surface 600 can be the surface of any suitable item 602 or material that it may be desirable to observe, monitor, or otherwise sense via the sensor 500.

Certain methods for sensing are now described. In some instances, one or more of any suitable sensor described herein may be used in these methods. Any process or function for which one or more components of the sensors are configured can be achieved during the course of the methods.

Some methods of selective sensing include, in a sensor 500, 501, 502, 503, 504, 505 that comprises a plurality of electrical contacts 541 (and/or 542) and a graphene sheet 517 that electrically couples the plurality of electrical contacts, using one or more pairs of electrical contacts from the plurality of electrical contacts to monitor, for each of the one or more pairs of electrical contacts, a portion of the graphene sheet positioned between the electrical contacts to determine a thermal property of a surface 600 that is in contact with or in proximity to the portion of the first graphene sheet based on an effect of the thermal property on the portion of the first graphene sheet. For example, with reference to FIG. 40, the portion of the graphene sheet 517 may be the illustrated portion that is oriented between the electrical contacts 541, 542. Some methods further include selecting the one or more pairs of electrical contacts used for monitoring one or more portions of the first graphene sheet. For example, a circuit 550 and/or a processor 530 may be used to dynamically select which of the electrical contacts 541 (and/or 542) may be used in a given sensing event. Some methods include, for each pair of electrical contacts thus selected, dynamically determining a polarity of each electrical contact.

With reference to FIG. 40, some methods include approximating a sensor (e.g., 400-411, 500-505) to a surface 600, wherein the sensor comprises an array of sensing elements 415, 515. Each sensing element 415, 515 can include a first electrical contact 441, 541, a second electrical contact 442 (or 441), 542 (or 542) spaced from the first electrical contact, and one or more carbon structures electrically coupling the first electrical contact to the second electrical contact. The term carbon structure is used in its ordinary sense and includes structures that are formed of carbon such as, for example, one or more carbon nanotubes, one or more carbon nanotube meshes, and/or one or more graphene sheets.

In some methods, the array of sensing elements comprises a one-dimensional array, and the method includes moving the array of sensing elements relative to a surface or object. Movement of the array can be in any of a wide variety of manners. Other or further methods include controlling a speed at which the array of sensing elements is moved relative to the surface. Controlling the speed can be in any of the manners discussed above. Some methods include stopping the array of sensing elements relative to the surface.

In some methods, the array of sensing elements comprises a two-dimensional array. In some instances, the array of sensing elements is held stationary relative to the surface as the thermal property of the surface is determined.

Some methods include reading information from the surface based on the thermal property of the surface. For example, various methods include detecting material that has been added to the surface and/or detecting that material has been subtracted from the surface.

In various methods, the carbon structure comprises one or more carbon nanotubes. In some methods, the carbon structure comprises one or more graphene sheets. In further instances, a single graphene sheet spans the first and second electrical contacts of multiple sensing elements.

Some methods include measuring one or more electrical properties of one or more carbon structures of the array. In some instances, the electrical property can comprise a voltage across the carbon structure. In other or further instances, the electrical property can comprise a resistance of the carbon structure.

Some methods include measuring one or more electrical properties of each pair of first and second electrical contacts. In some instances, the electrical property comprises a voltage between the electrical contacts. In other or further instances, the electrical property comprises a resistance between the electrical contacts.

Figure 41C:
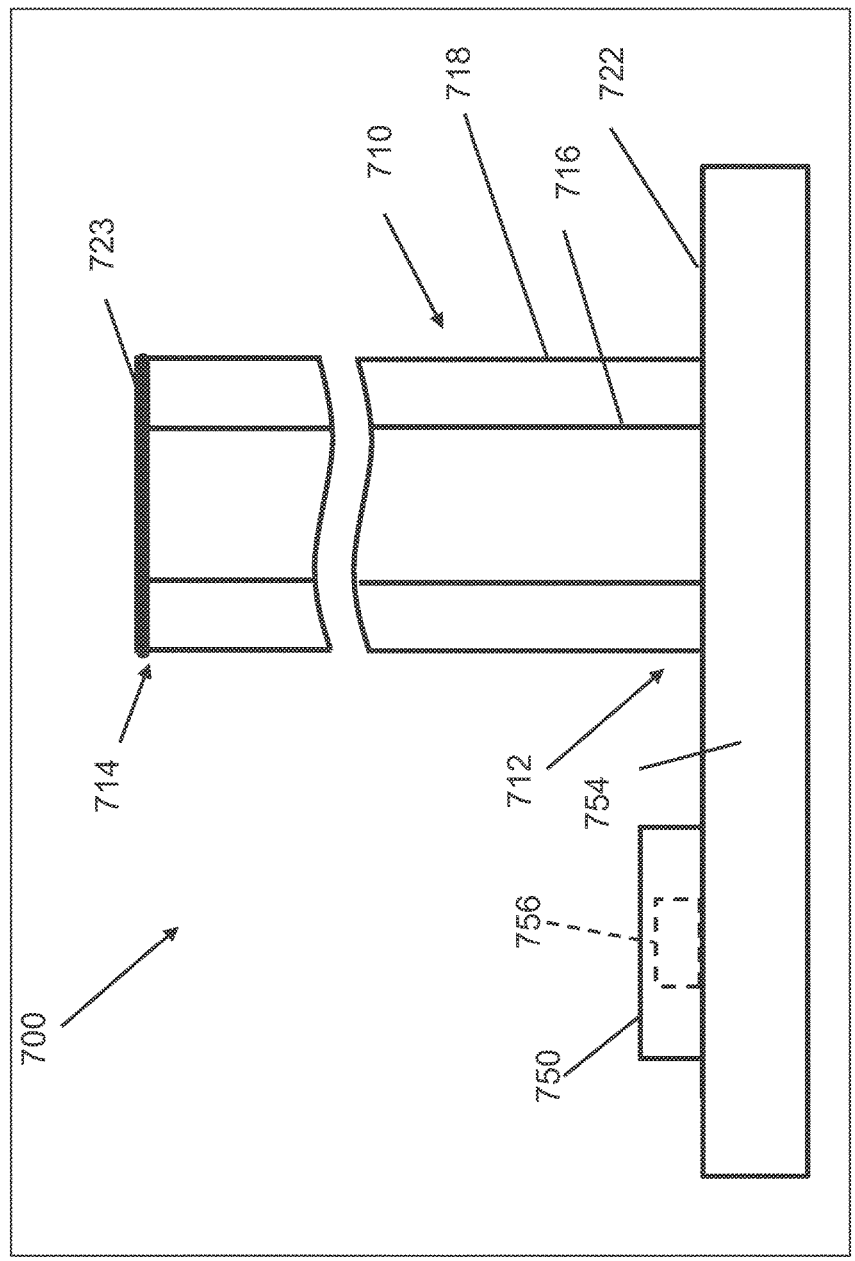
FIG. 41C is another cross-sectional view of the thermal device of FIG. 41B taken along a plane that is perpendicular to a plane of the cross-section of FIG. 41B, wherein the cross-sectional planes of FIGS. 41B and 41C intersect along a longitudinal axis of the multi-wall nanotube.
Figure 42:
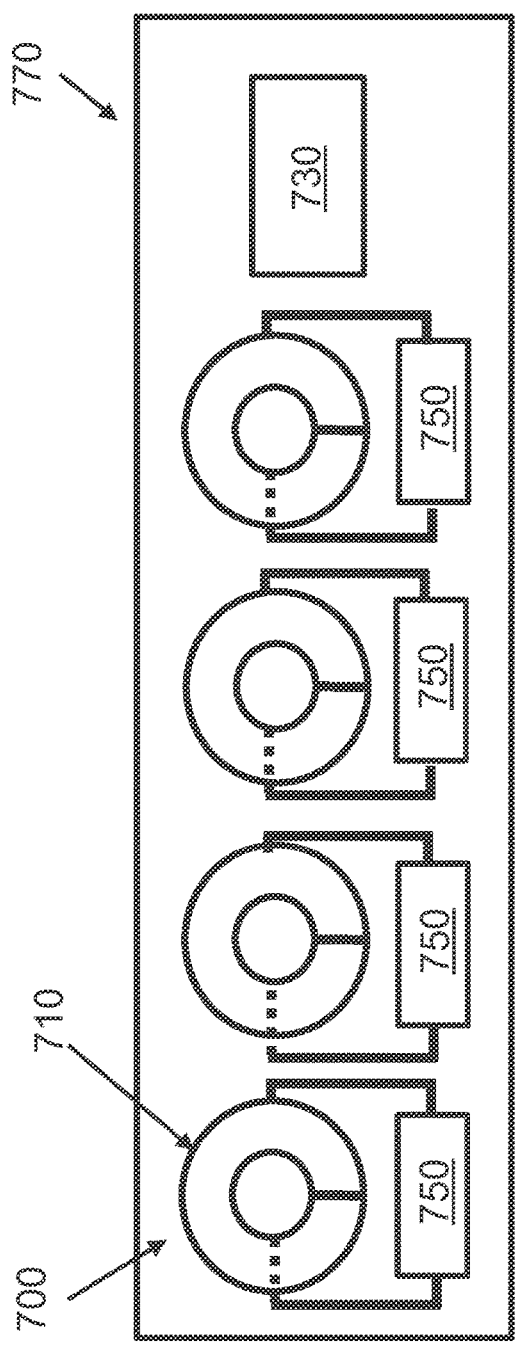
FIG. 42 is a plan view of an embodiment of a system that includes a plurality of thermal devices arranged in a one-dimensional array.
Figure 43:
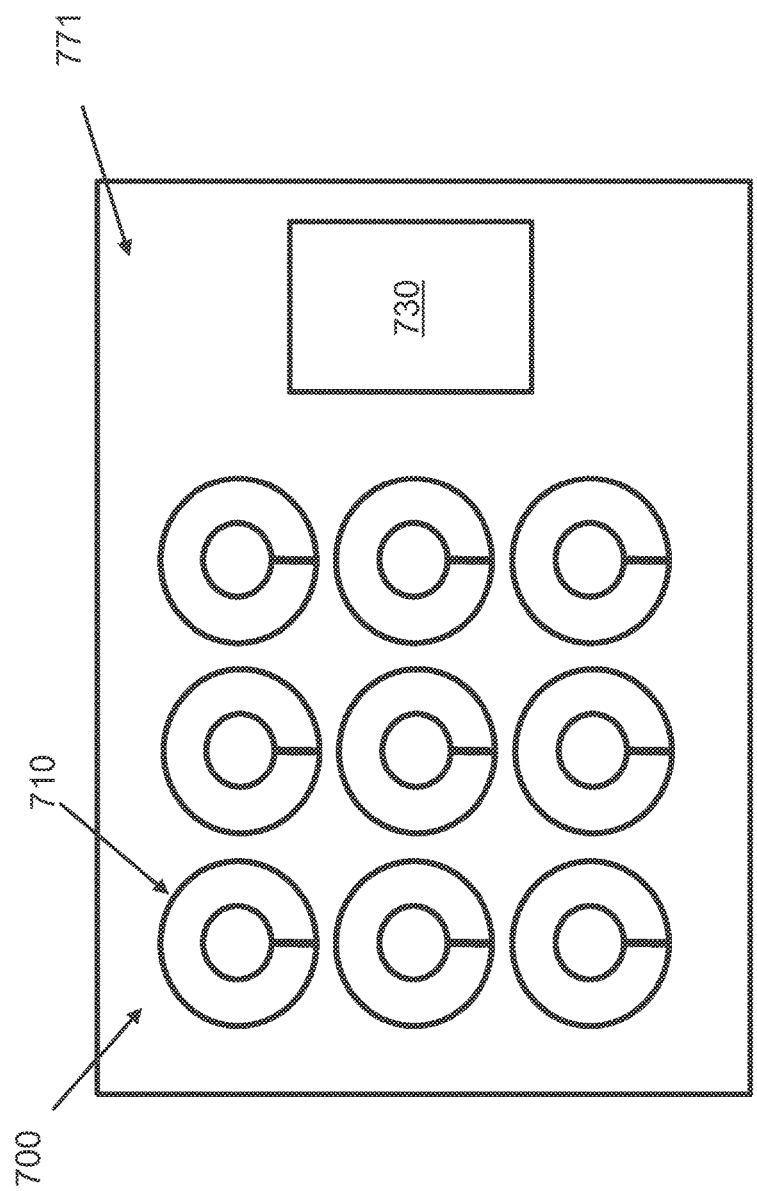
FIG. 43 is a plan view of another embodiment of a system that includes a plurality of thermal devices, wherein the thermal devices are arranged in a two-dimensional array.

With reference to FIGS. 41A 41B, and 41C, in some embodiments, a thermal device 700 can be configured to operate as a sensor. Stated otherwise, the thermal device 700 may be referred to as a sensor 700, depending on a manner in which the thermal device is configured to operate. In certain embodiments, the thermal device 700 can include a substrate 754 and a multi-wall carbon nanotube 710 coupled to the substrate 754 at a first end 712 thereof. The carbon nanotube 710 can include a second end 714 that is spaced from the substrate 754. The carbon nanotube 710 can further comprise a first wall 716 and a second wall 718 external to the first wall. A first electrical lead 721 can be coupled to the first wall 716 and a second electrical lead 718 can be coupled to the second wall 718. The first and second walls 716, 718 can be electrically coupled to each other via an electrical lead 723.

In certain embodiments, the first and second electrical leads 721, 722 can be supported by the substrate 754. In some embodiments, the first and second walls 716, 718 are electrically coupled to each other at the second end 714 of the carbon nanotube 710. For example, the first and second walls 716, 718 can be electrically coupled to each other via an electrical lead 723. In some embodiments, the entire top surface of the carbon nanotube 710 may be covered and/or partially covered with an electrical lead 723 (shown with cross-hatching).

In some embodiments, the circuit 750 is configured to sense a thermal change at the second end 714 of the carbon nanotube 710 based on an effect of the thermal change on the carbon nanotube. In some embodiments, the effect of the thermal change on the carbon nanotube is a change in resistance of the carbon nanotube. For example, the change in resistance can be due at least in part to an increase in temperature of the second end of the carbon nanotube. In other or further instances, the change in resistance is due at least in part to a decrease in temperature of the second end of the carbon nanotube.

In some embodiments, the circuit 750 can be configured to determine a magnitude of the change in the resistance of the carbon nanotube based on a change in voltage across the first and second walls 716, 718. In other or further embodiments, the circuit 750 is configured to determine whether or not a thermal change occurs at the second end 714 of the carbon nanotube by determining whether or not a voltage across the first and second walls changes.

In some embodiments, the circuit 750 is configured to determine a magnitude of the change in the resistance of the carbon nanotube based on a change in current passing through the nanotube. In other or further embodiments, the circuit 750 is configured to determine whether or not a thermal change occurs at the second end of the carbon nanotube by determining whether or not a current passing through the nanotube changes.

In some embodiments, the circuit 750 is configured to determine a magnitude of the change in resistance of the carbon nanotube based on a change in power dissipated in the circuit. In other or further embodiments, the circuit 750 is configured to determine whether or not a thermal change occurs at the second end of the carbon nanotube by determining whether or not a level of power dissipated in the circuit changes.

In some embodiments, the circuit 750 is configured to counteract a change in the resistance at the second end 714 of the nanotube so as to maintain the nanotube at a constant resistance. In further embodiments, the circuit 750 comprises a feedback circuit 756 that is configured to counteract a change in the resistance of the nanotube by controlling a current within the feedback circuit. In some embodiments, a magnitude of the thermal change is detected via a magnitude of a change in the current used to maintain the nanotube at the constant resistance.

In some embodiments, the circuit 750 is configured to maintain a constant voltage across the first and second walls 716, 718 of the carbon nanotube 710. In further embodiments, changes in the circuit 750 that aid in maintaining the constant voltage are used to determine whether or not a thermal change occurs at the second end 714 of the carbon nanotube. In some embodiments, changes in the circuit 750 that aid in maintaining the constant voltage are used to determine a magnitude of a thermal change at the second end 714 of the carbon nanotube.

In some embodiments, the circuit 750 is configured to pass a constant current through the nanotube 710. In further embodiments, changes in the circuit 750 that aid in maintaining the constant current are used to determine whether or not a thermal change occurs at the second end of the carbon nanotube. In some embodiments, changes in the circuit 750 that aid in maintaining the constant current are used to determine a magnitude of a thermal change at the second end 714 of the carbon nanotube.

In certain embodiments, the circuit 750 is configured to dissipate a constant power. In further embodiments, changes in the circuit 750 that aid in maintaining the constant power are used to determine whether or not a thermal change occurs at the second end 714 of the carbon nanotube. In some embodiments, changes in the circuit that aid in maintaining the constant power are used to determine a magnitude of a thermal change at the second end of the carbon nanotube.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

References to approximations are made throughout this specification, such as by use of the terms "about" or "approximately." For each such reference, it is to be understood that, in some embodiments, the value, feature, or characteristic may be specified without approximation. For example, where qualifiers such as "about," "substantially," and "generally" are used, these terms include within their scope the qualified words in the absence of their qualifiers. For example, where the term "substantially the same" is recited with respect to a feature, it is understood that in further embodiments, the feature can be precisely the same.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. The term "first" in the claims with respect to a given feature does not necessarily imply the existence of a second or greater number of that feature.

The invention claimed is:

1. A calorimetric sensor comprising:
   a first electrical contact;
   a second electrical contact spaced from the first electrical contact;
   a first nanotube oriented between the first and second electrical contacts, the first nanotube being electrically coupled with each of the first and second electrical contacts;
   a first reactor covalently coupled to the first nanotube, the first reactor comprising a molecule configured to chemically interact with a target material, wherein the reactor is configured to be returned to a pre-reaction state via heating of the first reactor;
   a circuit coupled with the first and second electrical contacts, the circuit configured to reset the reactor via heating the first nanotube and reactor by passing a current through the first nanotube; and
   a processor electrically coupled with the circuit, the processor configured to determine whether a reaction at the reaction site occurs based on a measured change in voltage across the first nanotube.

2. The calorimetric sensor of claim 1, wherein the first nanotube comprises a carbon nanotube.

3. The calorimetric sensor of claim 1, wherein the first nanotube comprises an inorganic nanotube.

4. The calorimetric sensor of claim 1, wherein the first nanotube comprises a single-walled nanotube.

5. The calorimetric sensor of claim 1, wherein the first nanotube comprises a multi-walled nanotube.

6. The calorimetric sensor of claim 1, further comprising:
a first set of wires electrically coupling the circuit to the first nanotube, the first set of wires configured to pass current through the first nanotube; and
a second set of wires electrically coupling the circuit to the first nanotube, the second set of wires configured to measure voltage across the first nanotube.

7. A calorimetric sensor comprising:
a first electrical contact;
a second electrical contact spaced from the first electrical contact;
a first nanotube oriented between the first and second electrical contacts, the first nanotube electrically coupled with each of the first and second electrical contacts;
a first reactor coupled to the first nanotube, the first reactor comprising a molecule configured to chemically interact with a target material; and
a circuit electrically coupled with the first and second electrical contacts;
wherein the circuit is configured to counteract a change in the resistance of the first nanotube so as to maintain the first nanotube at a constant resistance.

8. The calorimetric sensor of claim 7, wherein the circuit comprises a feedback circuit, the feedback circuit configured to counteract a change in the resistance of the nanotube by controlling a current within the feedback circuit.

9. The calorimetric sensor of claim 8, further comprising a processor electrically coupled with the circuit, the processor configured to determine a magnitude of a thermal change at the first reactor based on a magnitude of a change in the current within the feedback circuit used to maintain the nanotube at the constant resistance.

10. The calorimetric sensor of claim 7, wherein the first reactor is resettable to a pre-reaction state.

11. The calorimetric sensor of claim 10, wherein the first reactor is configured to be returned to a pre-reaction state via heating of the first reactor.

12. The calorimetric sensor of claim 11, wherein the circuit is configured to reset the first reactor via heating the first nanotube and first reactor by passing a current through the first nanotube.

13. The calorimetric sensor of claim 7, further comprising:
a third electrical contact;
a fourth electrical contact spaced from the third electrical contact;
a second nanotube oriented between the third and fourth electrical contacts, the second nanotube electrically coupled with each of the third and fourth electrical contacts; and
a second reactor coupled to the second nanotube, the second reactor comprising a molecule configured to chemically react with a target material;
wherein the circuit is coupled with the third and fourth electrical contacts, the circuit configured to counteract a change in the resistance of the second nanotube so as to maintain the second nanotube at a constant resistance.

14. The calorimetric sensor of claim 13, wherein the circuit is configured to detect a thermal change at the first reactor based on a differential measurement of the first and second nanotubes.

15. The calorimetric sensor of claim 14, wherein the differential measurement compares a resistance of the first nanotube with a resistance of the second nanotube.

16. The calorimetric sensor of claim 14, wherein the differential measurement compares a current flow through the first nanotube with a current flow through the second nanotube.

17. The calorimetric sensor of claim 14, wherein the differential measurement compares a voltage across the first and second electrical contacts with a voltage across the third and fourth electrical contacts.

18. A calorimetric sensor comprising:
a first electrical contact;
a second electrical contact spaced from the first electrical contact;
a first nanotube oriented between the first and second electrical contacts, the first nanotube electrically coupled with each of the first and second electrical contacts;
a first reactor coupled to the first nanotube, the first reactor comprising a molecule configured to chemically interact with a target material and configured to be returned to a pre-reaction state via heating of the first reactor; and
a circuit electrically coupled with the first and second electrical contacts;
wherein the circuit is configured to reset the reactor via heating the first nanotube and reactor by passing a current through the first nanotube.

19. The calorimetric sensor of claim 18, further comprising:
a third electrical contact;
a fourth electrical contact spaced from the third electrical contact;
a second nanotube oriented between the third and fourth electrical contacts, the second nanotube electrically coupled with each of the third and fourth electrical contacts; and
a second reactor coupled to the second nanotube, the second reactor comprising a molecule configured to chemically react with a target material;
wherein the circuit is coupled with the third and fourth electrical contacts, the circuit configured to counteract a change in the resistance of the second nanotube so as to maintain the second nanotube at a constant resistance.

20. The calorimetric sensor of claim 19, wherein the circuit is configured to detect a thermal change at the first reactor based on a differential measurement of the first and second nanotubes.

21. The calorimetric sensor of claim 20, further comprising a processor electrically coupled with the circuit, the processor configured to determine a magnitude of a thermal change at the first reactor based on a differential measurement of the first and second nanotubes.

22. The calorimetric sensor of claim 21, wherein the differential measurement compares a resistance of the first nanotube with a resistance of the second nanotube.

23. The calorimetric sensor of claim 21, wherein the differential measurement compares a current flow through the first nanotube with a current flow through the second nanotube.

24. The calorimetric sensor of claim 21, wherein the differential measurement compares a voltage across the first and second electrical contacts with a voltage across the third and fourth electrical contacts.

\* \* \* \* \*